US011575998B2

(12) United States Patent
Sahgal

(10) Patent No.: US 11,575,998 B2
(45) Date of Patent: *Feb. 7, 2023

(54) METHOD AND SYSTEM FOR CUSTOMIZED AMPLIFICATION OF AUDITORY SIGNALS BASED ON SWITCHING OF TUNING PROFILES

(71) Applicant: LISTEN AND BE HEARD LLC, Portland, OR (US)

(72) Inventor: Narendar Bahadur Sahgal, Portland, OR (US)

(73) Assignee: Listen and Be Heard LLC, Portland, OR (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/195,654

(22) Filed: Mar. 9, 2021

(65) Prior Publication Data
US 2022/0295189 A1 Sep. 15, 2022

(51) Int. Cl.
*H04R 25/00* (2006.01)
*G06F 3/16* (2006.01)
*G10L 25/18* (2013.01)

(52) U.S. Cl.
CPC ........... *H04R 25/505* (2013.01); *G06F 3/165* (2013.01); *G10L 25/18* (2013.01); *H04R 25/353* (2013.01); *H04R 25/356* (2013.01); *H04R 25/558* (2013.01); *H04R 2225/025* (2013.01); *H04R 2225/41* (2013.01); *H04R 2225/55* (2013.01); *H04R 2460/07* (2013.01)

(58) Field of Classification Search
CPC ....... G06F 3/165; G10L 25/18; H04R 25/505; H04R 25/353; H04R 25/356; H04R 25/558; H04R 2225/025; H04R 2225/41; H04R 2225/55; H04R 2460/07
See application file for complete search history.

(56) References Cited

U.S. PATENT DOCUMENTS

| 4,548,082 | A | * | 10/1985 | Engebretson | .......... | H04R 25/70 |
| | | | | | | 381/328 |
| 6,240,192 | B1 | | 5/2001 | Brennan et al. | | |
| 2015/0078600 | A1 | * | 3/2015 | Rasmussen | .......... | H04R 25/407 |
| | | | | | | 381/322 |

OTHER PUBLICATIONS

Grandpierre, V. et al., "School-aged Children with Mild Bilateral and Unilateral Hearing Loss . . . " Journal of Deaf Studies and Deaf Education. Apr. 2018, 23(2): 140-147.
Signia USA, "Protecting Kids (and Adults) with Hearing Loss Against Bullying," Oct. 3, 2017, pp. 1-4.
Occupational Safety and Health Administration (OSHA), "1910. 95—Occupational Noise Exposure," Occupational Safety and Health Standards, Dept. of Labor, pp. 1-13.

(Continued)

*Primary Examiner* — Brian Ensey
(74) *Attorney, Agent, or Firm* — Dewan IP Office; Rohit K Dewan

(57) ABSTRACT

Disclosed herein are method, system, and computer program product embodiments for performing the continuous and autonomous selective tuning of received audio input from an earpiece, according to a variety of user-based tuning profiles and autonomous determination mechanisms for selecting any one of the tuning profiles, using logistic regression, multi-layered ensemble classifiers incorporating machine learning techniques, etc, for an optimal in-ear hearing experience for a user.

20 Claims, 30 Drawing Sheets

(56) References Cited

OTHER PUBLICATIONS

Kardous, Chucri. "WHO Safe Listening App Dosimetry Evaluation," U.S. National Institute for Occupational Safety and Health. 2017.

Airo, E. et al., "Listening to Music with Earphones: An Assessment of Noise Exposure," Acta Acustica united with Acustica, vol. 82, No. 6, pp. 885-894 (1996).

Smeds, Karolina, "Is normal or less than normal overall loudness preferred by first-time hearing aid users?" Ear Hear. Apr. 2004; 25(2), pp. 159-172.

Olson, Harry, "Modern Sound Reproduction," R. E. Krieger Publishing Company (1978), p. 325.

Abeber J et al., "Feature-Based Extraction of Plucking and Expression Styles of the Electric Bass Guitar," IEEE International Conference on Acoustics (2010), pp. 2290-2293.

Pernica, G., "Dynamic Live Loads at a Rock Concert," Canadian Journal of Civil Engineering, Apr. 2, 1983, pp. 185-191.

Jaatinen J. et al., "Octave Stretching Phenomenon with Complex Tones of Orchestral Instruments," Journal of Acoustical Society America 146 (2019), pp. 1-24.

Russel, Daniel, Acoustics of Ping-Pong: Vibroacoustic Analysis of Table Tennis Rackets and Balls, Journal of Sports Sciences (2018), pp. 2644-2652.

Moghal, M. et al., "Bird Calls Frequency Distribution Analysis to Correlate with Complexity of Syrinx," Journal of Global Biosciences (2015), pp. 2486-2495.

Siupsinkiene, Nora, "Usefulness of Spectral Range Profile in Quantitative Assessment of Voice Quality," International Journal of Clinical & Experimental Otolaryngology (2017), pp. 87-95.

Borch, D., et al., Spectral Distribution of Solo Voice and Accompaniment in Pop Music, Logopedics Phoniatr. Vocol. (2002), pp. 37-41.

Hsu C. et al., "A Comparison of Methods for Multiclass Support Vector Machines," IEEE Transactions on Neural Networks, vol. 13 (2002), pp. 415-425.

\* cited by examiner

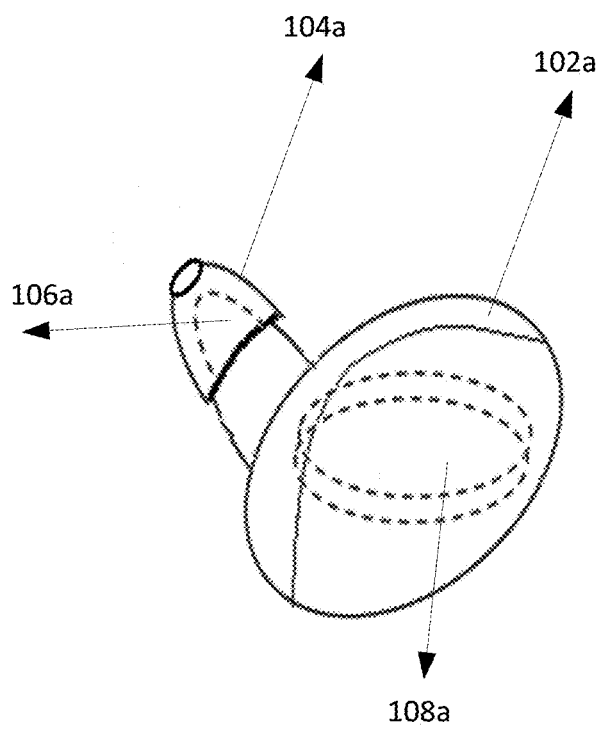
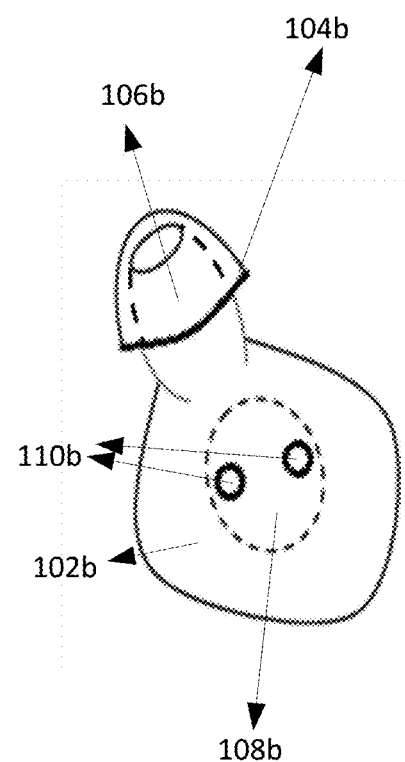
FIG. 1A
FIG. 1B

METHOD AND SYSTEM FOR CUSTOMIZED AMPLIFICATION OF AUDITORY SIGNALS BASED ON SWITCHING OF TUNING PROFILES

BACKGROUND

Over the years, devices for amplification of auditory signals, whether to help a hearing-deficient user, for entertainment applications, or in other cases, have progressed manifold. The need for such devices on the first place arises where an individual may have hearing loss resulting in a reduced sensitivity to sound, or when a user for another reason may want to amplify sound at certain frequencies. In the case of hearing loss, such a hearing loss may be classified as, e.g., a sensorineural hearing loss, resulting from damage to the hair cells and synapses of the cochlea, or a conductive hearing loss, where sound is not transferred properly through the outer and middle ear, or a mixed hearing loss involving deficiencies in both sensorineural and conductive hearing, etc. Sensorineural loss is the most common type of hearing loss, and typically occurs due to aging, exposure to loud noise, injury, disease, hereditary conditions, etc.

Mainly in the $18^{th}$ and $19^{th}$ centuries, to aid users needing such amplification of sound, crude mechanical devices functioned in a passive manner, by gathering sound energy through a cone-like structure (e.g. ear horns) and directing it into the ear canal. Then, in the latter half of the $20^{th}$ century, hearing aids started to be developed as wearable instruments, as the first "all-transistor" hearing aids were offered in 1952, replacing vacuum-tube based hearing aids which operated in the first half of the $20^{th}$ century.

Subsequently, in the 1970s, as the microprocessor was created, the digital hearing aid was able to be miniaturized, and self-contained digital hearing aids using high-speed digital array processors started to appear on the market. By the 1980s, in such hearing aids, miniaturized full digital computer chips using custom digital signal processing chips very large scale integrated (VLSI) chip technology enabled real-time processing of audio signals. These hearing aids are used till date today. Such hearing aids may be found, e.g., in U.S. Pat. No. 4,548,082, by Engebretson et al. The form factor of these components is an electronics module contained in a behind-the-ear (BTE) unit which connects to an ear mold fitted in the ear canal. An audiologist or other technician is able to program the device through a serial interface, and thus in this manner a user is able to listen to amplified sounds.

However, these hearing aids are analog because they work by increasing the volume of continuous sound waves, meaning the user is hearing all of the sounds around them, including ones that they may not necessarily want to hear. That is, they are amplifying a continuously varying electrical signal, which poses a problem. It is also very tough for such hearing aids to have dynamic programmable settings harnessing real-time processing power with such algorithms such as machine-learning to adjust or tweak pre-set user profiles in real-time based on sensed data. Rather, most are pre-set by an audiologist and restricted to such settings only.

Furthermore, such hearing aids also cannot use sensors such as accelerometers or gyroscope for adjustment based on axis-based motion sensing, etc. Neither do they have GPS receivers to produce location-based adjustments. Consequently, wearers of such hearing aids may suffer particularly in a loud environment, or environments with substantially different levels in noise than a normal environment. As reported in the Journal of Deaf Studies and Deaf Education, "noisy environments . . . can be overwhelming and impact [users'] ability to concentrate on teammates and instructions." Grandpierre, V., et al., "*School-aged Children with Mild Bilateral and Unilateral Hearing Loss: Parents' Reflections on Services, Experiences, and Outcome*," J Deaf Stud Deaf Educ. 2018 April; 23(2): 140-147. Explicit user feedback indicates some schoolchildren "can't hear anything properly [in a school gym] in that kind of a situation." Id. Furthermore, traditional hearing aids cannot dynamically adjust audio signals to give the user clear non-distorted sound in a live auditory experience which may have larger amounts of distorted noise than in normal use, such as while participating in karaoke or at a music concert. Each such experience may be small-scale or large-scale, the acoustics may be different depending on the venue, etc., and there are other such factors which are present and which cannot be accounted for precisely by commonly found hearing aids or other auditory amplification devices.

In addition to the above-mentioned technical deficiencies of the hearing aids are incapable of, from an aesthetic point of view, there is also a certain societal stigma associated with the wearing of a behind the ear (BTE) hearing device or a visible custom molded earpiece lying in the ear, which may lead to unwanted or unpleasant comments from others observing a user of such a device. For example, as pointed out by several parents of such device users, "Events of bullying [regarding the child's hearing aids] seemed to emerge in early grade school." Id. In particular, the stigma of using such a device results in such isolation that "Parents have reported problems with social functioning including a lack of social support, few friends, and that children avoid group settings such as parties." Such stigmas are not limited to a school setting, and also occur in adult life. In fact, they occur to such an extent that hearing aid manufacturers, such as SIGNIA™, etc., clearly state " . . . adults—with hearing loss are the targets of bullying. Whether they're made fun of for not being able to hear well or because they wear hearing aids, bullying is a problem that many with hearing loss regularly encounter." "Protecting Kids (and Adults) with Hearing Loss Against Bullying," Signia USA. 2017 Oct. 3; signiausa.com/blog/protecting-kids-adults-hearing-loss-bullying/.

Finally, traditional devices used for amplification of auditory signals, such as commonly-found hearing aids, are prohibitively expensive due to their custom-made nature. Due to a custom molded ear piece, behind-the-ear custommade hearing aid computing module components, etc., costs typically range upwards of $1000. As a result, it may be difficult for many people, such as those in lower-income families, etc., to afford such devices.

BRIEF DESCRIPTION OF THE DRAWINGS

The accompanying drawings are incorporated herein and form a part of the specification.

FIG. 1A is a sectional perspective view of an example earpiece for communicating with a communication module, in accordance with some embodiments.

FIG. 1B is a sectional top view of the example earpiece of FIG. 1A.

In the drawings, like reference numbers generally indicate identical or similar elements. Additionally, generally, the left-most digit(s) of a reference number identifies the drawing in which the reference number first appears.

DETAILED DESCRIPTION

Figure 2:
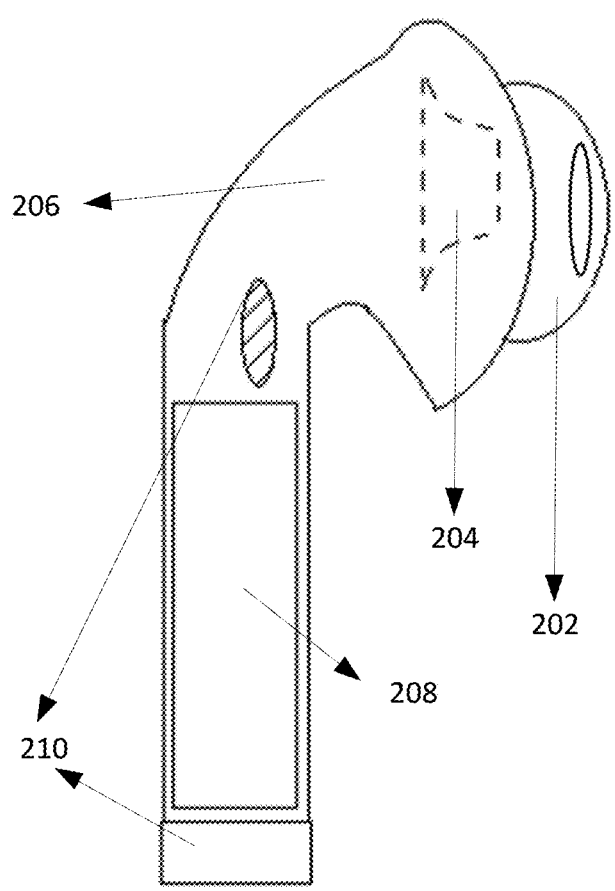
FIG. 2 is a side view of an alternate example of an earpiece for communicating with a communication module, in accordance with some embodiments.

Provided herein are system, apparatus, device, method and/or computer program product embodiments, and/or combinations and sub-combinations thereof, for performing a selective profile-based modulation of a received audio signal from an earpiece, via a communication module, per a profile-changing regime, and outputting the results of the modulation to a single device or a plurality of devices.

FIGS. 1A and 1B are diagrams illustrating a sectional perspective view 100a, and a top view 100b, respectively of an example earpiece that is contemplated to be used according to some embodiments of the invention. This earpiece is shaped as a rounded triangular prism body 102a with a perpendicular extension. The earpiece body is shaped as a rounded rhombus 102b along its cross-section, as seen from a top view with the perpendicular extension extending from the upper end of the rhombus. A silicone or soft rubber tip (104a, 104b) with a torus-shaped upper opening covers the upper end of the extension. Housed within the extension is an onboard electronics module (106a, 106b) containing a processor, a chipset that may optionally be water proof for enhanced protection, and a wireless communications module that allows communication between the earpiece and a computer, smartphone, or other computing device. The electronics module (106a, 106b) may also optionally contain flash memory, one-time programmable memory, and/or other RAM or ROM memory, in any permutation/combination. Two of the earpieces shown in FIGS. 1A and 1B that are identical in structure can be used synchronously, with one going in each ear. Each earpiece may be of the structural form shown in FIGS. 1A and 1B. That is, each ear's earpiece would have its own body, tip, onboard electronics module, etc., and in this way they would form a set, helping to both deliver sounds to a user and record sounds from the user's surrounding environment.

Wireless communications of the onboard electronics module (106a, 106b) may follow e.g., the BLUETOOTH™ protocol, and the earpiece of FIGS. 1A, 1B may be able to transmit audio or receive signals through such a protocol to a device with which it is wirelessly connected. The earpiece has a battery (108a, 108b) which may be in a thin cylindrical form, with a short longitudinal length, as shown in FIG. 1A. Because the battery (108a, 108b) is in this shape it is able to cover a majority of the surface area of the rounded prism design, being efficient with capacity in a short space, as shown in the top-view of FIG. 1B. The battery (108a, 108b) may be, e.g., a lithium-ion button battery with a voltage in the range of 3.6V to 4.5V. Furthermore, the earpiece may contain a pair of microphones 110b on its peripheral upper side, as shown in the top view of FIG. 1B. These microphones 110b may be able to record sound nearby, and transmit the recorded sound through the earpiece's wireless communications module of the electronics module (106a, 106b) to a connected device. Because there are two microphones 110b present and adjacent to each other as shown in FIG. 1B, they can be used for noise cancellation. Sound-energy dispersion operates in an inverse square manner over distance, where a mic more distant from a sound source will receive exponentially less energy from a close sound source than a mic that is closer to a sound source. This is particularly true for desired sound proximate to the mic as compared to ambient noise (which is captured more equally by both mics), and thus as a result noise cancellation can occur. In this manner, the difference in desired sound proximate to the mic can be emphasized and the ambient noise can be reduced.

An alternate example of an earpiece that is contemplated to be used according to some embodiments of the invention is shown in FIG. 2. This figure shows a side view of an earpiece that has an elongated vertical body 206, in a long cylindrical form, which is curved radially inwards towards a user's ear at the top of the cylinder. This earpiece may also be used in a set of two structurally identical earpieces, each of the structure as shown in FIG. 2, and each going into one ear (left or right) of a user, respectively. In this model, the earpiece overall has a cylindrical form with a radially inward bending hook-shape, and at the radially innermost end of the hook-shape, facing an ear of a potential wearer of the earpiece, there is a silicon tip 202. The tip 202 has a torus-shaped opening at an angle of approximately 90 degrees from the longitudinal axis of the earpiece along its cylindrical portion. This tip 202 thus covers the radially innermost edge of the earpiece (with respect to a user), which may be inserted in a user's ear. Due to its elongated shape the earpiece may be able to fit in a longer battery 208 than the battery of the earpiece of FIGS. 1A and 1B. The battery 208 may also be, e.g., a lithium-ion battery. Although the voltage may be in the same range (e.g., 3.6 to 4.5V), due to its longer shape, this battery may have a greater storage capacity in terms of milliampere hours (mAh) than the battery of FIGS. 1A and 1B. However, the form factor due to its longitudinal length is larger than the earpiece of FIGS. 1A and 1B, and thus may be less space efficient.

As with the earpiece of FIGS. 1A and 1B, the earpiece of FIG. 2 may also house an onboard electronics module (204) containing a processor, a chipset that may optionally be water proof for enhanced protection, and a wireless communications module that allows communication between the earpiece and a computer, smartphone, or other device. The electronics module (204) may also optionally contain flash memory, one-time programmable memory, and/or other RAM or ROM memory, in any permutation/combination. Further, as with the earpiece of FIGS. 1A and 1B, wireless communications of the onboard electronics module (204) may follow e.g., the BLUETOOTH™ protocol, and the earpiece of FIG. 2 may also be able to transmit audio or receive signals through such a protocol to a device with which it is wirelessly connected. The earpiece may contain a pair of microphones 210. However, in contrast to the adjacent microphones of the earpiece of FIGS. 1A and 1B, the microphones 210 of the earpiece of FIG. 2 are spaced further apart, on either side of the long battery 208. Because there are two microphones 210, as with the prior earpiece of FIGS. 1A and 1B, these microphones can be used for noise cancellation. However, because they are farther apart, and as explained sound-energy dispersion operates in an inverse square manner over distance, there is a greater contrast in sound over a farther distance with the earpiece of FIG. 2. This greater contrast, in turn, allows for noise cancellation to occur to a greater degree than it does with FIGS. 1A and 1B. However, a user still may want to use the earpiece of FIGS. 1A and 1B for its compact form factor and space efficiency.

In this manner, either of the above earpieces, whether the earpiece of FIGS. 1A and 1B, or the earpiece of FIG. 2, may be used according to embodiments of this invention. Both of these earpieces can aid in the amplification of auditory signals, and provide numerous advantages over traditional devices such as hearing aids or custom molded earpieces. First, earpieces such as those of FIGS. 1A and 1B, or FIG. 2, do not have custom-designed or molded physical components which are unique to a user (such as ear-shape, or a custom-tuned BTE electronics model). As a result, the production cost of earpieces such as FIGS. 1A and 1B or FIG. 2 are lower than that of traditional devices, and are much more affordable from an economic point of view.

Second, the earpiece of FIGS. 1A and 1B, or the earpiece of FIG. 2, in conjunction with an additional BLUETOOTH™ capable device, such as a smartphone, is able to provide tailored profile-based auditory tuning for each user using machine learning or other decision-making algorithms. In this manner, the earpieces serve as a powerful vehicle for delivering optimized sound to an end-user in an affordable manner. As shown in the compact and space-efficient designs of FIGS. 1A and 1B, or the elongated design of FIG. 2, such earpieces do not have any behind the ear components, or custom-molded in-ear components. Because the earpieces do not have these components, which are tell-tale signs of traditional devices that aid in the amplification of auditory signals, such as hearing aids, it is far less likely that wearers of these earpieces would be bullied or hear unwanted comments, compared to the plight of traditional hearing-aid wearers as described above. Rather, because such earpieces can also be used as conventional headphones, are functional and aesthetically-pleasing, and are considered part and parcel of popular culture across the world, they can serve as a fashion accessory. In addition, earpieces used in the following embodiments are not limited to those shown in FIGS. 1A and 1B, and FIG. 2, and may also include other wirelessly connectable earpieces with a battery, microphones, and an onboard electronics module, which optionally do not have any behind the ear electronic components, or custom-molded in-ear components. Other alternatives may also be envisioned, such as sunglasses or prescription glasses that are integrated with wirelessly connectable earpieces with a battery, microphone, and onboard electronics module, with no custom-molded in-ear components.

Figure 3:
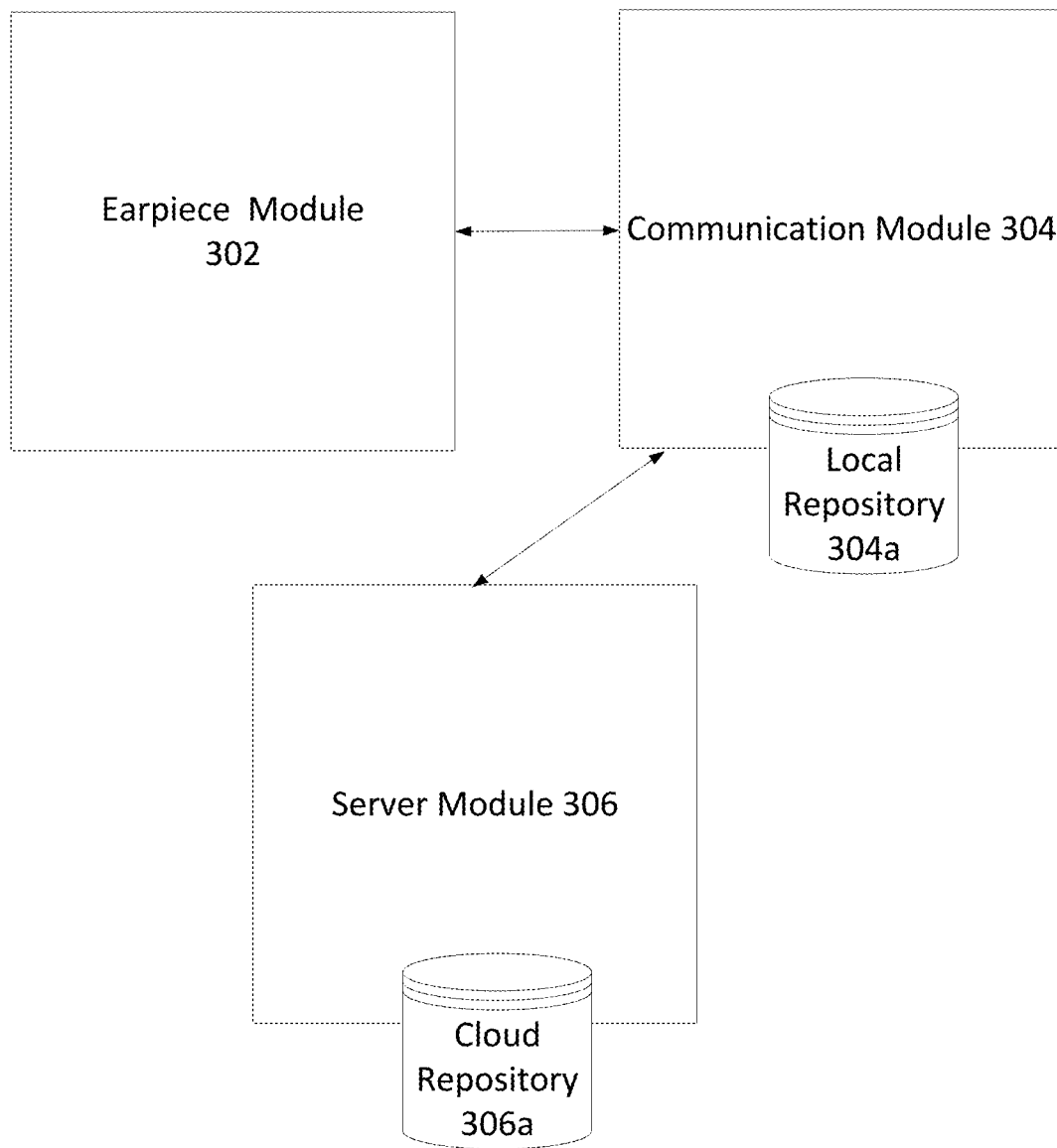
FIG. 3 is a block diagram of a system arrangement that includes an earpiece module, communication module, local repository, server module, and cloud repository, according to some embodiments.

FIG. 3 shows a block diagram 300 illustrating a system arrangement for selective modulation of audio signals, according to an embodiment. Block diagram 300 describes the interaction between an earpiece module 304, a communication module 304, and a server module 306. The earpiece module may comprise an earpiece of the type described in FIGS. 1A and 1B, of the type described in FIG. 2, or another wirelessly connectable earpiece as described above. The earpiece module 304 may be connected in a bidirectional manner to the communication module 304. In an embodiment, the communication module 304 may comprise a computing system, such as a smartphone, with a processor, wireless communications module capable of using BLUETOOTH™ protocol, GPS sensor, accelerometer, camera, on-board primary memory (random access memory or RAM), and secondary memory for internal storage, such as flash memory or a solid state drive (SSD). The communication module may also have a local repository 304a. In an embodiment the communication module 304 may also have a wireless communications module capable of using fourth-generation (4G) or fifth generation (5G) long term evolution (LTE) protocols, as well as standard IEEE 802.11-based protocols (Wi-Fi), for connecting to other devices in a local network (intranet), or on the internet.

The local repository 304a may comprise a database, wherein to implement the local repository 304a, as an example approach, for storing and accessing its constituent data objects, the communication module 304 may use an in-memory database in primary memory (RAM) with a transaction log for persistence being stored in secondary memory. Alternately, the communication module 304 may use secondary memory (flash memory or a SSD) entirely to store the repository. As a still further alternative, the communication module may implement a more frequently accessed portion of the data objects in the primary memory (RAM) of the communication module 304, and a less frequently accessed portion of the data objects in secondary memory (flash memory or a SSD).

In other embodiments, the communication module 304 may also comprise other devices with a processor, wireless communications module capable of using BLUETOOTH™ protocol, on-board primary memory (random access memory or RAM), and secondary memory for internal storage, such as flash memory or a solid state drive (SSD). These other devices may include, e.g., a tablet, phablet, standalone PC, television, refrigerator monitor, monitors in smart devices, and the like. In addition, other forms of secondary memory, such as an HDD, etc., are also envisioned to be used.

As further shown in FIG. 3, the communication module 304 is connected in a bidirectional manner with the server module 306. Like the communication module 304, the server module 306 may also comprise a computing system with a processor, wireless communications module capable of using BLUETOOTH™ and/or Wi-Fi and/or LTE protocols, on-board primary memory (random access memory or RAM), and secondary memory for internal storage, such as an HDD, flash memory or a solid state drive (SSD). The server module 306, in an embodiment, may also comprise a plurality of computing systems, which are all linked together over a network intranet, or the internet, to pool computing resources.

As with the communication module 304, the server module 306 may also have its own local repository, and is designated as cloud repository 306a. The cloud repository 306a may comprise a database and may be structured in the same manner as the local repository 304a. That is, the database of the cloud repository 306a, when implemented by the server module 306, may be present in the primary memory, secondary memory, or both of a computing system, or constituent data objects may be spread across the primary and secondary memory of several computing systems within the server module 306, as a result of the possible arrangement of pooled computing resources described above.

In this manner, as shown in FIG. 3, the earpiece comprising the earpiece module 302 may communicate with the communication module 304, and the communication module 304 may in turn communicate with the server module 306. Because the earpiece module 302 and communication module 304 are likely to be proximate to a single user, wherein e.g., a single user may be wearing an earpiece (earpiece module 302) on his ear and may be also wearing a smartphone (communication module 304) or having it placed nearby, in an embodiment communication between these two devices may occur using the BLUETOOTH™ protocol. It is also possible, in other embodiments to use a physical data cable (such as a USB cable), Wi-Fi, etc.

In contrast, although possible, a server module 306, although used by a user, is not likely to be proximate to a user. For example, the server module 306 may comprise a cloud environment on the internet, wherein data may be sent from the communication module 304 to the server module 306 to be stored as part of cloud resources in a computing system or a plurality of computing systems that are pooling resources. As a result, because the use of the BLUETOOTH™ protocol is limited by distance, in an embodiment, LTE or Wi-Fi protocol is used by the communication module 304 to send data over a network, or over the internet, to store data in or retrieve data from the cloud repository 306a of the server module 306. However, in an embodiment where the server module 306 is proximate to the communication module 304, the BLUETOOTH™ protocol may also be used. Utilizing this arrangement, audio signals may be first captured by the earpiece 302, and then sent to the communication module 304. At the communication module 304, a user may utilize an application, executing from the communication module's primary memory, secondary memory, or a combination of both, to modulate the audio signals captured by the earpiece 302 and received by the communication module. After modulating and processing the audio signal, the communication module 304 can then use the BLUETOOTH™ protocol to send an audio signal back to the earpiece module 302. Through such an application, the communication module 304 can also save a processed audio signal to the local repository 304a, or the cloud repository 306a. In addition, the communication module 304 can sync data from the local repository 304a to the cloud repository 306a, as well as from the cloud repository 306a to portions of primary and/or secondary memory of the communication module 304, or from the cloud repository 306a to the local repository 304a. In this manner, the communication module 304 can also read saved audio signals from the cloud repository 306a, optionally process these signals, and then send these signals back to earpiece module 302 for user playback.

Figure 4:
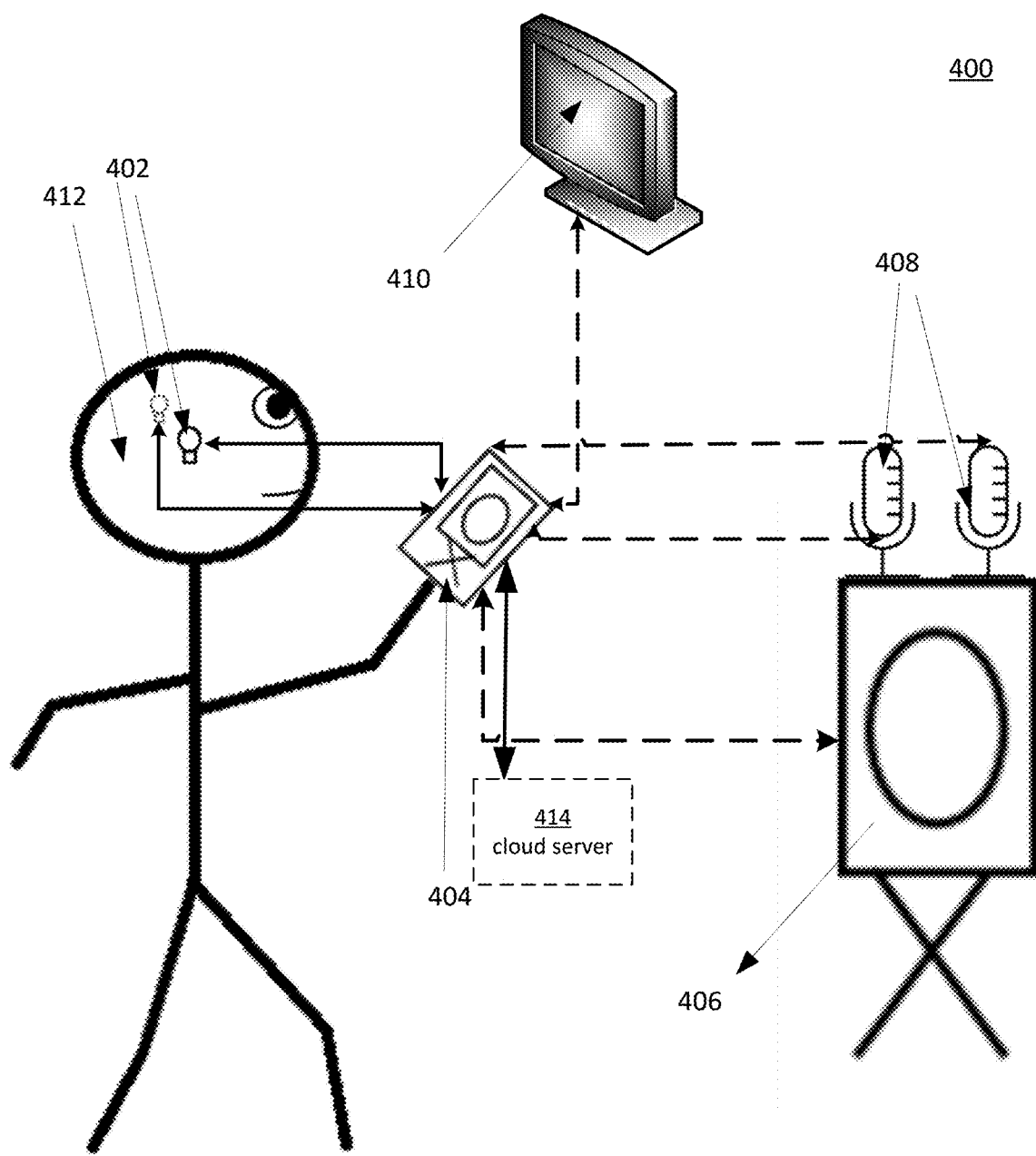
FIG. 4 is a diagram showing how various components of a system arrangement may interact with each other as well as the external surrounding environment, according to some embodiments.

FIG. 4 shows a diagram describing an in-use arrangement 400 where a system of the type as shown in FIG. 3 may be used by an actual user. A user, as depicted by a stick-figure 412 in FIG. 4, may be wearing an earpiece 402 as shown. As described above, the earpieces 402 would be worn on both ears, and thus another earpiece 402 is shown behind the user's head, as indicated by the dotted lined element 402. Both of these earpieces 402 correspond to the earpiece module 302 as explained above, and are of the type shown in FIGS. 1A and 1B, in FIG. 2, or of another wireless earpiece as described above. Both of these earpieces 402 are synchronized, and wirelessly communicate with a smartphone, as depicted by the bidirectional links in FIG. 4 between the earpieces 402 and smartphone 404. The smartphone 404 may correspond to a communication module 304 in FIG. 3, as explained above, where communications between the earpieces 402 and the smartphone 404 may proceed through the BLUETOOTH™ protocol.

The smartphone 404, may in turn communicate with a cloud server 414 as shown by the bidirectional link between smartphone 404 and cloud server 414, which is depicted by a solid line, as with the link between earpieces 402 and smartphone 404, to indicate that this link is present. However, the cloud server 414 is shown with a dashed line to indicate that the server is not necessarily present in the user's immediate surroundings, and may not be proximate to the user. For example, the smartphone 404, as described above, may use LTE or Wi-Fi protocol to send or receive settings or audio signals from the cloud server 414, where the cloud server in an embodiment may be located far away. In this manner, the cloud server 414 corresponds to the server module 306 in system 300, as described in FIG. 3 above.

In addition, there are several possible and optional links depicted by dashed bidirectional lines with arrows at either end in FIG. 4. These optional links indicate, e.g., that a smart television 410 may be connected with a smartphone 404 through a BLUETOOTH™ protocol. As mentioned above, it is also possible in other embodiments of system 300 that instead of a smartphone 404, another computing device may be used as the communication module 304 and connected to smart television 410. Similarly, other devices such as omnidirectional or cardioid microphones 408, which may be optionally BLUETOOTH™ compatible, may also be directly connected to a smartphone 404.

In this manner, when using an application for audio processing on a smartphone 404 corresponding to a communication module 304 as described above, the smartphone 404 may receive audio signals from a direct wireless connection with devices such as smart television 410 or microphones 408 instead of, or in addition to, audio picked up by microphones on the earpieces, such as earpieces 402. As a result, as opposed to, e.g., processing audio picked up from a television 402 in an analog manner by the microphone of the earpiece 402, receiving the audio directly in a digital manner from the television 402 delivers a more robust audio signal with less distortion for better sound quality. Consequently, sound from microphones 408 and/or the smart television 410 can also be delivered directly over wireless protocols such as BLUETOOTH™ or Wi-Fi to the smartphone 404 for audio processing, instead of or in addition to sound picked up by the microphone of the earpiece 402.

Figure 5A:
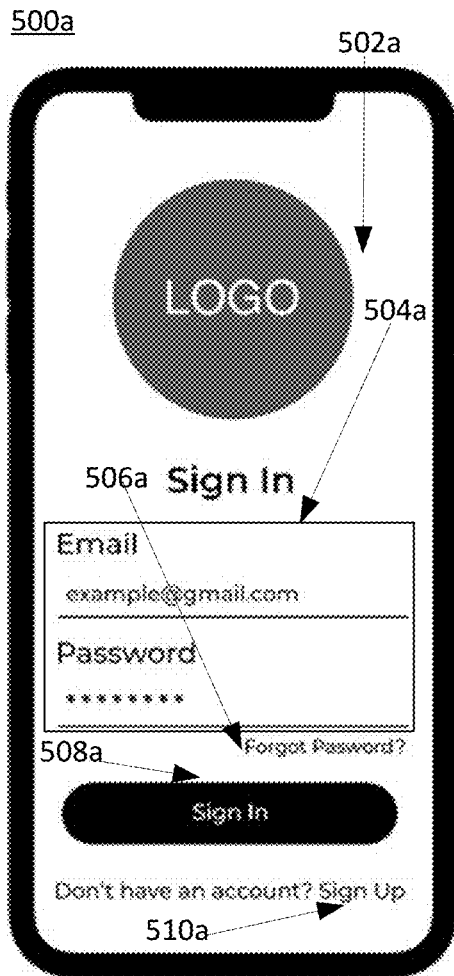
FIG. 5A is a diagram of a graphic user interface showing a password sign in screen, according to some embodiments.

FIG. 5A shows the diagram of a graphical user interface upon execution of an application on a smartphone such as smartphone 404 in FIG. 4, wherein smartphone 404 may be part of an arrangement of the same type as system 300, shown in FIG. 3. In this case the smartphone 404 would correspond to communication module 304. A smartphone application in this manner may be used for processing audio signals from and to an earpiece of the same type as earpiece 402 described in FIG. 4, serving as an earpiece module 302 in FIG. 3. At the start of execution of such an application, a log-in screen 500a may be shown, with a background 502a and logo, and a sign-in portion 504a. The sign-in portion may include a username/email and password prompt. It is helpful in an application for processing audio on a smartphone 404, or other computing system in other embodiments, for data to be segregated by user. For example, there may be several users on one smartphone, such as members of a family, spouses, parents, children, etc. In such an embodiment, users may not want other users to access their private data, application settings, or audio recordings, etc. In that case, segregating each user session and having an authentication screen serves to prevent other family members from inadvertently accessing a specific user's data. The application may revert to such a screen 500a after predetermined periods of time with no user activity, to protect user data. The screen 500a may also have a link 506a that the user can click in case they have forgotten their password. Upon typing in their username/email and password in the prompts of portion 504a, a user may click on button 508a to sign in. If the user does not have an account, they may click on a sign up link 510a. Upon the clicking of such a link, the smartphone 404 may use LTE/Wi-Fi protocols to access the internet and transition to display a form for the user to fill out and submit. Once the user completes this process, the smartphone 404 may add their user name and password data to a list of usernames and passwords in an associated cloud repository 306a (via communication with a respective server module 306 hosting an associated cloud repository 306a, such as connected cloud server 414) or local repository 304a.

Once the user clicks on button 508a, the data they have input into sign-in portion 504a, such as their username/email and password, may be stored and sent from a smartphone 404 to a connected cloud server 414 serving as a server module 306. At the server module 306, verification of the username/email and password can take place, where the processor of the server module 306 matches the username and password sent against a list of usernames and passwords in an associated cloud repository 306a, and a positive or negative result of such a verification can be sent back to the smartphone 404 serving as a communication module 304. If positive verification is received, the graphical user interface can then transition to the screen shown in FIG. 5B or alternately FIG. 5C. On the other hand, if negative verification is received, the graphical user interface can display screen 500a again with all fields in portion 504a cleared out. The number of times negative verification is received can be counted, and if negative verification is received a predetermined number of consecutive times (e.g., 3 or 4), then the account may be locked, and in the area of 504a instead of email and password prompts, a message may be displayed asking the user to contact a system administrator. In another embodiment, the verification process, instead of taking place in the server module 306, may instead take place locally at the communication module 304, or smartphone 404, wherein where the processor of the communication module matches the username and password sent against a list of usernames and passwords in an associated local repository 404a, which may be present as described above in the primary memory, secondary memory, or both, of the smartphone.

Figure 5B:
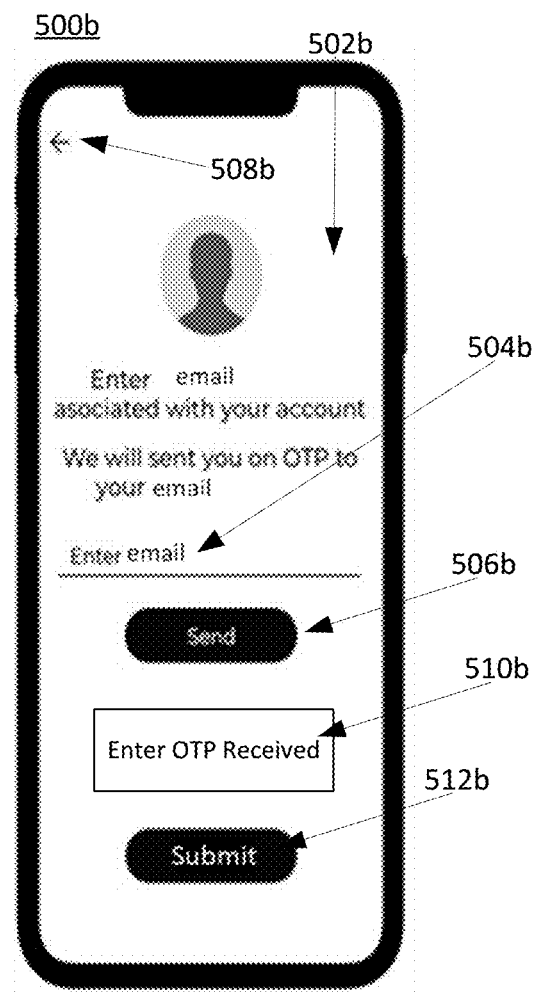
FIG. 5B is a diagram of an exemplary graphic user interface showing a two-factor authentication screen, according to some embodiments.

As shown in FIG. 5B, upon clicking button 508a to sign in, in FIG. 5A, and receiving positive verification from either the associated smartphone 404 serving as communication module 304 (local verification), or connected cloud server 414 serving as server module 306 (cloud verification), the user may be prompted with an additional verification screen 500*b*. In this screen, the user is prompted to input an email associated with their account as shown in background 502*a*. The user can input their email in an input field 504*b*, and click the send button 506*b*. Whichever of the associated smartphone 404 (local verification), or connected cloud server 414 (cloud verification), respectively, that processed the positive verification above, may receive the user's email. Upon receipt of the user's email address, the smartphone 404 or connected cloud server may send an alphanumeric one-time password (OTP) for further verification. This serves as a second-layer of verification, commonly called two-factor authentication, which prevents users which may have seen another user type in their username/password from forging such credentials for unauthorized access to the other user's account. The user is able to enter their email in input field 504*b*, and once they click on the Send button 506*b*, the data of input field 504*b* is sent to the associated smartphone 404 (local verification), or connected cloud server 414 (global verification), respectively.

As with the verification process after submission of data in FIG. 5A, here too a similar verification process occurs. Once the data of input field 504*b* is received by the associated smartphone 404, or connected cloud server 414, the associated smartphone 404 (local verification) or connected cloud server 414 (global verification), depending on the configuration used, sends an OTP verification code to the email address value contained within the input field data, in the form of an email. Upon receipt of this email, the user is then prompted to enter this OTP code received in field 510*b* of screen 500*b*. Finally, the user can submit the OTP code they have entered in field 510*b* by clicking the Submit button 512*b*.

Upon clicking the Submit button 512*b*, depending on the embodiment as described above, the OTP entry by the user in field 504*b* is sent to either the smartphone 404 (local verification), serving as a communication module 304, or connected cloud server 414 (cloud verification), serving as a server module 306, respectively. The OTP entry is then compared to a correct OTP entry present in the associated local repository 304*a* of the connected module 304 or cloud repository 306*a* of the server module 306. If the OTP is correct, the application logs the user into a segregated data session and transitions to the home screen shown in FIG. 7. On the other hand, if the OTP is incorrect, the screen 500*b* may be shown again. If incorrect OTP verification occurs a predetermined number of consecutive times (e.g. 3 or 4), then the account may be locked, and in field 504*b*, instead of the email prompt being displayed, a message may be displayed asking the user to contact a system administrator. Finally, a user may click 508*b* if for some reason they need to go back to screen 500*a* and start the process over. This may happen, for example, when a user may have to leave their phone unexpectedly and wants the security of logging back out.

Figures 6A, 6B:
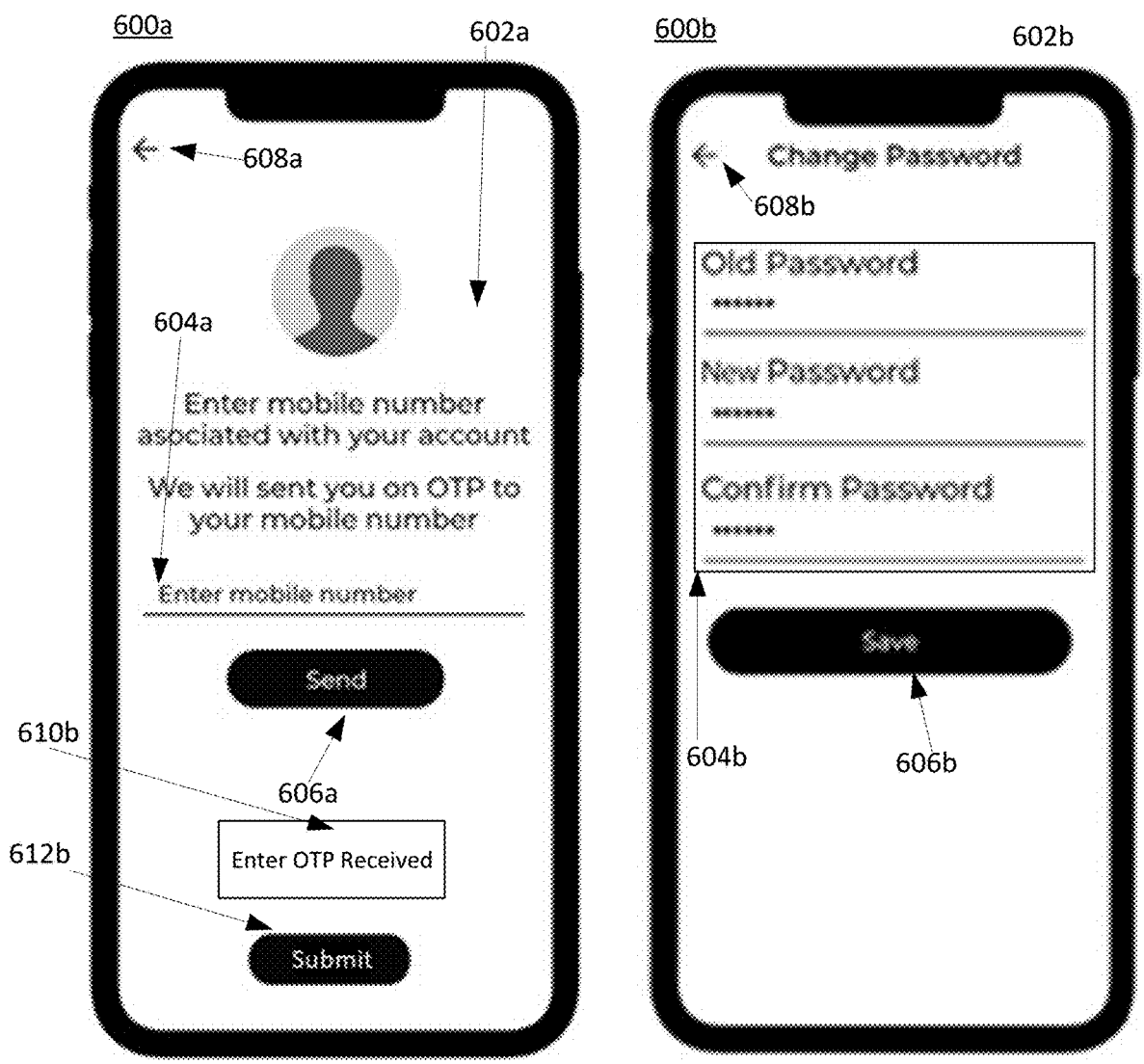
FIG. 6A is a diagram of an exemplary graphic user interface showing an alternate two-factor authentication screen, according to some embodiments.
FIG. 6B is a diagram of an exemplary graphic user interface showing a change password screen, according to some embodiments.

FIG. 6A shows an alternate additional verification screen 600*a* that may be shown instead of screen 500*b*, after the transition upon positive verification receipt from screen 500*a*. In this screen, components are analogous to those shown in 500*b*. This includes the field 604*a* for inputting the user's identifying information, the button 606*a* for submitting the user's identifying information, the field 610*b* for inputting the received OTP code, the button 612*b* for submitting the received OTP code, and the arrow 608*b* for going back to the log in screen 500*a*.

However, as shown in the prompt in background 602*a*, the main difference in FIG. 6A is that instead of sending an OTP to an email, an OTP is sent in the form of a text message, from either the smartphone 404, or connected cloud server 414, respectively, to a user's phone. Where there are multiple users of a single phone, and the single phone serves as a primary smartphone 404 for all of the multiple users, they may choose to use OTP through email as shown in FIG. 5B instead of through texting a phone as shown in FIG. 6. This is because if an OTP is sent by text message to the same phone, there is no differentiation among the same phone's users, and one user can receive another user's OTP, defeating the purpose of second-factor authentication. However, if the user is the only user on his/her phone, and/or if the user has another phone which only they use, they can easily receive an OTP to their phone number, which is more convenient than receiving an email. Thus, either the embodiment of 600*a* or the embodiment of 500*b* may be used as additional verification screens, depending on user preference. Finally, if the application is used in a verifiably secure environment, then in another embodiment, there is no additional verification screen, and upon positive verification from screen 500*a*, the application transitions directly to FIG. 7.

FIG. 6B shows a change password screen 600*b*. The application transitions to this screen when a user clicks the Forgot Password link 506*a* described above upon forgetting their password. In this case, the user is prompted in a portion 604*b* to confirm their old password, and to enter a new password and confirm the new password. Alternately, to confirm user identity, upon clicking the Forgot Password link 506*a*, the application may transition to either screen 500*b* or 600*a* to verify through OTP that the user is in fact the same user as the one who created the password. Upon successful verification through OTP, the screen 600*b* may then be shown, but only the new password and confirm password fields may appear in 604*b*, as it is possible the user does not remember their old password. In this case, the user can successfully verify their identity and change their password in a safe manner.

When they have inputted the new password and confirmed the new password to their satisfaction, they can click the save button 606*b*. Upon the user clicking the save button, the values of field 604*b* are submitted to the smartphone 404 or the cloud server 414, and stored in the local repository 304*a* of the smartphone or the cloud repository 306*a* of the cloud server 414, respectively. The new password field may be checked against the confirm password field to make sure they are matching, and if applicable, the old password can be matched against an old password present in the local repository 304*a* or the cloud repository 306*a*, respectively. If the new password field matches the confirm password field, and if applicable, if the inputted old password field matches the old password in the local repository 304*a* or the cloud repository 306*a*, then positive verification is sent to the application on the smartphone 404. If there is a mismatch in either of the above comparisons, as applicable, then a negative verification is sent to the application on the smartphone, and the screen 600*b* can be re-displayed with all input fields in 604*b* cleared.

As with the previous screens, the number of times negative verification is received can be counted, and if negative verification is received a predetermined number of consecutive times (e.g., 3 or 4), then the account may be locked, and instead of the mobile number prompt being displayed in field 604*a*, a message may be displayed asking the user to contact a system administrator. Further, if for whatever reason the user needs to return to the log-in screen in FIG. 5A, they can click arrow 608*b*.

Figure 7:
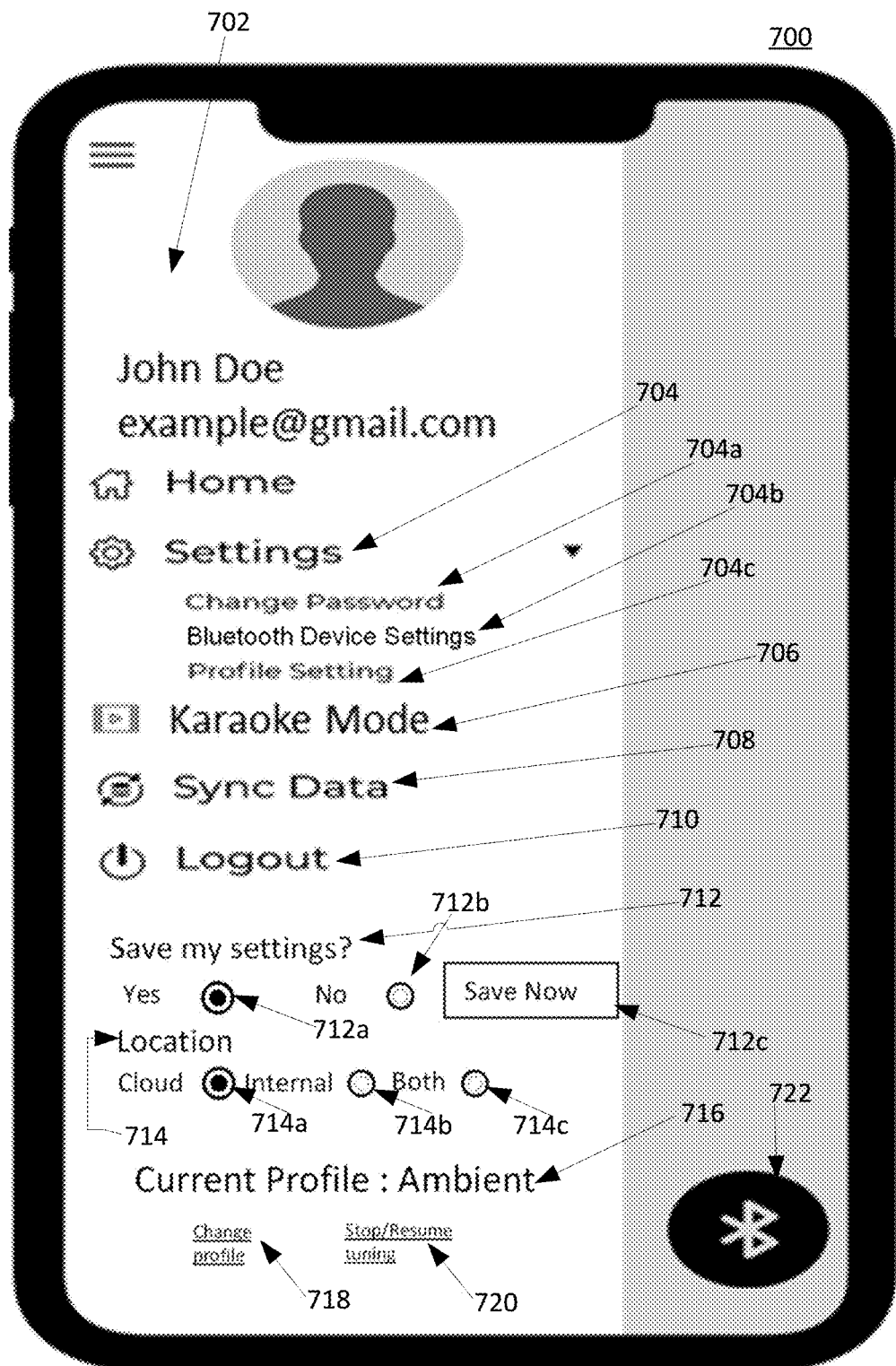
FIG. 7 is a diagram of an exemplary graphic user interface showing a menu of options at a home screen, according to some embodiments.

Once the user has successfully logged-in, as described in the previous screens of FIGS. 5A-6B, the application of smartphone 404 then enters a segregated data session and can proceed to a home screen 700 as shown in FIG. 7. Here, as shown in background 702, personal identifying information of the user, such as username/name/email, or a profile photo, may be displayed at the top of the screen. This is followed by functional buttons 704-710.

Below the personal identifying information of background 702, the buttons 704-710, in order from ascending to descending, are Settings 704, Karaoke Mode 706, Sync Data 708, and Logout 710. Upon clicking the settings button 704, an expanded submenu with items 704a-704c appears (or disappears if it's already shown and the user clicks the settings button 704 again). Each of the items 704a-704c is clickable, and each has a different function. If item Change Password 704a is clicked, the application transitions to the change password screen 600b in FIG. 6B. The operation of this screen is as explained earlier.

Figure 8:
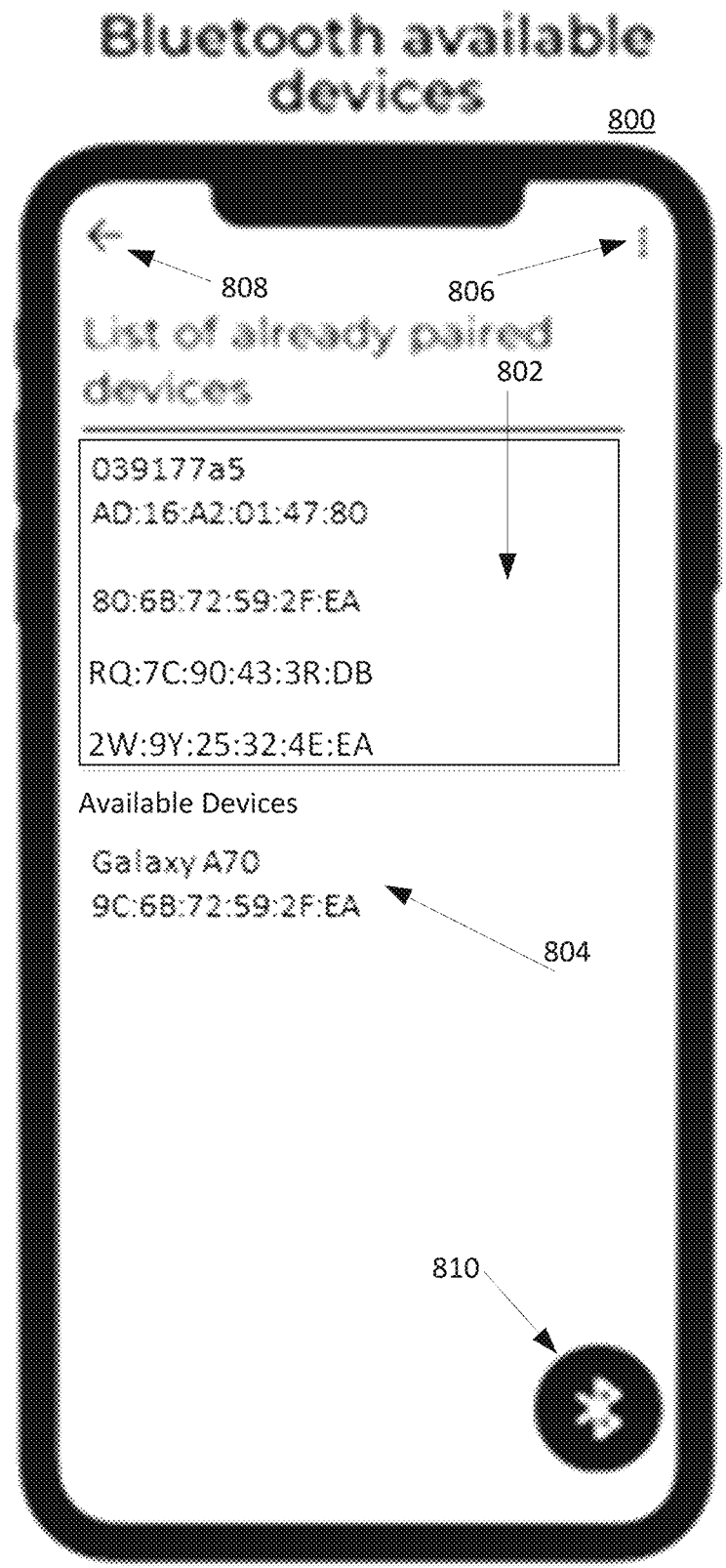
FIG. 8 is a diagram of an exemplary graphic user interface for configuring connections to available devices, according to some embodiments.

If item Bluetooth Device Settings 704b is clicked, then the application transitions to a Bluetooth devices screen 800, as shown in FIG. 8. The same effect is also achieved when the Bluetooth button 722 on the home screen 700 is clicked. At the Bluetooth devices screen 800, a user can select and modify the device arrangement of wirelessly paired devices per the BLUETOOTH™ protocol. The List of already paired devices 802 shows already devices that are already paired to a smartphone 404. For example, although in FIG. 8, an embodiment is shown wherein 4 devices are paired, the number of devices paired may be larger or smaller. Among these paired devices may be devices such as wireless earpieces that a user is wearing (e.g. items 402 serving as earpiece modules 302 in arrangement 300), a microphone that may be paired for the purpose of a lecture or for karaoke such as microphones 408, a smart television 410, an external speaker 406 for output, etc. Available Devices list 804 shows which devices may be available to connect, but are not currently connected. In the embodiment of FIG. 8, one device is shown, but this may be any number of devices. Clicking on the three dots 806 or the logo 810 may serve to prompt the smartphone 404 to use its wireless communications module (comprising, e.g., an integrated circuit chip) to scan the phone's surrounding environment to see if there are any additional devices to which the phone may connect using, e.g., BLUETOOTH™ or Wi-Fi protocol, and refresh the Available Devices list 804, accordingly. Once the user has paired devices to their satisfaction, they can click the arrow 808 of screen 800 to return to the main home screen 700.

If item 704c is clicked, in an embodiment, the user is taken through a series of screens to manage their personal profile settings. Through these settings, a profile-changing regime is set and used for determining which tuning profile to use for a user in a given situation. An audio signal retrieved from a microphone such as microphones on the earpieces 402 (with structure corresponding e.g. to FIG. 1A, 1B, or 2 as described above) may be selectively modulated by the smartphone 404 (corresponding to communication module 304) and optionally a connected cloud server 414 (corresponding to a server module 306 associated with communication module 304) according to the chosen tuning profile, and output back to the earpieces 402.

If item 706 is clicked, in an embodiment, the user is taken through a series of screens to choose settings and options for entering a karaoke mode for performing karaoke using the smartphone 404, microphone inputs 408, and outputting sound with mixed inputs in a selectively tuned manner to a set of earpieces 402 (serving as earpiece module 302 connected to the communication module 304 of the smartphone 404), as well as optionally simultaneously outputting sound to a connected speaker 406, using a specialized karaoke tuning profile. Both items 704c and 706 will be described in detail later with respect to their settings, configurations, and associated tuning profiles.

Regardless of the type of mode chosen by the user, whether the application is in karaoke mode 706 or whether it performs selective amplification of audio signals from the user's surrounding environment per settings chosen in 704c, the level of audio that is outputted back to the earpieces, e.g. earpieces 402, should be at a level that is safe for the user. Per guidelines issued by Occupational Safety and Health Administration (OSHA), a safe permissible exposure limit (PEL) level is around 90 dB. Occupational Safety and Health Administration (2008). *Occupational Noise Exposure* (Standard No. 1910.95(b)(2)). Per standards 1910.95 (b)(1) and 1910.95(b)(2) issued by OSHA for occupational noise exposure, once sound levels exceed 90 dB for a specific duration, then safe daily noise exposure levels may be exceeded. In this case, for the application to determine if safe daily noise exposure levels have been exceeded, the following table from OSHA standard 1910.95(b)(2) may be used:

TABLE 1

| Duration (Hours per day) | Sound Level (dB) |
|---|---|
| 8 | 90 |
| 6 | 92 |
| 4 | 95 |
| 3 | 97 |
| 2 | 100 |
| 1.5 | 102 |
| 1 | 105 |
| 0.5 | 110 |
| 0.25 | 115 |

However, if output levels exceed 90 dB for a user of the application, it is likely that the levels will fluctuate over time and not stay static at 90 dB, for a duration of, e.g., 8 hours, as in the first row of Table 1. To account for fluctuating levels of time, when the daily noise exposure is composed of multiple levels of noise exposure, their combined effect may be considered per the following equation:

$$\frac{C(1)}{T(1)} + \cdots + \frac{C(n)}{T(n)} \tag{1}$$

In equation 1 above, C(1) represents the total time of exposure at the first noise level, C(n) represents the total time of exposure at the nth noise level, T(1) represents the total time of exposure permitted at first level, and T(n) represents the total time of exposure permitted at the nth level. For effectively utilizing this equation in the application, for all times that sound is being outputted from the smartphone 404 to connected earpieces 402, the dB level may be recorded at regular intervals (e.g., every second, every 5 seconds, every 30 seconds, every minute, etc.). Then, the dB level may be averaged over a larger period of time (e.g., 10 minutes, 15 minutes, etc.). The average dB level for this larger period of time may correspond to C(n) in Equation 1 above. The T(n) may be found from finding the duration corresponding to C(n) from Table 1 above (e.g., if the average dB level over the larger period of time is 92, then the corresponding duration is 6 hours from the second row of Table 1). In case the exact dB level is not listed in the table, linear interpolation between two rows can be used. For example, if the average dB level over the larger period of time C(n) was 91 dB, then using linear interpolation between the first and second rows of Table 1, the corresponding T(n) would be 7 hours.

In this manner, C(n)/T(n) is determined for every nth larger period of time, and then C(n)/T(n) for all of these larger periods are added together over the duration of a day at regular intervals (e.g., if the larger period of time is ten minutes, per Equation 1 above all C(n)/T(n) for n larger periods in one for which sound is outputted from smartphone 404 to earpieces 402 for one day are added up). This cumulative sum of Equation 1 may be added up and checked at regular intervals (e.g., every 30 minutes, 1 hour, etc.). Finally, if upon checking, the cumulative sum per Equation 1 sum exceeds unity, then the daily noise exposure limit, per OSHA guidelines, may have been considered to be exceeded by the user. If this is the case, then volume output levels may be adjusted by the application to have an upper ceiling and not exceed 85 dB, so as to not violate the limits for safe listening.

In an embodiment, when the application is in karaoke mode 706, and an option is chosen to output sound to an external connected speaker 406, the volume output levels may also be adjusted by the application per the volume output levels of speaker 406, and any other applicable environmental variables, in a similar manner as for the output levels of smartphone 404 described below. That is, using a fitted polynomial equation based on a speaker output level-to-dB calibration for external connected speaker 406, the application may control output level to speaker 406 such that the volume does not exceed 85 dB, so as to not violate the limits for safe listening.

To accomplish the above audio output level control regime, in order to ensure a safe listening environment for users of the application, control over dB output level is needed. However, predicting in-ear dB output levels that the user listens to are complicated by several factors. First, audio output level from a smartphone 404 itself is different depending on amplification and sound output hardware of a smartphone which differs substantially from manufacturer to manufacturer, and even within different models of the same manufacturer. Second, the audio drivers of earpieces 402 which may be connected to a smartphone 404 also impact the levels at which sound is heard by the user. To overcome this challenges, dB output that a user may be listening to can be approximated by measuring equipment in the user's ear, and averaged over several handsets, by which an approximation can be made, to help formulate a relationship between smartphone 404 output levels and the ultimate dB levels that a user may be listening to.

The WHO in a safe listening application, in cooperation with the US National Institute for Occupational Safety and Health (NIOSH), has performed an experiment in which application audio output from several smartphones was standardized using calibration measurements, and in-ear dB output was measured. Kardous, Chucri A. *WHO Safe Listening App Dosimetry Evaluation*. WHO-ITU Consultation on Make Listening Safe initiative (2017). Using the results of the dB output for several smartphones, and averaging these results, the application uses the following table as a baseline approximation for corresponding smartphone 404 output levels with the dB levels that a user hears from connected earpieces 402:

TABLE 2

| Phone Volume Level | First Phone | Second Phone | Averaged |
|---|---|---|---|
| 15 | 107.6 | 101.3 | 104.45 |
| 14 | 102.4 | 98.4 | 100.4 |
| 13 | 97.4 | 95.4 | 96.4 |
| 12 | 92.5 | 93.4 | 92.95 |
| 11 | 88.5 | 91.4 | 89.95 |
| 10 | 85.5 | 89.3 | 87.4 |
| 9 | 82.5 | 87.4 | 84.95 |
| 8 | 79.5 | 85.3 | 82.4 |
| 7 | 76.5 | 83.5 | 80 |
| 6 | 72.6 | 80.4 | 76.5 |
| 5 | 68.7 | 77.5 | 73.1 |
| 4 | 63.7 | 72.6 | 68.15 |
| 3 | 58.9 | 67.4 | 63.15 |
| 2 | 54.3 | 62.5 | 58.4 |
| 1 | 49.9 | 57.3 | 53.6 |

In particular, the rightmost column of Table 2 may be used by the application, corresponding to averaged dB output of in-ear canal earpieces over several smartphones, wherein each indicated dB output in turn corresponds to smartphone volume levels that are indicated in the leftmost column. Typically, smartphone volume levels may be present on several platforms, such as ANDROID™ or iOS™, in several increments such as increments 1-15 shown in the rows of the first column of TABLE 2. In this embodiment, for a smartphone 404, volume increments may reflect corresponding proportions of a maximum volume amplitude output level by the smartphone 404. For example, a volume level 1 in the first column of TABLE 2 may reflect an output level that is 1/15th of the maximum possible amplitude audio output level from smartphone 404.

Figure 13A:
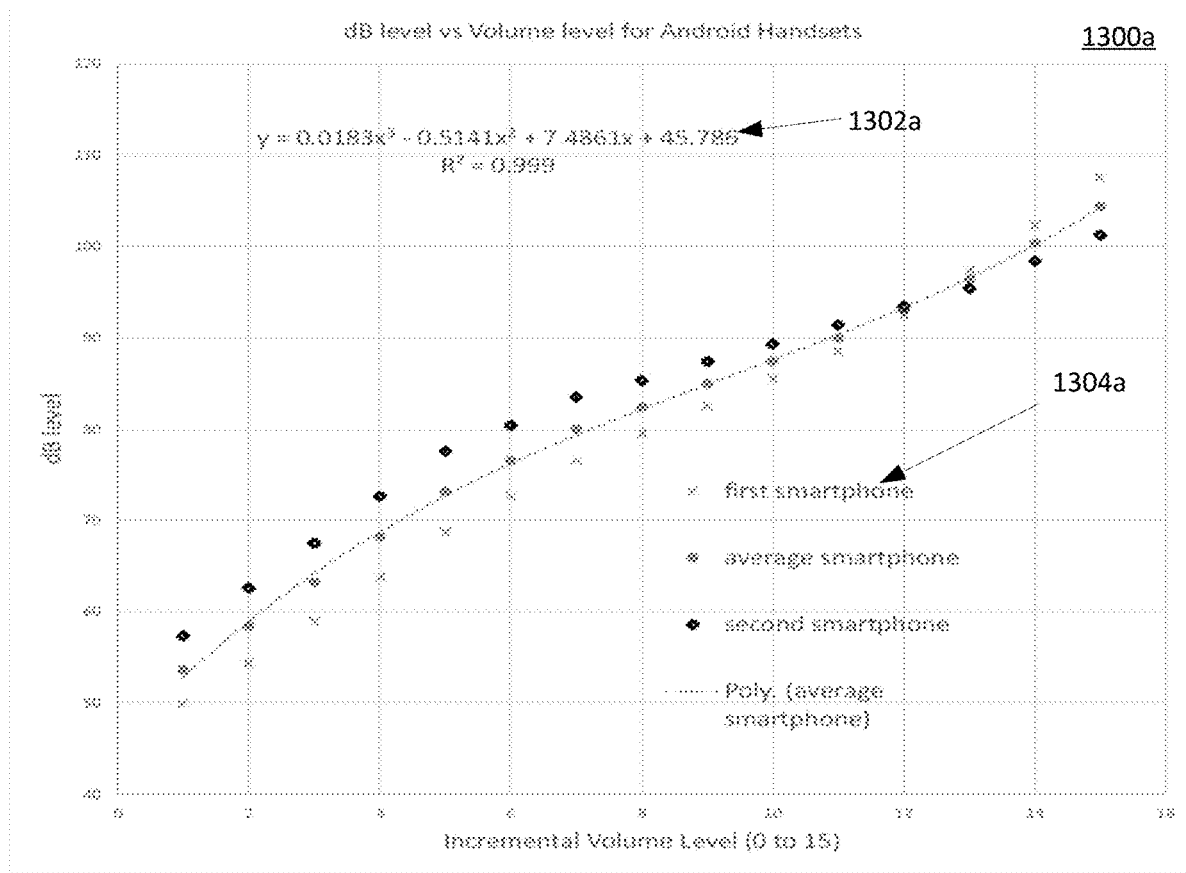
FIG. 13A is a graph showing a baseline relationship between dB output level in in-ear headphones and incremental volume level of a cellular smartphone.
Figure 13B:
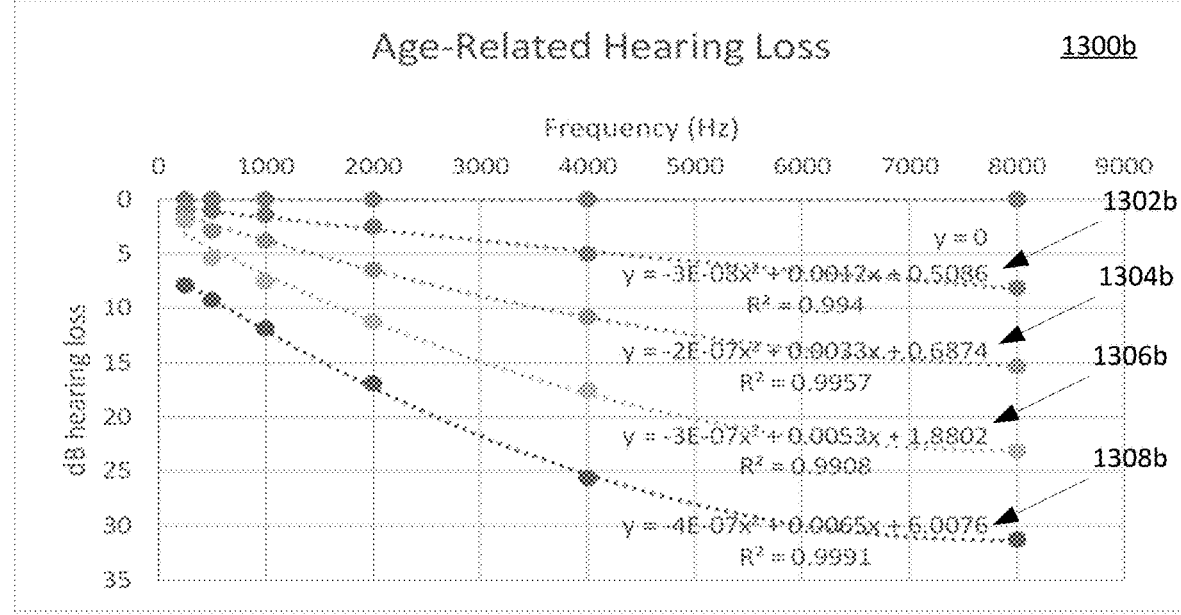
FIG. 13B is a graph showing gender-averaged age-related hearing loss in dB over a range of frequencies.

Table 2 is shown in a graphical representation in FIG. 13A. This figure shows graph 1300a, wherein the y-axis represents the in-ear dB output level from earpieces 402 which are inserted in the ear canal (e.g., values in the rightmost column of Table 2), and the x-axis represents the incremental volume levels of audio output from the smartphone 404 (e.g., values in the leftmost column of Table 2, representing incremental volume levels 1-15). As indicated by the legend 1304a, data corresponding to the in-ear dB output levels from a first smartphone (corresponding to the second column of Table 2), from a second smartphone (corresponding to the third column of Table 2), and from an average smartphone (corresponding to the fourth column of Table 2) have been plotted as scatterplots with different markers. As also indicated by legend 1304a, a dotted line has been fit to the data points for the average smartphone in FIG. 13A. Using non-linear regression, a third order polynomial equation was fit to these data points in Table 2. As indicated at region 1302 of graph 1300a, because the R-squared value of this fit is 0.999, it provides a rather accurate measure as a baseline approximation for correlating volume levels to output dB levels in an earpiece 402.

Thus, to output sound at a particular dB level, the equation 1302a can be solved for the corresponding x value. Then, the volume level closest to that x-value can be chosen for audio output from the smartphone 404. For example, if the desired in-ear output dB value is 70 dB, and the smartphone 404 has 15 volume output levels as explained above, then the equation 1302a, $y=0.0183x^3-0.5141x^2+7.4861x+45.786$, can be plotted, and using a goal-seek or solver program the corresponding x value can be found. In this case, the x value corresponding to y=70 dB, using equation 1302a, is approximately 4.3. Because 4.3 is closest to a volume level of 4, volume level 4 (output of 68.15 dB per Table 2 above) can be used by the application on the smartphone 404 to decide an output level. In this manner, using equation 1302*a*, the closest dB level corresponding to volume increment 1-15, in the table above, can be chosen. In a similar manner, for the application to control the output levels of the external speaker 406 in karaoke mode 706, it may use non-linear regression in the same manner, though the equation for the speaker to relate sound output level to dB level would be different than 1302*a* due to the different size and sound-output characteristics of an external speaker 406 compared to a smart phone 404.

However, it is possible that different smartphones 404 may have additional or lower numbers of volume increments, and in this case the x-value after using equation 1302*a* can be changed, as a proportion with 15 possible volume increments, to correspond to the appropriate number of volume increments on the particular smartphone 404. For example, in the example above 70 dB corresponds to x=4.3, which represents 4.3/15 volume increments, or 0.2866 of maximum audio amplitude output possible by smartphone 404, since the smartphone 404 in that example has 15 audio output levels. In a different smartphone 404, which may have 30 levels, 60 levels, etc., the fraction 4.3/15 can simply be mapped on this scale, by finding the closest level as a proportion of n/30 or n/60, where n represents a volume increment level. For example, if there are 30 increment levels in a smartphone 404, and equation 1302*a* of FIG. 13A is used as in the example above, for x=4.3, the fraction 4.3/15 or 0.2866 is closest to a level of 9 in 30 increment levels, since 9/30 is approximately 0.3. Similarly for any total number a of increment volume output levels by smartphone 404, the level g out of a total volume levels that corresponds to x from equation 1302*a* may be found by finding the fraction g/a, that is closest to x/15. In this manner, for a smartphone 404 with any number of volume output levels, using the equation 1302*a* of FIG. 13a, it is possible to find an appropriate volume level that corresponds to the dB level that is desired to be outputted to a user of earpieces 402.

In several noise exposure assessments, it has been noted that a comfortable sound or comfortable music level may range from 52 dB to 88 dB. Airo et. al., *Listening to Music with Earphones: An Assessment of Noise Exposure*, Acta Acustica united with Acustica (1996), Volume 82, Number 6, pp. 885-894(10). Consequently, a level in this range, such as 70 dB or 82 dB, may correspond to a default desired output level by the application of the smartphone. It may also be any other predetermined dB level within the comfortable sound range described above.

In a smartphone 404 with 15 incremental volume output levels, a default desired output level of 70 dB or 82 dB may correspond to smartphone volume output levels 4 and 8, respectively, using the techniques of Table 2 and FIG. 13A described above. Thus, the application of smartphone 404 may output music after tuning via profiles and audio modulation that will be subsequently described at such a default desired output level.

Figure 28:
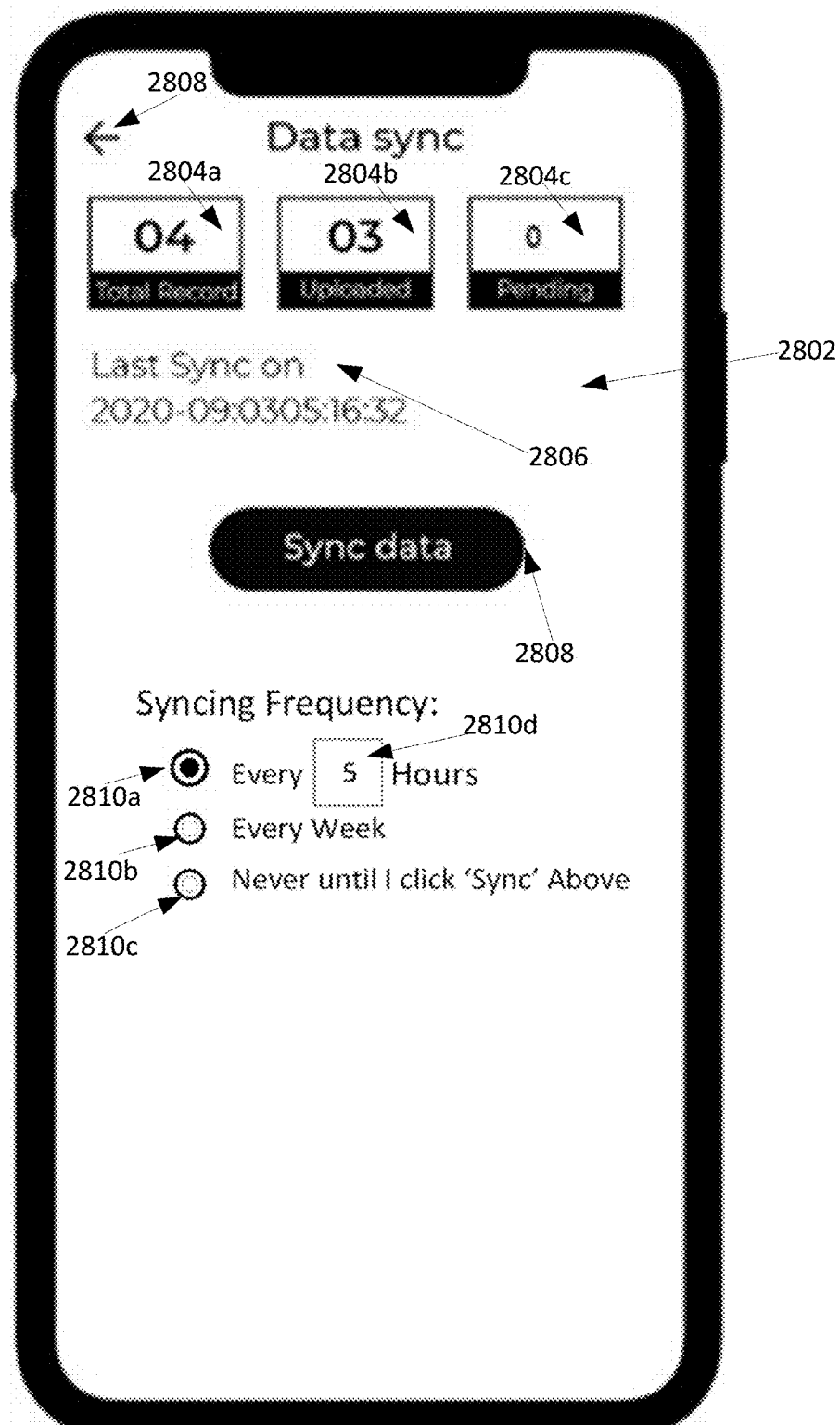
FIG. 28 is a diagram of an exemplary graphic user interface for the syncing of data by a user, according to some embodiments.

Referring again to screen 700 of FIG. 7, if button 708 is clicked, this offers a user the option to sync data that has been recorded on the local repository 304*a* of a communication module 304 (such as smartphone 404) to the cloud repository 306*a* of a connected server module 306 (such as connected cloud server 414). The details of the syncing option are present in FIG. 28, which will be explained later, after the types of data records that may be recorded on the local repository 304*a* are described.

Buttons 712*a*-712*c* present on the background area 702 of screen 700 offer the user an option save their settings as depicted by the display label 712. The user's settings include any options or radio buttons they may have chosen in any of the screens of the application, their custom tuning settings (as will be described later), their Bluetooth device connection settings, their settings on the profile screens through button 704*c*, as well as any settings they may have made in karaoke mode by clicking button 706, etc. These settings can be saved at regular predetermined periods (e.g., every 5 minutes, 10 minutes, 30 minutes 60 minutes, daily etc.) of time, or whenever the user clicks the Save Now button 712*c* on the home screen 700.

If the user chooses yes by clicking on the radio button 712*a*, then radio buttons 714*a*-714*c* may appear on the background area 702 of screen 700. These buttons offer the user an option of where to save their settings, as depicted by the display label 714. In particular, the user can choose a cloud setting 714*a*, an internal setting 714*b*, or both 714*c*. If the user chooses a cloud setting 714*a*, instead of saving local settings first to a local repository 304*a* of a communication module 304 (such as smartphone 404), and then syncing these settings with the cloud repository 306*a* of a connected server module 306 (such as connected cloud server 414), the local settings may be saved directly by the application (e.g., using the Wi-Fi or LTE protocols described above) to the cloud repository 306*a* of a connected server module 306 (such as connected cloud server 414). This may be a useful option, e.g., if there are multiple users on the same phone, and there is a chance other users may inadvertently access data on the local repository 304*a*, etc. On the other hand, if the user chooses the internal option 714*b*, then the user settings are written only to the local repository 304*a* of a communication module 304 (such as smartphone 404), and are not synced with a connected server module 306. This may be useful, for example, if the user may have sparse or sporadic internet access, and would like to store their settings for easy retrieval by the application on their smartphone 404. In addition, this may also be safe even if there are other users on the same phone, because as will be described later, the user settings and data written to the local repository 304*a* may be encrypted.

Finally, there is an option 714*c*, that the user may select, if they would like to save their user settings to both the local repository of a communication module (such as smartphone 404) and also the cloud repository 306*a* of a connected server module 306 (such as connected cloud server 414). This option may be especially robust and useful for backing up the users settings in multiple locations so that if, by any unforeseen circumstance, data is corrupted at one location, it is still accessible at the other location. In order to keep the data consistent, data may be synced at regular intervals. It may be saved first at regular intervals at the local repository 304*a*, in which case it would be synced at regular intervals (e.g., 5 minutes, 10 minutes, 30 minutes, 60 minutes, daily, etc.) from the local repository 304*a* to the cloud repository 306*a*. The converse may also occur, wherein the user settings may be saved first at regular intervals at a cloud repository 306*a*, and then it may be synced at regular intervals from the cloud repository 306*a* to a connected local repository of the smartphone 404.

In an embodiment, user settings may also be synced whenever the user progresses by one screen to another, such as pressing a Continue or Submit or Save button, etc., or by clicking a back button, as is shown, e.g., in FIGS. 5A-12, 14-16, 19 and 28.

Label 716 shown in the background area 702 of home screen 700 may indicate the tuning profile that is currently being used by the application to modulate sound output to a user's earpieces 402. As explained above, after using said profile, the application may be controlling the volume output level of the smartphone 404 such that the in-ear output level at the user's headphones corresponds to a predetermined desired output dB level, such as 70 dB or 82 dB, as explained above.

Figure 11:
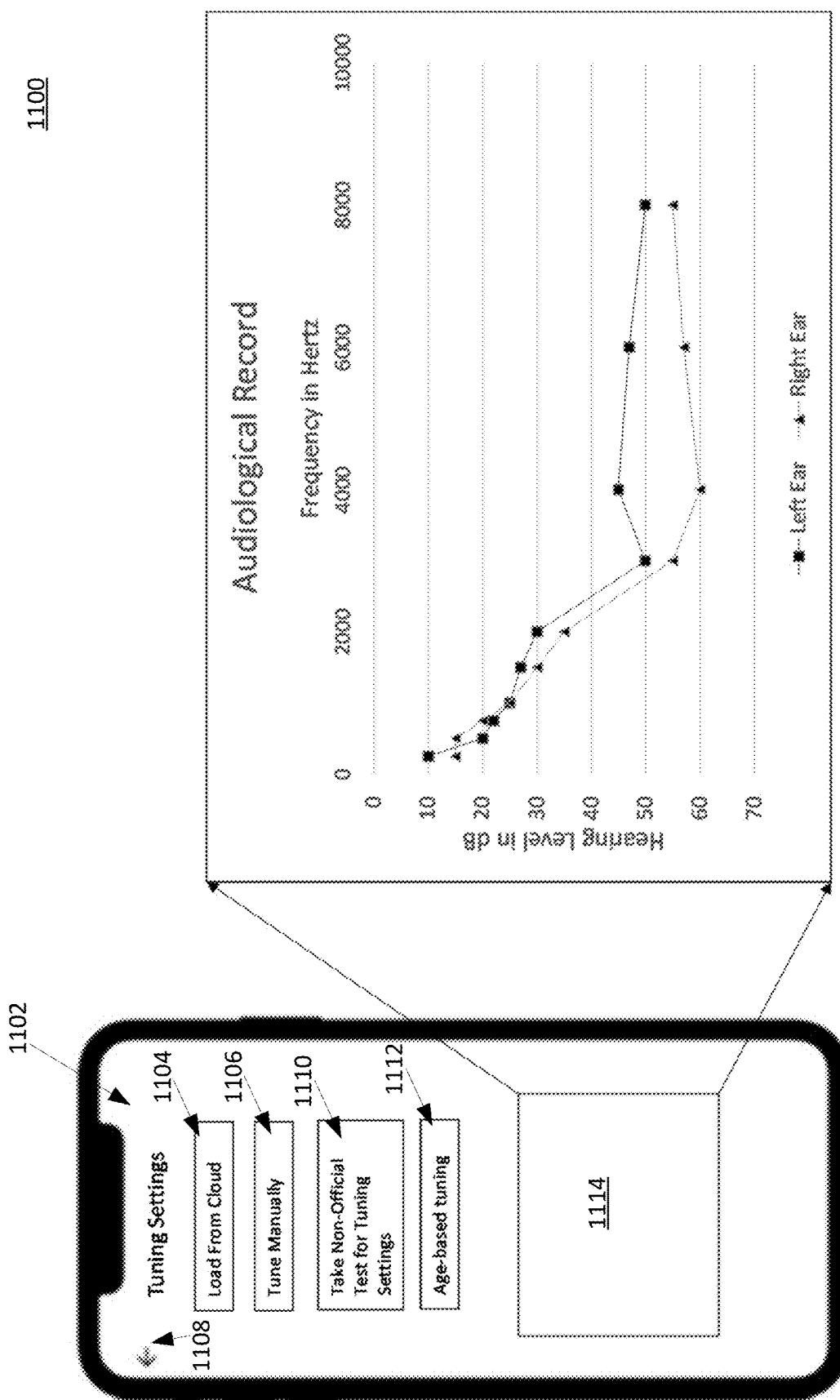
FIG. 11 is a diagram of an exemplary graphic user interface for configuring audio tuning settings under profile settings, according to some embodiments.

Button 718, shown at the bottom of the background area of home screen 700 in the form of a clickable link change profile, may enable the user to override any automatic tuning that is occurring, and manually choose which profile should be used for tuning in a particular situation. The different profiles the user may choose are shown in FIG. 11, and this process will be described in detail after briefly first describing the different regimes for automatic tuning profile switching. Finally, button 720, present to the right of button 718 on screen 700 also in the form of a clickable link, enables the user to stop all tuning that is currently occurring (including automatic or manual tuning, as will be described later). In this case, sound may be output to the earpieces 402 of the user without any form of selective modulation, but still may be output at a predetermined desired output dB level controlled by the application as described above. The user can still control the volume of the smartphone, and can adjust the volume outputted by the application through volume control buttons of a smartphone 404 on which the application is being run. However, as described above, the application is monitoring the dB levels at which the user is listening to sound, through the application, and can impose an upper limit of 85 dB of output (corresponding, e.g., to a smartphone volume output level of 9 using Table 2 and FIG. 13A above) if the user exceeds daily exposure limits. In this manner, the application can prevent the user from suffering hearing loss while still offering flexible control to the user.

The profile settings screens, which are shown upon clicking item 704c, are now described in more detail. Upon clicking 704c at the home screen 700, a user is taken to a first profile setting screen 900, shown in FIG. 9. Here the user, upon clicking an icon 902, may edit personal identifiable information shown in window 904. For example, the user may edit his name, email, or mobile number, wherein the email or mobile number given may be used or modified (if inputted previously) for future OTP verifications, wherein the OTP verification process takes place as described above.

Below window 904, there is a prompt 906 asking the user if he/she is hearing impaired. Accordingly, the user can select their response from radio buttons 906a or 906b. If the user selects 906a, the predetermine audio output level controlled by a smartphone 404, such as a level of 70 dB or 82 dB, as described above, may be altered. The auditory listening preferences of the hearing impaired have been studied, and it has been found that hearing aid subjects prefer less overall gain than the same overall loudness as would be preferred by a normal-hearing listener. In particular, it has been found that those that are hearing impaired prefer a loudness that is 3-7 phon less than normal calculated overall loudness. Smeds, K. *Is normal or less than normal overall loudness preferred by first-time hearing aid users?* Ear Hear. 2004 April; 25(2):159-72. Although per the International Organization for Standardization (ISO) standard 226:2003, the measurement of phons varies across frequencies as it reflects perceived sound magnitude, and corresponds to the number of dB only at 1000 Hz (e.g., 20 phons is 20 dB at 1000 Hz, etc.), a predetermined auditory output level by the smartphone 404 that is less by 5 dB than the level for normal users may be optimal. In this case, at the lower frequencies, a difference of 5 dB is perceived less than it is at 1000 Hz, and in the range of 1000-10K Hz, it is perceived to be greater than 5 dB. Thus, by targeting the middle of the 3-7 phon range, choosing a difference to be 5 dB accounts for frequency-based fluctuations in phons for both lower frequencies than 1000 Hz and higher ferquencies than Hz.

As a result, conforming to this research, the application, running on a smartphone 404, may set a desired output level accordingly if the user has chosen the radio button 906a to mark that they are hearing impaired. For example, if the predetermined auditory output level is 70 dB or 82 dB as described above (wherein the auditory output level described above was determined based on the study by Airo et. al. on users with normal hearing), then the smartphone can adjust the predetermined auditory output level to be 65 dB or 77 dB instead, respectively, if the user has chosen radio button 906a. 65 dB and 77 dB correspond to volume output levels 3 and 6 of a 15-volume-level smartphone 404 respectively, using the methods of Table 2 and FIG. 13A described above.

Additionally, the user can optionally input their age in box 910. Based on the user's age, audio modulation may vary, and different tuning options may be used, as will be described.

Once the user is satisfied with their responses in the initial profile settings screen 900, they may click the Continue button 912. As described above with respect to FIG. 7, if a user has chosen the internal 714b options for saving their user settings in, upon clicking the continue button 912, these user-inputted responses in buttons 906a, 906b, prompt 910, along with all user-inputted responses in user interfaces shown in FIGS. 7-16, 19, and 20, are recorded collectively as user settings data in the associated local repository 304a of the smartphone 404. In an embodiment, in addition to (714c) or alternative (714a) to being recorded locally, this user settings data may also then be sent, upon the user clicking the Continue button 912, to an associated cloud repository 306a (such as an associated cloud repository 306a of a connected cloud server 414). Additionally, or alternately, the user settings data may be synced with an associated cloud repository 306a at regular periods, or upon the clicking of a specific Save Now 712c button at the home screen 700, as described earlier. The benefit of saving the user settings data in this manner is that the various prompts in the user interface that require the user to fill them out may be pre-filled with a user's previous responses, when they run the application again. As previously described, in the case where they may be several users of a single phone, a user may want to save his or her user settings data in the cloud only, so that there is no chance his/her data in a local repository 304a may be exposed to other users. The same action happens upon clicking the Continue, Submit, Play/Record buttons, or the backwards arrows in any of FIGS. 5A-12, 14-16, 19, and 28.

Figure 9:
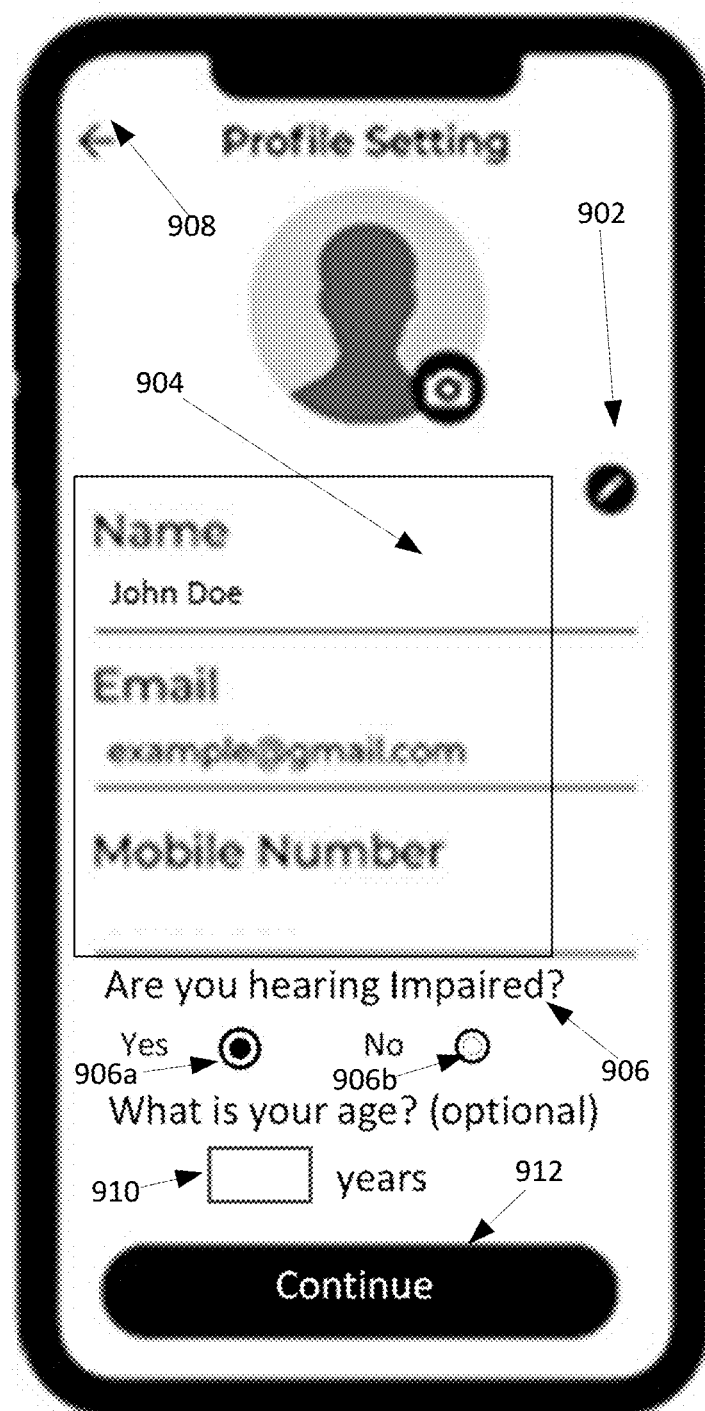
FIG. 9 is a diagram of an exemplary graphic user interface for configuring profile information, according to some embodiments.
Figure 10:
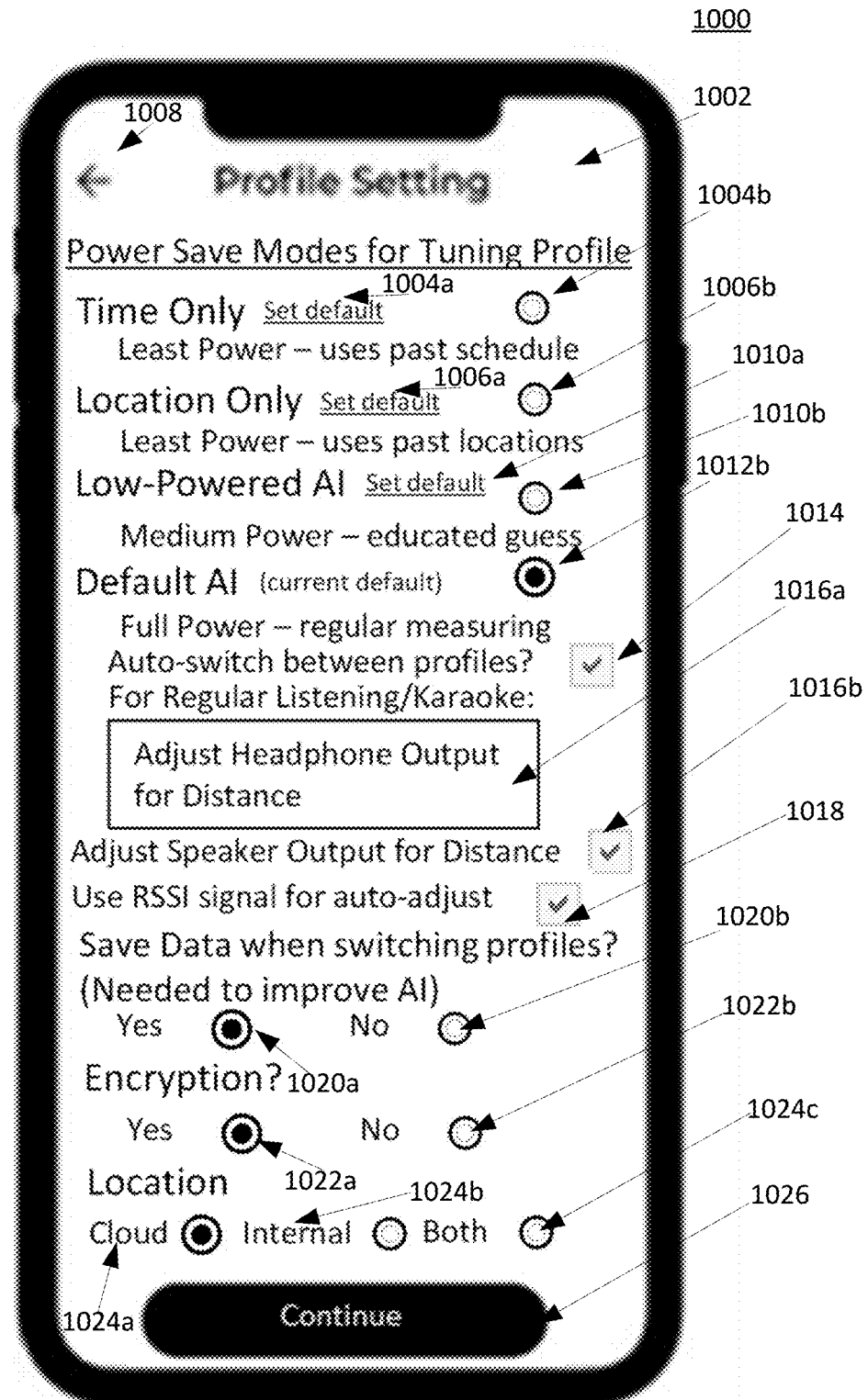
FIG. 10 is a diagram of an exemplary graphic user interface for configuring profile tuning and saving settings, according to some embodiments.

After the user clicks Continue 912 in screen 900 of FIG. 9, the application then displays a second profile setting screen 1000, shown in FIG. 10. At second profile setting screen 1000, in the background area 1002, multiple types of modes that a user may use to adjust his or her tuning profile are listed. These modes differ mainly by the amount of power used, and accordingly use algorithms to adjust the sound modulation of input signals using varying amounts of CPU power, which can result in more or less battery power lost depending on the profile chosen. In different embodiments, any combination or permutation of these modes, as shown in FIG. 10, may be used for adjusting a user's tuning profile.

In an embodiment, there are four profiles listed in background area 1002 such as Time Only 1004b, Location Only 1006b, Low-Powered AI 1010b, and Default AI 1012b. The Time Only profile 1004b may only use a metric matching a sound wave from a snapshot in current time, to a history of previously marked snapshots at various times that are associated with particular tuning profiles, to decide which tuning profile to use for sound modulation. Similarly, the Location Only profile 1006b may only use a metric matching a currently sensed distance to a history of previously marked distances at different times, wherein each previously marked distance is associated with a particular tuning profile, to decide which tuning profile to use for sound modulation. Because only one metric's comparison is taking place (in terms of time or location) for the Time Only 1004b and Location Only 1006b profiles, these profiles are designated as consuming "Least Power" as indicated in their descriptions in background area 1002. That is, they do not consume so much CPU power as other algorithms using multiple sensing methods or performing multiple comparisons, and thus have a comparatively lesser effect on battery life.

Low-Powered AI 1010b, is an intermediate power consuming mode, which consumes more CPU power than the Time Only 1004b or Location Only 1006b modes, but less power than the Default AI mode 1012b, and in that sense is a lower powered AI mode, as is indicated by its name. The Low-Powered AI mode 1010b uses a sensed sound wave from a current snapshot in time from either a connected microphone 408, the microphone of the earpieces (402), wherein the input from only one mic from earpieces 402 may be received by the smartphone 404, or the microphone of the smart phone 404 itself. Additionally, the low-powered AI mode 1010b uses a currently sensed GPS location taken from the GPS sensor the smartphone 404 running the application, and a currently sensed image taken from the camera of the smartphone 404 running the application.

Using these modes of sensed data, the Low-Powered AI 1010b uses three metrics. The first metric corresponds to that of the Time Only profile 1004b using the sensed sound wave from a current snapshot in time, and the second metric corresponds to that of the Location Only profile 1006b using the currently sensed distance. The Low-Powered AI 1010b profile uses a third metric comparing a currently sensed image taken from a camera to a history of past taken images, wherein each of the past taken images is associated with a particular tuning profile. Using these three metrics, a test called intermittent triangulation is performed to check the likelihood of which tuning profile maybe more likely to be used. Based on the results of intermittent triangulation, results are ranked in order of most likely to least likely for all tuning profiles. Finally, using the most likely candidates from the intermittent triangulation and three modes of currently sensed data, a series of binary support vector machine (SVM) classifiers may be used, to ultimately select a tuning profile to be used using process of elimination.

The last mode in the described embodiment of FIG. 10, Default AI 1012b, is listed as a "Full Power" mode in the background area 1002. This is because this mode uses the most power for sensing and computation. Consequently, more power is used by the CPU, which affects battery life drainage the most. In this mode, four quantities are sensed. Three of these quantities may be the same quantities as those sensed by the Low-Powered AI profile 1010b. Additionally, the Default AI mode 1012b may also actively average audio waveforms that are sensed in regular or irregular intervals of time (every 2 minutes, 5 minutes, 10 minutes, 60 minutes, etc.) for a cumulative snapshot over a period of time. This currently sensed cumulative snapshot may be compared, using a fourth metric, to a previous history of cumulative snapshots, wherein each cumulative snapshot may be associated with a particular tuning profile. The results of all four metrics may then be fed as weights to input nodes of a multi-layer back-propagated neural network, wherein the output of the neural network may decide which tuning profile to use.

Among these modes, under normal operating situations and circumstances, using the Default AI may prove to have a high accuracy, and thus this method has been labelled as the "current default" in the embodiment shown in FIG. 10, with the radio button filled in at 1012b indicating that it is the mode currently selected. However, any of the modes for selection of the tuning profile, such as 1004b, 1006b, or 1010b, can also be set as the current mode by clicking on the associated radio buttons at 1004b, 1006b, and 1010b, respectively. Additionally, any of these modes can also be set as the default method for determining the tuning profile, by clicking on buttons 1004a, 1006a, and 1010a, respectively.

The reason the Default AI mode 1010b may have a high accuracy is because it not only uses more metrics and modes of sensing than the other modes, but it also uses a different mode of computation, such as a neural network. However, as a byproduct of the rigorous computation involved, there is also a greater drain on the CPU and this affects battery power. Thus, if the user desires to not drain his/her battery so much because of various circumstances, such as the user does not anticipate being near a charging device for the smartphone 404 for some time, etc., then the user can select a lower-powered mode than Default AI 1012b.

For example, if the user will still charge their smartphone 404 later, but does not want the battery to drain as fast, and does not want to substantially sacrifice accuracy, then they may choose to use the Low-Powered AI mode 1010b. In this mode, firstly, only three sensing modes and three metrics are used, in comparison to four sensing modes and four metrics for Default AI 1012b. Furthermore, there is no back-propagated neural network for the CPU to process, and instead a series of SVM binary classifiers are used in a cascading manner determined by an educated guess from the results of the intermittent triangulation technique. Thus, although there is some amount of processing and rigor involved, it is not as much of a drain on the CPU as the Default AI mode 1012b.

Furthermore as an example, if the user is still shorter on power, and has a substantial need to conserve power, they may select to use the Time Only mode 1004b or the Location Only mode 1006b. Because both of these modes only used one mode of sensing and one metric for computation, along with no further classifiers used for processing such as a SVM classifier or a back-propagated neural network, the amount of CPU processing power needed for both of these modes is substantially less than either the Low-Powered AI mode 1010b or the Default AI mode 1012b. There are also instances where these simple classifiers may even be more accurate than the Default AI 1012b or Low-Powered AI 1010b modes.

For example, in the case where most of the user's profile tuning needs are uniquely associated with location (he/she always attends a lecture nearby a particular location, a concert nearby another location, and plays sports nearby another location), they may even choose this mode as a default mode by clicking 1006a, since in that case the metric used for comparing sensed location with historic locations (each associated with a unique tuning profile) would likely correspond to the desired tuning profile. However, even if a unique association was not always present, but there was an association wherein a user may visit a particular location for a particular tuning profile more than a normal location, or if the user has a schedule where mostly audio tuning needs are determined by location for a particular day, etc., then he/she may try to use the Location Only mode 1006b as an efficient way (for that particular day or period of time) for determining the audio tuning profile needed.

Similarly, if most of the user's profile tuning needs are uniquely associated with a particular waveform captured at a particular time (he/she always hears a lecture that starts with the same greeting at 5 PM everyday, etc.), they may even choose this mode as a default mode by clicking 1004a, since in that case the metric used for comparing sensed audio waveforms as a snapshot in time with historic snapshots (each associated with a unique tuning profile) would likely correspond to the desired tuning profile. As with the Location Only mode 1006b, for the Time Only mode 1004b, even if a unique association was not present, but there was an association wherein a user may hear a particular audio form at a particular time more than the variation in timing for normal audio forms, or the user has a schedule where mostly audio tuning needs are determined by time for a particular day, etc., then he/she may try to use the Time Only mode 1004b as an efficient way (for that particular day or period of time) for determining the audio tuning profile needed.

Further, the user may set an auto-switching mode, which can auto switch between modes 1004b, 1006b, 1010b, and 1012b, by ticking checkbox 1014. In this manner, the smartphone 404 itself may seamlessly switch between the different modes for selecting a tuning profile based on the battery power of the smartphone 404. For example, in an embodiment, the Default AI mode 1012b may be selected by the auto-switching mode when the battery level of the smartphone 404 is above a predetermined threshold level (e.g., 80%). When starting out to use the phone, for example, at the beginning of a user's day, a smartphone 404 is typically charged at or near full power, and so this may give the user a substantial amount of time in the Default AI mode 1012b. Then, when the battery level of the smartphone 404 falls below the Default AI threshold level (e.g. 80%), but is still above another threshold level (the Low-Powered AI 1010b mode threshold level, e.g. 55%), then the smartphone 404 may remain in the Low-Powered AI mode 1010b. Finally, when the battery level of the smartphone 404 falls below the Low-Powered AI 1010b mode threshold level (e.g. 55%), then the smartphone may choose either the Location Only mode 1006b or the Time Only mode 1004b.

This final selection of the Location Only mode 1006b or the Time Only mode 1004b may be at random, or also may take place depending on which sensor/computation is draining more CPU power (the metric for comparing GPS sensor location from a GPS sensor on smartphone 404 with past historical locations in 1006b, or the metric for comparing a waveform recorded at a snapshot in time from a smartphone microphone sensor on smartphone 404 with past historical snapshots in time in 1004b). In an embodiment, such final selections may be at random at first when the automatic switching between profiles 1014 is turned on. Then, the CPU load may be measured by smartphone 404 when either 1004b or 1006b are selected for several instances, and the average power consumption for 1004b and 1006b over those instances can be used to make such a comparison between the two modes, to prioritize 1004b or 1006b in being chosen when the battery level of the smartphone falls below the Low-Powered AI 1010b mode threshold level.

In this way, by using the auto-switch between profiles option 1014, a smartphone 404 running the application is able to seamlessly switch between modes for selecting the profile to be tuned in an autonomous manner. Alternatively, the user can also take full manual control by unchecking the checkbox 1014, which may be useful when they have a preference for one of the modes for selecting the tuning profile. It is also useful when a certain day of the week might be based more on specific audio heard at certain timings or at certain locations, in which case it may be more power-efficient to use the Time Only mode 1004a or Location Only mode 1006a for this certain day only and switch to auto-switch 1014 on other days, etc. In this manner, full flexibility is offered to the user to choose a mode for tuning of the profile, and to set a default mode which is loaded the next time the application is started. In an embodiment, as shown in FIG. 10, the default mode may be set to Default AI 1012b when the application is run for the first time.

Button 1016a, displayed on the background 1002 of the second profile setting screen 1000, offers the user a way to adjust output headphone output depending on the distance to a source of sound. When a user using the application running on a smartphone 404 clicks button 1016a, in an embodiment, they are taken to screen 1902 in FIG. 19. Here, they can enter their height and inches in a fillable text box 1904. Once they have entered this information, they can click the continue button 1906. As described above, clicking the Continue button 1906 saves all the settings the user has recorded, including their height 1902, in the application thus far, to either the local repository 304a, cloud repository 306a, or both. Alternatively, if the user decides they are not ready to adjust the sound output level based on distance from a sound source, they can exit the screen by clicking on the back arrow 1908. Clicking on the back arrow also saves user settings, as described above.

Once the user clicks the Continue button 1906 at screen 1902, as shown by the screen flow arrangement 1900, the application transitions to a second screen 1910. In this screen, the application uses the camera of the smartphone 404 to show a viewing range 1916, which is in an embodiment defined by an oval with cross hairs splitting the oval into 4 equal arcs. Squares or other shapes may also be used to define the viewing range 1916 in alternate embodiments. The user is instructed by a prompt 1912, to point the viewing range and crosshairs to the base of the sound source. Once the base of the source, e.g. 1914, is captured within the viewing range 1916, as shown in screen 1910, per the prompt 1912 the user who is holding smartphone 404 can push the screen to capture an image. This action is shown by the index finger of a user's right hand 1918 in FIG. 19, where as shown it is relatively easy for the user to hold the smartphone 404 with their left hand at an angle to capture, the base of the sound source, and then simply push the screen with their right hand to capture an image. In this manner, a user can effectively take a picture of a sound source in a time-efficient manner. The picture data may then be written to the local repository 304a, cloud repository 306a, or both, depending on the options chosen in the home screen 700 in FIG. 7 as described above.

Once the height of the user 1904 and the picture taken by the user at screen 1910 has been captured, the smartphone 404 may calculate the distance to the sound source using the mathematical arrangement shown in FIG. 20A, which will now be explained. In particular, in an embodiment, when the user takes a picture of the sound source, the angle a that the user is holding the smartphone 404, corresponding to smartphone 2004a in FIG. 20A, can be measured. For example, the accelerometer of the smartphone may use the gravity vector to detect the relative angle of tilt, which corresponds to angle a. The user has already inputted their height at field 1904, which corresponds to the variable h in FIG. 20A. Thus, using the following equation, the distance may be calculated:

$$d = h * \tan(\alpha) \quad (2)$$

Using equation 2, the smartphone may thus determine the distance to the sound source. Alternatively, a stereoscopic method shown in FIG. 20B may also be used to determine the distance to the sound source. In this alternate embodiment, after taking the picture of the base of the sound source as shown in screen 1910 of FIG. 19 by pushing the screen, screen 1910 may once again appear to have the user take another picture of the base of the sound source. In this case, the first picture corresponds to L in FIG. 20 B, and the second picture taken by a user corresponds to R in FIG. 20 B. When the screen 1910 reappears, after the first picture is taken when the user pushes the screen, prompt 1912 also appears again, and in addition to the wording shown in FIG. 19, the prompt asks the user to move to the right horizontally, and take another picture. When this happens, and the user moves to the right to take the second picture, the smartphone 404 determines the user's location relative to when the first picture was taken via accelerometer tracking, and can thus estimate the distance B in FIG. 20 B. In FIG. 20B, a0 may correspond to the horizontal angle of view of the camera of smartphone 2004a, corresponding to smartphone 404, which is a known quantity (depending on the specs of the camera of smartphone 404).

Figure 20A:
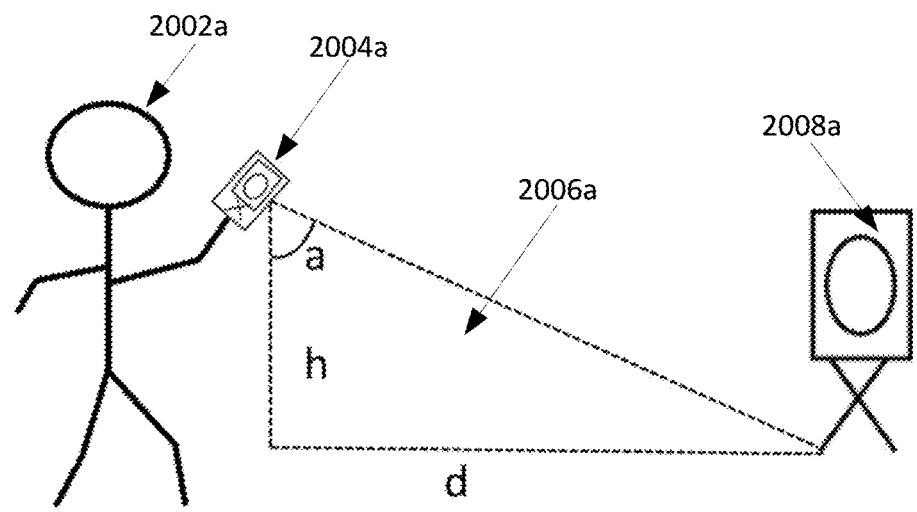
FIG. 20A is a diagram showing the mathematical relation between a standing user and the user's distance to an object, according to some embodiments.

Further, as shown in FIG. 20, the quantity HR as shown may depict the horizontal resolution of the horizontal angle of view a0. That is, the quantity HR may represent the number of horizontal pixels that comprise the horizontal angle of view a0. The quantities $x_L$ and $x_R$, respectively, may reflect the distance from the leftmost end of the fields of view a0 at L and R, respectively, to the sound source 2008b, as shown in FIG. 20B, wherein sound source 2008b may correspond to sound source 2008a in FIG. 20A. Given these known quantities, the distance D, as shown in FIG. 20B, from the user holding the smartphone to the sound source 2008b, may be calculated using the following equation.

$$D = \frac{Bx_0}{2 \tan\left(\frac{a0}{2}\right) * (x_L - x_R)} \quad (3)$$

Thus using the simple tilt-angle detection method shown in FIG. 20A, or the alternative stereoscopic embodiment shown in FIG. 20B, the distance D from a user holding smartphone 404 to a sound source can be determined. It may be beneficial to use either embodiment depending on user objectives. If a high degree of accuracy is desired, then it may be beneficial to use the alternative stereoscopic embodiment shown in FIG. 20B, because since it uses two different pictures and calculates the horizontal difference between the sound source on both objects ($x_L - x_R$), there is less variation than measurements only taken with one image in FIG. 20A. In particular, with 20A, minor variations in error of detection of angle a may have an amplified impact in the calculation of distance D. On the other-hand, the method shown in FIG. 20A is very time-efficient since it only requires one picture, and is also user-friendly, as it does not demand the user to move at all, and the user can event take a picture of a sound-source in a stationary manner. This is especially useful when a user may be standing and observing a lecture, etc., when he/she may need a quick determination of distance and adjusting of sound accordingly. Accordingly, based on user objectives, either embodiment may be used when a user clicks on button 1016a in FIG. 10.

In a further alternate embodiment, if the user already knows of the distance between themselves and a sound source, the user may choose to enter the distance D from the user to a sound source. In such a alternate embodiment, the user may be prompted in screen 1902 to enter the distance between them and the sound source in input field 1904, and then upon clicking the continue button 1906 the application may return back to the home screen shown in FIG. 7.

Once a distance D is calculated from a user to a sound source, using either of the embodiments mentioned above, the distance D may be used to control the headphone volume output. As the user gets farther away from a sound source that is desired to be listened to, the signal from the sound source is more faint, and thus the predetermined volume output described above may be adjusted to be louder, so the user may be able to better hear the signal from the sound source. Per the inverse-square law in acoustics, it is known that the sound pressure level decreases by about 6 dB, on an unweighted scale, each time distance from the sound source is doubled. That is, if a predetermined normal distance from a sound source is set at, e.g., 6 feet, then at 3 feet the sound is 6 dB higher than normal, at 12 feet the sound is 6 dB lower than normal, at 24 feet the sound is 12 dB lower than normal, and so on. Thus, per this example, if a normal sound level is determined to be the predetermined audio output level described above (70 or 82 dB, which may be lowered to 65 or 77 dB if the user is hard of hearing as described above), then if the distance from the sound source is known, the predetermined audio output level can be adjusted accordingly to account for this distance. For example, if the user is at 12 feet in the above example, sound from the sound source (e.g. a person talking at a podium on a microphone 12 feet away, a speaker 12 feet away, a television 12 feet away, etc.) is 6 dB lower than normal, as the sound pressure level has decreased by 6 dB. To account for this loss due to distance, the predetermined audio output level may be raised by 6 dB (to 76 or 88 dB, or 71 or 83 dB if the user is hard of hearing). Conversely, if the user is at 3 feet from the sound source in the above example, sound from the sound source is 6 dB higher than normal, as the sound pressure level has increased by 6 dB. To account for this increase due to distance, the predetermined audio output level by the smartphone 404 may be lowered by 6 dB (to 64 or 76 dB, or 59 dB or 70 dB, respectively). In the above example, although a normal distance may be considered to be 6 feet in one embodiment, reflecting a distance of everyday conversation, the normal distance may be any predetermined number of feet. At this normal distance, the predetermined audio output level of sound from the smartphone 404 to the earpieces 402 will not be changed based on this distance, but will be changed as the user goes farther from the sound source or closer to the sound source relative to this distance.

In this manner, in an embodiment, utilizing the known distance from the user of the smartphone 404 to a desired sound source, the predetermined audio output level can be proportionally adjusted, leading to an enhanced listening experience for the user. In addition, in an embodiment, there may be an upper threshold or lower threshold dB limit, where the upper and lower threshold may be any predetermined number of dB. For example, sounds above 110 dB are considered to be harmful for hearing, so even if the user is extremely far from the sound source, a limit of e.g., 95 dB, 100 dB, 105 dB, etc., may be imposed as a upper dB output threshold, wherein the smartphone 404 will not have a predetermined audio output level (outputted per Table 2 and FIG. 13A as described above to earpieces 402) above the upper dB output threshold. Conversely, if the user is immediately adjacent to the sound source, there still must be a minimum dB threshold limit, because if the predetermined audio output level becomes too low (especially if the user is hearing impaired), it will be hard for the user to hear. The lower dB limit may be set, e.g., to 50 dB, 55 dB, 60 dB, etc., where this number may correspond to threshold hearing of the individual user. For example, if the user cannot hear any sounds below 60 dB in the auditory range of 1000-1000 Hz (see, e.g., FIG. 11 showing a lowest point of 60 dB at 4000 Hz, which shows the audiogram for a user's right ear), then 60 dB may be set as a minimum dB output threshold. In this manner, it can be ensured that the user will be able to listen to sounds at a minimum distance, not be overburdened by sounds at a maximum distance, and yet receive the benefit of fine-tuning the dB output level depending on change in distance from a sound source.

Further options for adjusting sound output based on distance in screen 1000 of FIG. 10 are explained herein. In an an embodiment, the user may adjust speaker output for distance by ticking checkbox 1016b. For this checkbox to appear, there must be at least one sound output device aside from earpieces 402 that is connected in the Bluetooth devices configuration explained in FIG. 8 above. For example, a smartphone may be connected to a speaker 406 or television 410 as shown in FIG. 4, etc. In such an embodiment, if sound is emanating from the speaker 406, television 410, etc., instead of adjusting the dB output level of the earpieces 402, as explained above, because the smartphone 404 has the ability to control the volume of the television 410 or speaker 406, the volume of the television 410 or speaker 406 can be made louder as the user goes farther away from the television 410 or speaker 406 (with distance from the sound source being determined as described above), or lower as the user goes closer to the television 410 or speaker 406. A user may use option 1016b, for example, when he/she is watching television alone, or listening to music from speakers, etc., where the lowering or increasing of the volume of the speaker based on distance will not have an effect on other listeners.

In another embodiment, sound output from the television 410 or speaker 406 may be directly routed to the earpieces 402 via smartphone 404, via wireless protocols such as BLUETOOTH™ or Wi-Fi. That is, the application on smartphone 404 takes in the sound wirelessly from the television 410 or speaker 406, optionally mixing in noise from the microphone of the user's earpieces 402. Then, the application optionally selectively tunes this audio signal, and outputs the audio signal at a dB level as described above based on the distance from the user to the sound source. This routing and sound playback to a user's earpieces 402 may occur independently of sound emanating from the television 410 or speaker 406 as a point source of sound, heard by other listeners or watchers than the user. In this case, the audio output volume of the earpieces 402 may be adjusted by the application on the smartphone 404 as described above with distance, and this embodiment may be preferable, e.g., when there are multiple listeners all in one room. In this way, by not adjusting the volume of sound emanating from the point source itself (such as the television 410 or speaker 406) does not inconvenience other watchers/listeners when a user with earpieces 402 goes farther from or closer to the sound source. Yet, by the adjustments made in the application of smartphone 404, the user with earpieces 402 can comfortably listen to the television as he goes closer to or farther from a sound source.

Additionally, for all of the embodiments of sound adjustment based on distance described above, once a distance is determined, the smartphone 404 may use its accelerometer to continually determine further distance traveled by the user. For example, if by using the camera the distance is determined to be 6 feet, and the user walks backward 3 feet (which is detected by the accelerometer), then the smartphone 404 is easily able to adjust the distance to 9 feet, without the user having to take a second picture with the camera. In this way, the accelerometer may be sensing at regular intervals (every second, 5 seconds, 30 seconds, minute, etc.) and adjust the user distance value. Accordingly, the smartphone 404 may check the distance at regular intervals, and adjust the audio output dB level (based on Table 2 and FIG. 13A as described above) on a regular basis.

Additionally, if the incoming sound, e.g., as detected by the microphones of earpieces 402 is found to be above an upper threshold dB level, such as 100 dB, the application of the smartphone 404 may automatically turn on a noise-cancellation feature of earpieces 402. This noise cancellation feature uses both microphones of earpiece 402 as explained with reference to FIGS. 1A, 1B, and FIG. 2 above. In this manner, as explained by the WHO, noise-cancelling earpieces such as earpieces 402 can actually cut down the background noise, so users can hear sounds at lower volumes.

In another embodiment, if a user ticks box 1018 in screen 1000 of FIG. 10, the user may choose to use a received signal strength (RSSI) indicator from a sound source, via BLUETOOTH™ protocol, to autonomously determine the distance from the user to the sound source, without any user intervention. For example, using the RSSI from the sound source to the smartphone 404, the smartphone 404 can calculate the ratio between the RSSI signal and a hard-coded or measured power value (power at which a Bluetooth beacon broadcasts its signal from the sound source to the smartphone 404), and utilize this ratio to predict the distance between the sound source and the smartphone 404. However, the using the RSSI indicator as a predictor for distance is only accurate within 3-6 feet of the sound source. Thus if the distance is beyond this range it may not be accurate. Still, if the user is within this range and the box 1018 is checked, then the RSSI indicator may be a good way to autonomously detect the distance that a user is standing from the sound source. Using the accelerometer as described above, then when the user walks far away, an accurate record of distance can still be kept. In this manner, in an embodiment, a user may not have to take any image or intervene at all for the smartphone 404 to determine their distance (initially within 3-6 feet) from a sound source, and then continually adjust volume, even as they move further away (utilizing the accelerometer to update distance measurements), as explained above.

Figure 19:
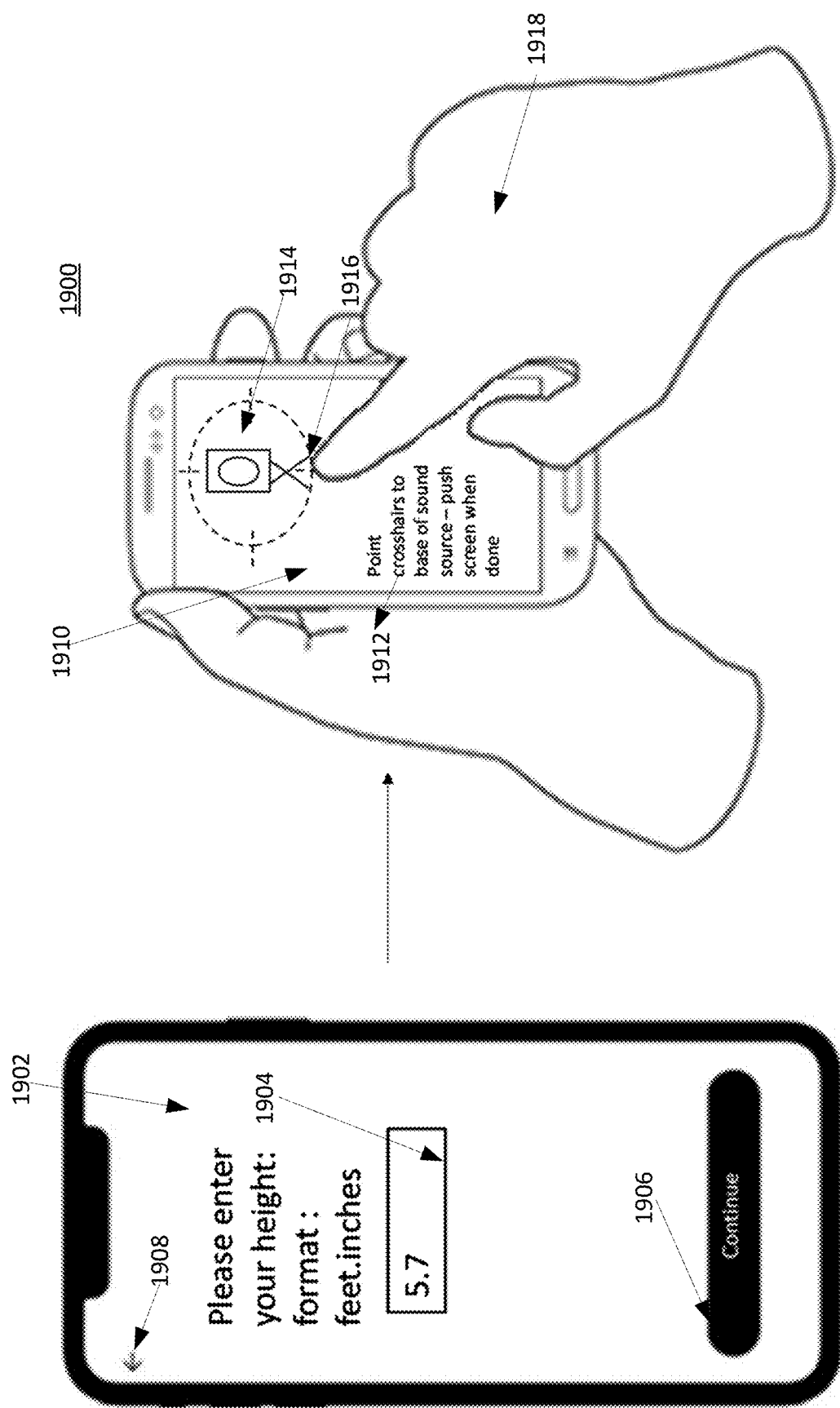
FIG. 19 is a diagram showing an exemplary graphic user interface for determining distance to an object, and user interaction with the graphic user interface, according to some embodiments.
Figure 20B:
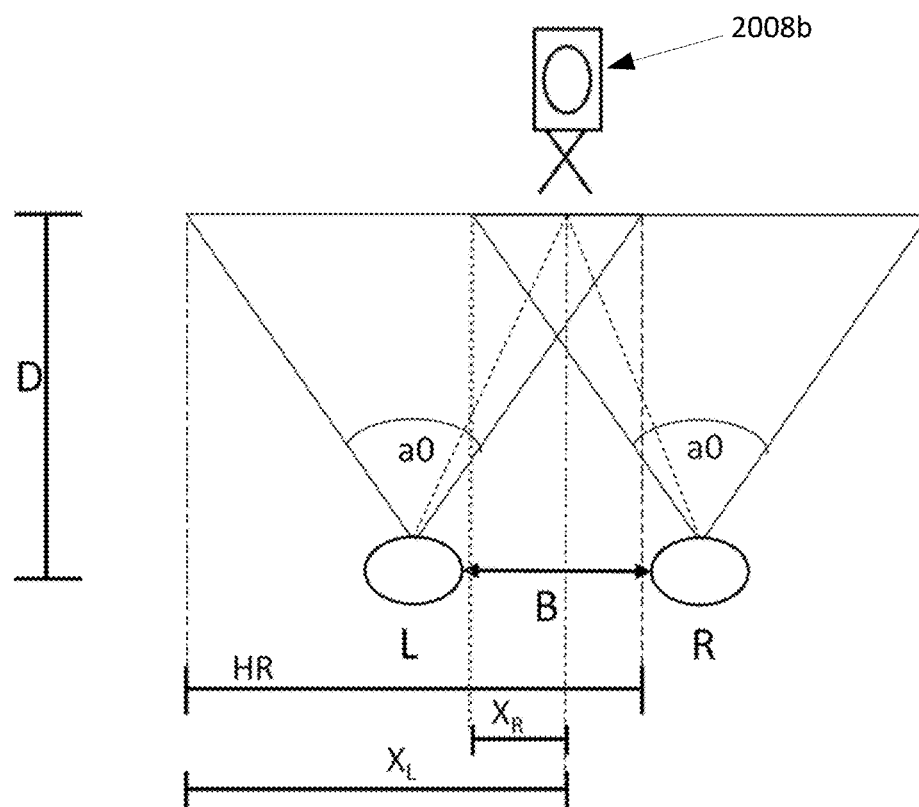
FIG. 20B is a diagram showing the mathematical relation between a standing user at two different locations and the user's distance to an object, according to some embodiments.

In an embodiment, if the distance initially detected by the RSSI signal is greater than 6 feet, because of the inaccuracy of the RSSI signal, the smartphone 404 may automatically transition to FIG. 19, and ask the user to take a picture, even if the user has not clicked on button 1016a. In this manner, the smartphone 404 can accurately determine initial distance in a semi-autonomous manner (only requiring the input of the user taking a picture with the smartphone camera if needed), and can seamlessly switch between using the RSSI signal or the camera to detect the initial distance, and then use the accelerometer for further distance tracking. All the while, the audio signal output may be controlled according to these distance measurements from a sound source, making for a comfortable listening experience for the user.

Further options that the user can choose on screen 1000 of FIG. 10 with regards to saving data are described herein. Firstly, radio buttons 1020*a* and 1020*b* are shown beneath a prompt in background 1002 asking the user if they would like to save data when switching profiles. If the user selects the yes radio button 1020*a*, then all sensor data that is recorded when a profile is switched may be saved to the local repository 304*a* or cloud repository 306*a*. This data is separate from the user settings data described separately, and comprises sensor data that is captured whenever the user manually switches to a certain profile. In particular, data from a smartphone's (404) GPS sensor, sensing its location, data from a connected earpiece's (402) microphone (or other connected microphone or sound source connected to smartphone 404 as described in the embodiments above), sensing a raw audio signal from the user's surroundings, as well as data from the smartphone's camera (sensing images taken) may all be saved. For any of the above recorded data, this data may be saved only at the moment that the profile is switched (e.g., camera image, or location), or may also be saved additionally for a period of time after the profile is switched (e.g., audio signal). By saving the data, the accuracy of the profile switching regimes Time Only 1004*b*, Location Only 1006*b*, Low-Powered AI 1010*b*, and Default AI 1012*b* may be enhanced, through the creation of more training data points.

In saving the data, if the user selects radio button 1020*a* (Yes), then a prompt may appear below radio buttons 1020*a* and 102*b* on background 1002 of screen 1000 asking the user if they would like to encrypt their data, wherein the user can choose their answer via radio buttons 1022*a* and 1022*b*, as shown in FIG. 10. Here if the user selects radio button 1022*a*, then the data that is saved may be saved in an encrypted format to the local storage repository 304*a*, or cloud repository 306*a*. Encryption formats such as the Advanced Encryption Standard (AES), secure hash algorithm (SHA-2), etc., may be used. In the case of AES, a 128, 192, or 256 bit key may be used to encrypt and decrypt a block of messages. The key in turn may be stored using a key storage system such as ANDROID™ keystore system or iOS™ keychain. Using such a system, the application running on smartphone 404 can only edit, save, and retrieve its own keys. In this manner, the application can generate or receive a private-public key pair, which would tehhn be stored in the key storage system. The public key can be used to encrypt the data by the application, before it is stored in application specific folders on the local storage repository 304*a* of smartphone 404 or cloud repository 306*a* of a connected server module 306 (such as connected cloud server 414). The private key can then be used to decrypt the same information when needed by the application.

Keys generated by the application can be specific to a user session, and therefore correspond uniquely to the user using said keys. In this manner, the encryption may aid a user substantially when, for example, there are multiple users on the same phone, and the data is being saved onto the local repository 304*a*. In this case, even though other users may be able to see the file in the interior folders of the internal storage of the smartphone 404, they are not able to read the files as the files are encrypted and the keys to read them are not accessible by the other users. Similarly, data that is thus encrypted and stored in the cloud repository 306*a* may also be accessed by the application using a public/private key pair that may be stored on the smartphone 404. In this manner, other users that are using the same cloud repository 306*a*, because they do not have the particular public/private key of the user that saved the data (since the public/private key pair is saved on the smartphone 404), are not able to read the data even if they manage to access it.

In this manner, encryption can aid a user in protecting the privacy of his or her data greatly. On the other hand, the user may also choose to not encrypt the data by choosing option 1022*b*. A user may choose to do so for several reasons. First, the user may only be using the phone by him or herself, and may only be storing the data in the local repository 304*a*. In this case, as the data would only be accessed by one person and is not being uploaded on the internet, it may be okay for it not to be encrypted from a security point of view. Additionally, it may speed up loading and saving speed as the CPU does not need to process ancillary encryption/decryption processes that are necessary to save the data using any of the encryption protocols described above. Second, a user may choose option 1022*b* even if other users are using the phone, especially if a user wants to share his or her data with other users, and wants them to see the data. In this manner, it helps to keep the data in an unencrypted manner, so that others can observe the data as well.

Finally, if the user chooses to save data when switching profiles (chooses 1020*a*—Yes), then a location prompt may be shown to the user below radio buttons 1022*a* and 1022*b*, presenting a user with the option of choice of location, for where the user would like to save his or her data. The user may choose between three radio buttons describing a cloud option 1024*a*, an internal option 1024*b*, or an option saving to both 1024*c*. If the user chooses a cloud setting 1024*a*, instead of saving user data first to a local repository 304*a* of a communication module 304 (such as smartphone 404), and then syncing this user data with the cloud repository 306*a* of a connected server module 306 (such as connected cloud server 414), the user data may be saved directly by the application (e.g., using the Wi-Fi or LTE protocols described above) to the cloud repository 306*a* of a connected server module 306 (such as connected cloud server 414). This may be a useful option, e.g., if there are multiple users on the same phone, and there is a chance other users may inadvertently access data on the local repository 304*a*, etc. On the other hand, if the user chooses the internal option 1024*b*, then the user data is written only to the local repository 304*a* of a communication module 304 (such as smartphone 404), and is not synced with a connected server module 306. This may be useful, for example, if the user may have sparse or sporadic internet access, and would like to store their data for easy retrieval by the application on their smartphone 404. In addition, this may also be safe even if there are other users on the same phone, because as described, the user data written to local repository 304*a* may be encrypted.

Finally, as with option 714*c* described above, there is an option 1024*c* that the user may select, if they would like to save their user data to both the local repository of a communication module (such as smartphone 404) and also the cloud repository 306*a* of a connected server module 306 (such as connected cloud server 414). This option may be especially robust and useful for backing up the users settings in multiple locations so that if, by any unforeseen circumstance, data is corrupted at one location, it is still accessible at the other location.

In order to keep the data consistent between the local repository 304*a* and the cloud repository 306*a*, when a smartphone has access via LTE™ or Wi-Fi protocols to cloud repository 306*a*, data may be synced at regular intervals. Data may be saved first, at the local repository 304*a*, as described above, when a user manually changes the tuning profile (and for a period of time thereafter if applicable, e.g., to the raw audio signal in the example described above). Then, it may be synced at regular intervals (e.g., 5 minutes, 10 minutes, 30 minutes, 60 minutes, daily, etc.) from the local repository 304a to the cloud repository 306a. The converse may also occur, wherein the user data may be saved first at regular intervals at a cloud repository 306a, and then it may be synced at regular intervals from the cloud repository 306a to a connected local repository of the smartphone 404.

When the user is satisfied with their options chosen at screen 1000 of FIG. 10, they may click the Continue button 1026. As explained above, clicking the Continue button may save all user settings recorded up to this point to the local repository 305a or cloud repository 306a as applicable. Next, after the button is clicked and data has been saved, the application transitions to the tuning settings screen 1100 shown in FIG. 11. This screen, as shown in background 1102, enables a user to select baseline tuning options for audio, wherein the smartphone 404 may determine firstly how to modulate the audio signal based on any pre-existing hearing loss data the user may have.

There are several ways for the user to load audiological settings into the application, as will be described with reference to buttons 1104, 1106, 1110, and 1112. Firstly, the user may click the Load from Cloud button 1104. In this case, it is possible that through a audiologist-facing or specialist-facing web page or web portal, a physician may be able to enter audiological settings for a hearing impaired user of the application, wherein these settings may be saved in the form of an audiogram to cloud repository 306a. These settings may be saved as designated for the hearing impaired user. In an embodiment, a physician designates a user by email id, etc., when saving the audiogram, and the audiogram may be saved on the cloud repository 306a encrypted with the user's particular public/private application encryption key using a protocol (e.g., AES, SHA, etc., as described above). In this manner, the record may be kept safe until the user clicks the load from cloud button 1104, in which case it is de-encrypted by the application in the segregated user session, and loaded into the application. In other embodiments, other encryption techniques may also be used.

Once loaded into the application, an audiogram looks like the Audiological Record shown in a magnified view of box 1114 of FIG. 11. In particular, the magnified view shows the user's threshold hearing level in dB for the left ear and right ear (y-axis) over a range of frequencies in Hertz (x-axis). For both the left ear and right ear, these points depict the threshold hearing levels for the user. For example, in the graph shown in box 1114 of FIG. 11, at approximately 4000 Hz the hearing threshold level for the right ear shown is 60 dB. This means that sounds need to be above 60 dB at 4000 Hz in an audio signal for these sounds to be perceived by a hearing-impaired user.

Instead of clicking the Load From Cloud button 1104, a user may also click the Tune Manually button 1106. In this case, an audiological record such as the one shown in the magnified view of box 1114 may be presented to the user, with a predetermined number of points (e.g., 10, 20, etc.) at equally spaced apart frequencies from 0 to 10000 Hz, wherein the user can drag the points themselves for both the left ear and right ear. For example, a user may have an audiogram print-out which they may have gotten from an audiologist or other source. In this case, referring to the audiogram, they may drag the points to the respective dB level, such that the audiogram of the magnified view of 1114 may match the audiogram print-out that the user may have. In an embodiment, a horizontal line at a predetermined dB level (e.g., 30 dB, 40 dB, etc.) may be presented in the magnified view of 1114 representing the right ear, and another horizontal line below or above this line at another predetermined dB level may be presented in the magnified view of 1114 representing the left ear. Then, by performing an action such as pushing their finger on the line (clicking the line via smartphone 404), a user may add a point to this line. The user may be able to drag the point by pushing their finger on the location of the smartphone screen of smartphone 404 corresponding to the point (clicking the point), and moving the point up or down (to adjust the dB level at a particular frequency). The user may delete such a point by pushing their finger on the point as described above for a predetermined extended period of time (e.g. 2 seconds, 3 seconds, etc.). In this manner the user can flexibly add points at various frequencies (even if not equally spaced apart), and can add as a many or as few points as they wish, and adjust the dB levels for each of these points for the left and right ear on the magnified view of box 1114, such that it may match an audiogram print-out they may have as a reference.

If a user does not have a pre-uploaded audiogram from an audiologist or an audiogram print-out, and therefore cannot utilize the Load From Cloud 1104 button or the Tune Manually 1106 button, the user may instead click button 1110. In this case, if the user clicks Take Non-Official Test for Tuning Settings button 1110, then the user is taken to a webpage on his/her smartphone wherein a hearing test may be conducted. For example, such a test may comprise playing audio signals at different threshold dB levels at different frequencies and testing whether the user can hear them or not. The user may be able to adjust the loudness level to just where he/she can hear the sound at a certain frequency, to find the dB level. This test can be conducted, in turn, for several frequencies from 0 to 10000 Hz. At the end of the test, the results may be sent directly back to the application to the magnified view of box 1114. In another embodiment, the user can receive an audiogram at the end of the test, which they may save or print-out, and can then click the Tune Manually button 1106 at screen 1102, and can tune the magnified view of box 1114 as described above, in accordance with the audiogram or audiological record they received.

Finally, if a user is not hearing impaired, he/she may still suffer hearing loss due to age. These effects are shown, for example, in the graph 1300b titled Age-Related Hearing Loss in FIG. 13B. From top to bottom, the plotted dotted lines represent gender-averaged ages 25, 35, 45, 55, and 65, in terms of dB hearing loss incurred. These lines are derived from gender specific data empirically measured through listening experiments. Olson, Harry F., *Modern Sound Reproduction* (1978), p. 325. As seen in the plotted lines of FIG. 13B, although an average 25 year old may have almost perfect hearing, as one gets older, one loses hearing especially in the 1000 to 8000 dB range, with as much as a 30 dB hearing loss occurring at 8000 Hz at age 65. Using third order polynomial equations 1302b, 1304b, 1306b, and 1308b, representing ages 35, 45, 55, and 65 (no equation for age 25 is given since it is just a constant 0 dB for all frequencies), the dB hearing loss is accurate at an R-squared value above 0.99 for all equations. These equations in turn, may be used in conjunction with a user's inputted age 910, as shown in FIG. 9 above, to automatically fill out an audiological record in the magnified view of FIG. 11. At any number of predetermined spaced intervals (e.g. 20, 30, 40, etc.) from 0 to 10000 Hz, equations 1302*b*, 1304*b*, 1306*b*, and 1308*b* can be used to find a user's age, using linear interpolation if necessary.

For example, if a user was aged 38, for any number of predetermined spaced intervals (e.g. 20) from 0 to 10000 Hz, the frequency value could be inputted as the x value into equations 1302*b* (representing a 35 year old user) and 1304*b* (representing a 45 year old user). Then by solving these equations for y with the specified x value, the dB hearing loss of a 35 year old user and 45 year old user at each of the frequency intervals could be determined. Finally, at each such interval, the y-value of equations 1302*b* and 1304*b* can be taken in a weighted average, commensurate with the distance of the age needed (38 in this case) to 35 and 45 years old, respectively, to give an estimate for the dB hearing loss of a 38 year old. That is, in this example, they value of 1304*b* representing a 45 year old user at each frequency interval could be given a lower weight of 0.3, since 38 years old is farther from 45 years old than 35 years old (45−38=7, and 1−(7/10)=0.3, where 10 is the number of years between 45 and 35). Conversely, they value of 1304*b* representing a 35 year old user at each frequency interval could be given a higher weight of 0.7, since 38 years old is closer to 35 years old than 45 years old (38−35=3, and 1−(3/10)=0.7, where 10 is the number of years between 45 and 35). In this manner, an estimate of dB hearing loss can be calculated at a predetermined number of frequency intervals for a user of any age.

Then, once the dB hearing loss is determined at a predetermined number of frequency intervals by the CPU of the smartphone 404, this data may be pre-populated as shown in the magnified view of box 1114, with the points corresponding to the frequency and hearing level loss calculated (where the hearing level loss corresponds to the threshold hearing level in dB along the y-axis of 1114). In this case, because there is no way to tell between the difference in the left and right ear, both left and right ear data, as shown in FIG. 11, may in this case be plotted along the same points. Thus compared to the graph in 1114 in FIG. 11, a graph plotted based on age-based tuning 1112 would have the same points at the same frequencies and dB level for both the left ear and right ear. In this manner, by choosing options 1104, 1106, 1110, or 1112, a user my set baseline tuning options reflected in the magnified view of box 1114.

These points may be used by the application running on smartphone 404, under the baseline tuning profile, as will be explained, to determine which frequencies of an input audio signal should be amplified for a user to be able to hear them better. When satisfied with his or her selection, a user may click the back button 1108, which will take them to the home screen shown in FIG. 7.

At the home screen 700 shown in FIG. 7, a user can choose to manually select a tuning profile, as explained above, by clicking the Change profile button 718. As explained above, once a user clicks the Change profile button 718, if option 1020*a* has been selected in FIG. 10 to save data when switching profile, raw data from the phone's (404) sensors, such as the location from the GPS, audio waveforms from a connected earpiece's (402) microphone, RSSI or distance data, and/or images from the phone's (404) camera may be saved to a local repository 304*a* or cloud repository 306*a*. Upon clicking the Change profile button 718, the application is taken to a menu of tuning profiles in FIG. 12.

Figure 12:
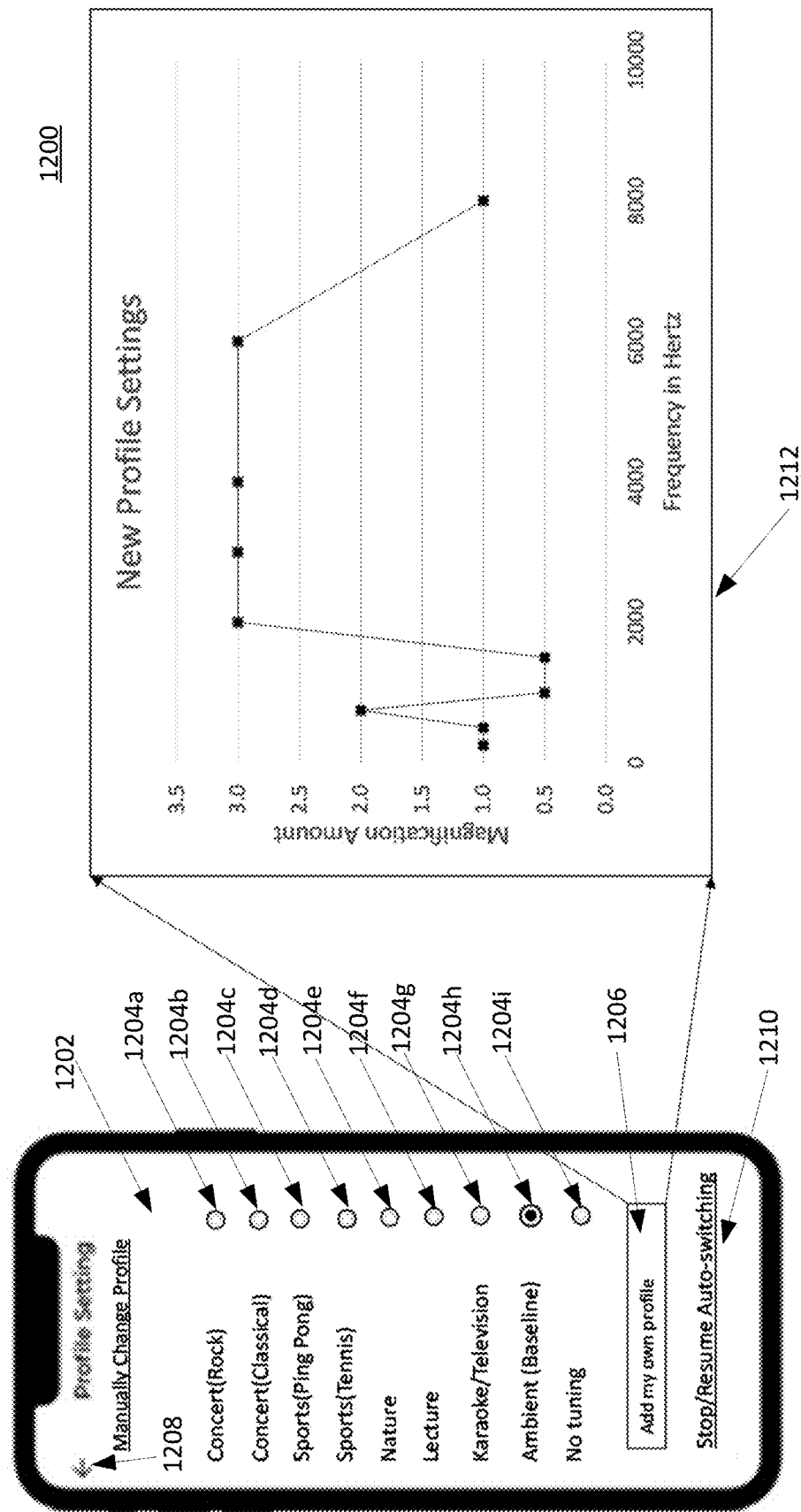
FIG. 12 is a diagram of an exemplary graphic user interface for configuring a new audio profile for tuning, according to some embodiments.

A menu of tuning profiles 1204*a*-1204*i* is shown on screen 1200 of FIG. 12. By choosing any of these profiles or adding his/her own, a user can selectively modulate an incoming audio signal to better suit the situation a user may find him/herself in, for optimal and enhanced comfort and acuity in their listening experience. A user may choose any of these profiles by selecting the appropriate radio button 1204*a*-1204*i*, as shown in the background area 1202 of screen 1200 of FIG. 12. Each profile in FIG. 12, and the amplification regime of each such profile, is explained herein.

For each tuning profile 1204*a*-1204*i*, the tuning profile will be described in the context of magnification amounts for certain frequencies. A graphical representation of a tuning profile, including profiles 1204*a*-1204*i*, may be seen in screen 1212 which shows a graph for new profile settings if the user clicks the Add my own profile button 1206. For example, in screen 1212, there are a number of intervals over the frequency range from 0-10000 Hz (x-axis), wherein the audio signal at these intervals can be magnified by variable amounts (y-axis), where the magnification amount defines the scaling factor of the received audio signal by smartphone 404 at these frequencies. In this manner, for each of tuning profiles 1204*a*-1204*i*, as well as any profiles added by clicking the Add my own profile button 1206, there are an associated number of intervals over the 0-10000 Hz frequency range with variable magnification amounts for each such profile.

For profiles 1204*a*-1204*g*, as well as any new profile settings added via clicking button 1206, the magnification amount is on top of baseline amplification described by tuning profile 1204*h*. That is, for example, a raw audio signal is first multiplied by the scaling factors at frequency intervals specified by tuning profile 1204*h*. Then the resultant audio signal is multiplied by the scaling factors (magnification amounts) at frequency intervals specified by any of profiles 1204*a*-1204*g*, or any profiles added via clicking button 1206.

As shown in background area 1202 of screen 1200, profile 1204*a* describes a rock concert. A user may choose this option, e.g., when they are at a concert with loud music such as rock music. Rock music in general varies in frequency range from 60 Hz to 8000 Hz, spanning almost the entire frequency spectrum of 0 to 10000 Hz. Thus for the majority of the frequency range baseline amplification described in 1204*h* may be used. However, rock music does have considerable low frequency sounds, wherein for example the most common pitch range a 4-string bass guitar has found to be from 41.2 Hz to 196.0 Hz. Abeber et. al., *Feature-based extraction of plucking and expression styles of the electric bass guitar,* 2010 IEEE International Conference on Acoustics, Speech and Signal Processing (2010), pp. 2290-2293. Thus, to enhance the listening experience of a user of earpieces 402 connected to the application running on smartphone 404, in an embodiment the range of 41.2 Hz to 196.0 Hz, or any subrange within this range, for an incoming audio signal, may be magnified by a predetermined amount (e.g., 2.0-5.0). Because this magnification is additional to that of baseline magnification 1204*i* (e.g., 2.0-5.0 times the magnification already conducted by the baseline tuning profile 1204*i*), and the incoming signal of rock music is usually quite loud and noise-laden, a magnification within this range may provide the best listening experience for the listener. Similarly, through empirical sensing of vibration measurements at rock concerts it has been found that foot stamping and hand clapping occurs at repetition frequencies between 2 and 3 Hz. Pernica, G., *Dynamic live loads at a rock concert* (1983), Canadian Journal of Civil Engineering. In an embodiment, this range (2 to 3 Hz) may also be magnified by a predetermined amount (e.g., in the range of 2.0-5.0), in addition to that of low frequency instruments as described above, so that a user may be able to experience the hand clapping or stamping aspects of a rock concert in an enhanced manner, which may enhance a user's aesthetic value of listening to the event by experiencing fellow concert-goers' participation. All other frequency intervals between 0 and 10000 Hz in the rock concert tuning profile 1204a may have a magnification amount of 1.0, meaning for these frequency intervals the audio signal equivalent to the audio signal resulting from baseline magnification of profile 1204i. In addition, when profile 1204a is chosen, because the volume of incoming audio signals at a rock concert is unusually loud (approximately 100 dB), the smartphone 404 may automatically turn on noise cancellation of connected earpieces 402. As explained above, turning on noise cancellation of such earpieces can actually help prevent hearing loss to the user by allowing the rock music to be heard at lower levels of volume. This does not affect the microphone of earpieces 402 which can continue to record signals from the concert and send these signals to smartphone 404 for audio processing with tuning profile 1204a.

For tuning profile 1204b, shown in FIG. 12, the user may choose this profile if he or she is listening to played classical music or is at a classical concert. In a symphony orchestra, 1 to 7 octaves may be used when evaluating real orchestra instruments and dynamics relevant in a musical context. Jaatinen et. al. *Octave stretching phenomenon with complex tones of orchestral instruments*. The Journal of the Acoustical Society of America 146, 3203 (2019). In evaluating these seven octaves, frequencies of musical notes based on the American Standard Pitch (A4=440 Hz as a tuning frequency) may be used, resulting in the following table.

TABLE 3

| Note | 1 | 2 | 3 | 4 | 5 | 6 | 7 |
|---|---|---|---|---|---|---|---|
| C | 33 | 65 | 131 | 262 | 523 | 1047 | 2093 |
| C# | 35 | 69 | 139 | 277 | 554 | 1109 | 2217 |
| D | 37 | 73 | 147 | 294 | 587 | 1175 | 2349 |
| D# | 39 | 78 | 156 | 311 | 622 | 1245 | 2489 |
| E | 41 | 82 | 165 | 330 | 659 | 1319 | 2637 |
| F | 44 | 87 | 175 | 349 | 698 | 1397 | 2794 |
| F# | 46 | 93 | 185 | 370 | 740 | 1480 | 2960 |
| G | 49 | 98 | 196 | 392 | 784 | 1568 | 3136 |
| G# | 52 | 104 | 208 | 415 | 831 | 1661 | 3322 |
| A | 55 | 110 | 220 | 440 | 880 | 1760 | 3520 |
| A# | 58 | 117 | 233 | 466 | 932 | 1865 | 3729 |
| B | 62 | 123 | 247 | 494 | 988 | 1976 | 3951 |

Each of the notes shown above in Table 3 may be amplified at the corresponding frequency by a magnification amount (e.g., 2.0-5.0). This amount may be adjusted to be higher or lower based on feedback from users. By magnifying each of the frequencies corresponding to musical notes specifically in the octave range used by an orchestra, where an orchestra primarily comprises instruments playing these notes, the auditory experience for a user listening to such an orchestra may be enhanced. By selectively amplifying only the frequency of the notes and not other frequencies, instruments playing these notes (at or near these frequencies) may be heard in a more crisp and sharp manner by the user through earpieces 402. In an embodiment, not only the exact frequencies above, but also a predetermined range below and above such frequency (e.g., 5 Hz, 10 Hz, 50 Hz, etc.) may also be amplified, to account for variation and noise.

A user may also enhance their auditory experience by using the application, as compared to normal baseline magnification, when playing sports. For example, if they are playing ping pong, they may select to use profile 1204c. It has been found that the ping pong balls used exhibit vibrational modes due to its small size starting around 5290 Hz, and in particular, the ball appears to radiate sound at 8.5-12 kHz after contact with a racket. Russell, Daniel. *Acoustics of ping-pong: Vibroacoustic analysis of table tennis rackets and balls*, Journal of Sports Sciences (2018), pp. 2644-2652. It may be vitally important for a user to hear the ball contact clearly, since a game such as ping pong is based on reflexes which may be enhanced by sound. Thus, the tuning profile for 1204c may accordingly amplify the range of 8.5-10 kHz, shown in graph 1212, compared to baseline amplification by a predetermined amount (e.g., 2.0-5.0), wherein said amount is variable and may be adjusted based on feedback by the user. All other frequencies (e.g., 0-8.499 kHz may have a magnification amount of 1 for this profile, meaning they are the same as the audio signal from the baseline amplification 1204i.

Similarly, if a user is playing tennis, he or she may select to use the associated profile 1204d shown in FIG. 12. As with ping pong, the sound of a tennis racquet hitting a tennis ball is distinct. In particular, such a sound has a frequency generally between 400-1000 Hz. Again, this is vitally important to a player as response to an opposing player hitting a ball is helped or coordinated by being able to clearly hear the opposing player hit the ball, such that a user may know from which direction the ball is coming, how much force it has been struck with, etc., such that the user can adjust and coordinate him or herself accordingly to prepare for their counter-attack. Thus, the tuning profile for 1204d may accordingly amplify the range of 400-1000 Hz, shown in graph 1212, compared to baseline amplification by a predetermined amount (e.g., 2.0-5.0), wherein said amount is variable and may be adjusted based on feedback by the user. All other frequencies (e.g., 0-399 Hz and 1001 Hz-10000 Hz) may have a magnification amount of 1 for this profile, meaning they are the same as the audio signal from the baseline amplification 1204i.

Enhanced hearing may also help a user from a safety and aesthetic point of view when they are surrounded by nature. In particular, for example, when taking a walk outside, a user may want to be more clued into natural sounds such as birds. In that case they may select to use the associated profile 1204e shown in FIG. 12. The frequency for bird calls of several types of species are shown below:

TABLE 4

| Bird Name | Frequency (Hz) |
|---|---|
| Small Minivet | 6950 |
| Black Hooded Oriole | 1950 |
| Scarlet Finch | 4000 |
| Golden Throated Barbet | 1200 |
| Sri Lanka Frogmouth | 1800 |
| Brahminy Starling | 3500 |
| Speckled Piculet | 6167 |
| Rose Ringed Parakeet | 4000 |
| Blue Bearded Bee Eater | 890 |

These figures have been derived from studies on bird call frequencies, where birds produce sound of their own characteristic frequency that can easily be distinguished. Moghal et. al. *Bird Calls Frequency Distribution Analysis to Correlate with Complexity of Syrinx*, Journal of Global Biosciences (2015), pp. 2486-2495. Thus, the tuning profile for 1204e may accordingly amplify the frequencies described in Table 4 above. In an embodiment, a range of 75 Hz above and below these frequencies may be amplified to account for the spectrum of distribution of frequencies when the above species make a bird call (the smallest full width half maximum, or FWHM, of the above species was found to be 150 Hz). Thus these ranges, corresponding to the ranges shown in graph 1212, compared to baseline amplification may be magnified by a predetermined amount (e.g., 2.0-5.0), wherein said amount is variable and may be adjusted based on feedback by the user. All other frequencies along the frequency interval shown in screen 1212 may have a magnification amount of 1 for this profile, meaning they are the same as the audio signal from the baseline amplification 1204*i*.

When a user is going to attend or listen to a lecture, they may choose to select the associated tuning profile 1204*f*, as shown in FIG. 12. Through sensitivity and specificity of quantitative parameters of voice and spectral range profile, determined via logistic regression analysis, the range of approximately 130 Hz to 1048 Hz has been found to be especially important for human voice. Siupsinkiene, Nora, *Usefulness of Spectral Range Profile in Quantitative Assessment of Voice Quality in Adults and Children*, International Journal of Clinical & Experimental Otalryngology (2017), pp. 87-95. Further, per the web content accessibility guidelines (WCAG) 2.0 standard (G56), it has been shown that amplifying speech sounds versus non-speech sounds, such that speech is 4 times louder than the background audio, allows people with hearing problems to understand speech clearly.

Thus, the tuning profile for 1204*f* may accordingly amplify the range of 130-1048 Hz, along the x-axis shown in graph 1212, compared to baseline amplification by a predetermined amount (e.g., 4.0). In other embodiments the magnification amount may be different than 4.0, and can be adjusted based on feedback by the user. All other frequencies (e.g., 0-129 Hz and 1049 Hz-10000 Hz) may have a magnification amount of 1 for this profile, meaning they are the same as the audio signal from the baseline amplification 1204*i*.

When a user is going to do karaoke or television audio, they may choose to select the associated tuning profile 1204*g*, as shown in FIG. 12. In this case, through the spectral analysis of voice when mixed with pop music or an audio soundtrack, it has been found that a listener can hear their own voice better amidst background noise in the 0.5-2.5 kHz range, such as pop music, if the frequency range 3-4 kHz is boosted. Borch et. al., *Spectral distribution of solo voice and accompaniment in pop music*, Logoped Phoniatr Vocol. (2002), pp. 37-41.

Thus for the purpose of doing karaoke, it is vitally important for a user, especially if he/she may be hearing impaired, to be able to hear their own voice clearly to be able to enjoy their performance with others. Therefore, the tuning profile for 1204*g may accordingly amplify the range of* 3-4 kHz, along the x-axis shown in graph 1212, compared to baseline amplification by a predetermined amount (e.g., 4.0). In other embodiments the magnification amount may be different than 4.0, and can be adjusted based on feedback by the user. All other frequencies (e.g., 0-2.99 kHz and 4.0-10 kHz) may have a magnification amount of 1 for this profile, meaning they are the same as the audio signal from the baseline amplification 1204*i*. In another embodiment, the range of 0.5-2.5 kHz may be lowered such that it has a magnification amount of (0.5-1). This embodiment may be used, e.g., when the dB level of background noise, such as a mixed in audio track, environmental noise, etc., is excessive, compared to the singing of a user. Furthermore this tuning profile can also be used in karaoke-like situations, such as television, where at times background noise during a television show may drown out what the actors/actresses are saying to each other. Thus when there is music or action scenes or the background noise on the television is loud otherwise, a user may also choose option 1204*g* to hear human speech on the television more clearly.

In the case that such a profile is used for karaoke, in an embodiment, there may be two tuning profiles, one for magnification of audio signal for output to earpieces 402, and another tuning profile for magnification of audio signal for output to a connected speaker 406. Because the audio of connected speaker 406 may be heard by many people who may not be hearing impaired, and not just the user the tuning profile may be the same as described (magnifying 3-4 kHz), but the magnification amount may be less (e.g. 2.0 instead of 4.0 above). In this manner, although the speech and voices of singers is still clear relative to the original audio track, the audio track can also be heard at a louder volume, such that a plurality of people who may be listening to the speaker may be able to enjoy the karaoke session to a greater degree. The magnification amount for the speaker 406 may not necessarily be 2.0 and can be changed based on user feedback. In this manner, the smartphone 404 at one time can cater to a user with specific hearing conditions, for an auditory experience through connected earpieces 402, and at the same time can cater to a plurality of other people listening to a connected output speaker 406 such that their listening experience is enhanced and not compromised based on the auditory requirements of the user, by independently controlling the magnification levels of both earpieces 402 and output speakers 406.

A user may select the baseline tuning profile 1204*h*, shown in FIG. 12, if they want to tune sound in a manner that is not specialized for any application, and performs amplification in a proportionate manner to the user's hearing requirements for all frequencies in the 0 to 10000 Hz range. For the baseline tuning profile 1204*h*, the amount of amplification, corresponding to the magnification amount shown in the graph of screen 1212 for the frequency range of 0 to 10000 Hz may be proportionate to the dB level of hearing lost indicated in the audiogram in the magnified view of box 1114 of FIG. 11 for this frequency range. For example, the amplification for an audio signal by smartphone 404 may occur over a predetermined number of bins, each bin defined between each of the intervals defined by points on the audiological chart 1114 from 0 to 10000 Hz. For each bin then, the average frequency from the audiological record chart in 1114 that has been loaded or tuned manually by the user may be used. That is, for example, if the dB hearing lost at 500 Hz recorded on 1114 is 10, and if the next point frequency-wise that is recorded on 1114 is that the dB hearing lost at 1000 Hz is 20, then a bin extends from 500 Hz to 1000 Hz. This bin takes the average between its end points, or 15 dB, as the dB value for amplification. In this manner bins are defined between all points previously recorded on 1114 (e.g., if using the audiological record shown in the magnified view of box 1114 in FIG. 11, bins would be defined between each of the square markers for the left ear, and between each of the triangle markers for the right ear). Then, each bin may be amplified by smartphone 404 by an amount corresponding to the dB value for amplification for each bin. For example, if the dB value for amplification is 60 for a particular bin, then the amount corresponding to the dB value for amplification may be 60 divided by a predetermined number, such as 6, making for an amplification of the audio signal by a factor of 10. The predetermined number may be any number, and may be tuned over time such that an amount may be magnified to ensure a comfortable listening experience for the user. A range of 4-8 may be used in exemplary embodiments. That is, the dB value for amplification for a particular bin may be divided by a number in the range of 4-8 to determine the factor of amplification or how many times to scale the original audio signal for the range of frequencies in the bin.

Furthermore, this technique of binning and averaging endpoints of magnification may be applied to all profiles 1204a-1204i in the same manner as described with 1204h, wherein as shown in the graph of screen 1212 bins may be defined by the intervals between points, and the magnification amount of the endpoints of each interval may be used for an average magnification value over the interval.

Finally, a user may also choose for there to be no tuning at all, by selecting option 1204i as shown in FIG. 12. If a user selects this option, the raw audio signal, as detected want to select such an option when he or she feels that he is able to hear the sound without any extra tuning required, including even baselining tuning 1204h for matching the user's sound requirements. This may occur, e.g., in instances of where the user is primarily listening to low frequency sound, and only has high frequency hearing loss. In this case, because most of the sounds heard are at low frequency, which the user can hear fine, no tuning may be required. This halts CPU processing of tuning, and gives the user a quick way to give feedback to the application that no further tuning is required.

As explained above, the user may add his or her own profile by the clicking on the Add my own profile button 1206. As with button 1114 on FIG. 11, the application may show a graph 1212 on screen 1202 when this happens. The user can then add points or delete points, and change their magnification amounts in the same manner as described with adding points, removing points, and altering their y-values described with respect to FIG. 11. When the user is done they may press the back arrow 1208, at which point the new profile is added to the list of profiles displayed 1204a-1204i, and appears below 1204i in the same manner, with its own radio button. In this way the user can flexibly add customized profiles for his/her own customized applications where amplification of specific frequencies may be needed. Finally, there is a button 1210 shown in FIG. 12 that the user may push for stopping or resuming Auto-switching. The user may click button 1210 if they would like to stop any profile-changing regime (any of 1004b, 1006b, 1010b, or 1012b as explained above with reference to FIG. 10) from automatically switching between tuning profiles. In this manner any automated profile-switching is ceased by the CPU, and profiles may only be changed manually. Whenever the user clicks the back button 1208, and has finished their selection of a profile they would like to tune with, the profile, and smartphone 404 sensor data at that instant in time (GPS sensor data indicating location, camera sensor data taking a picture of the user's environment at that point in time, and audio signal recorded at that instant in time from a connected microphone, the earpiece (402) microphone, or the smartphone (404) microphone) may be saved as training data to the local repository 304a or cloud repository 306a. In an embodiment, as will be explained, audio signals by the earpiece (402) microphone, connected microphone (e.g. 408), or smartphone (404) microphone may be recorded for a period of time (e.g., 5 minutes, 10 minutes, 15 minutes, etc.) after the user clicks the back button 1208. Then, as a result of clicking the back button 1208, the user may return back to the home screen 700 shown in FIG. 7.

If the user clicks the Karaoke Mode 706 button on the home screen 700 of FIG. 7, he or she may enter a series of screens for selecting Karaoke options, which are described herein. When a user enters the Karaoke Mode by clicking on button 706, the application first transitions to screen 1400 shown in FIG. 14. Here the user may select several options to set up a karaoke session such that the audio output of the karaoke session may be selectively tuned, modulated, and output back to connected earpieces 402, and optionally a connected speaker (e.g. speaker 406) in an altered form such that it enhances user and participant experience for not only the user of earpieces 402, but e.g. all participants in a room surrounding a speaker 406.

First the user can choose an audio source in drop-down list box 1404a of background area 1402. Here the user can select from previously loaded song files (examples of Option 1-Option 5 are shown as sample songs which may be selectable by a user) by simply clicking on the file in the drop-down list box 1404a. In addition, instead of selecting a previously loaded song files a user may also load a new file by clicking a button 1404b. If the user clicks on this button 1404b, then he or she may pick a file from the internal storage of the smartphone 404, or enter a uniform resource locator (URL) which may contain a streamable audio file. Alternatively, upon clicking 1404b, a user can also pick a file or URL to be opened by an external media application when a user clicks the Play/Record button 1418. Upon the user performing the clicking of 1404b in either embodiment and selecting a file, the new audio file or URL may appear in the drop-down list 1404a. Instead of loading a file by clicking on one in drop-down list 1404a or loading a new file 1404b, a user may also load or create a playlist by clicking on link 1404c. Upon doing so, the application transitions to screen 1500 shown in FIG. 15, which will be described.

Figure 15:
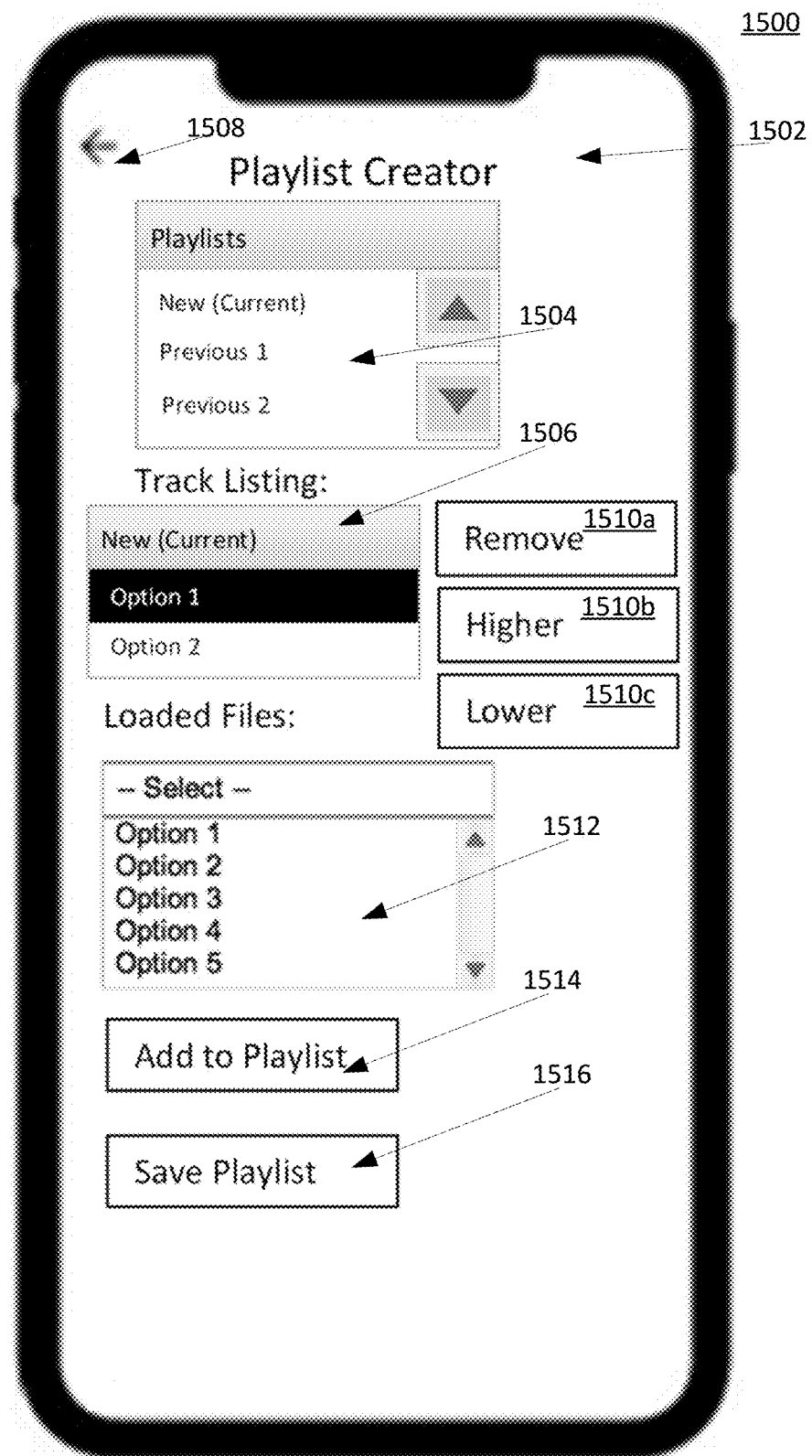
FIG. 15 is a diagram of an exemplary graphic user interface for creating or editing playlists under a karaoke mode, according to some embodiments.

When the user clicks on a link 1404c, the application transitions to screen 1500 of FIG. 15, describing a Playlist Creator, as shown in background area 1502. In particular a window of playlists may be shown as a scrollable list 1504. If the current track listing 1506 is saved by the user by clicking button Save Playlist 1516, then the current playlist of 1506 shows up as a "New (Current)" entry as shown within the scrollable list of 1504. Within the displayed track listing of the play list, in list 1506, the user may select a track by clicking on it (as shown in FIG. 15 the track titled 'Option 1' within list 1506 is highlighted and selected). Then the user may click buttons 1510a-1510c to perform operations on the selected track.

By clicking the Remove 1510a button, the user may remove a selected track from the track listing list 1506. By clicking on the Higher 1510b button, the user may move a selected track higher in the list, indicating that its play order may be earlier (e.g., the top entry in the list 1506 may be played first, the second entry may be played second, etc.). Conversely, by clicking on the Lower 1510c button, the user may move a selected track lower in the list, indicating that its play order may be later. In this manner the user can customize the order and listing of tracks to be played within the playlist. All of the files that have been loaded into the application environment (by either being previously loaded or loaded via clicking 1404b as described with regard to FIG. 14) are shown in the drop down list 1512, which may match the contents of drop down list 1404a shown in FIG. 14. The user may add any of the loaded files of drop down list 1512 to the current track listing 1506 by simply selecting the relevant option (by clicking on the track name or selecting multiple track names, e.g., Option 1-Option 5 etc.). Then after the user has made his or her selection of files he may want to add to the playlist, they can click the Add to Playlist button 1514, which adds any selected files in dropdown list 1512 to the current Track listing 1506. Finally, when the user is satisfied with his or her track listing, they may save the playlist by clicking on button 1516. Doing so saves the playlist as a new playlist in scrollable list 1504 (e.g. the New (Current) playlist). The user can then select their desired playlist in scrollable list 1504, and hit the back button 1508, which loads a selected playlist from scrollable list 1504 into the application for the karaoke session.

Figure 14:
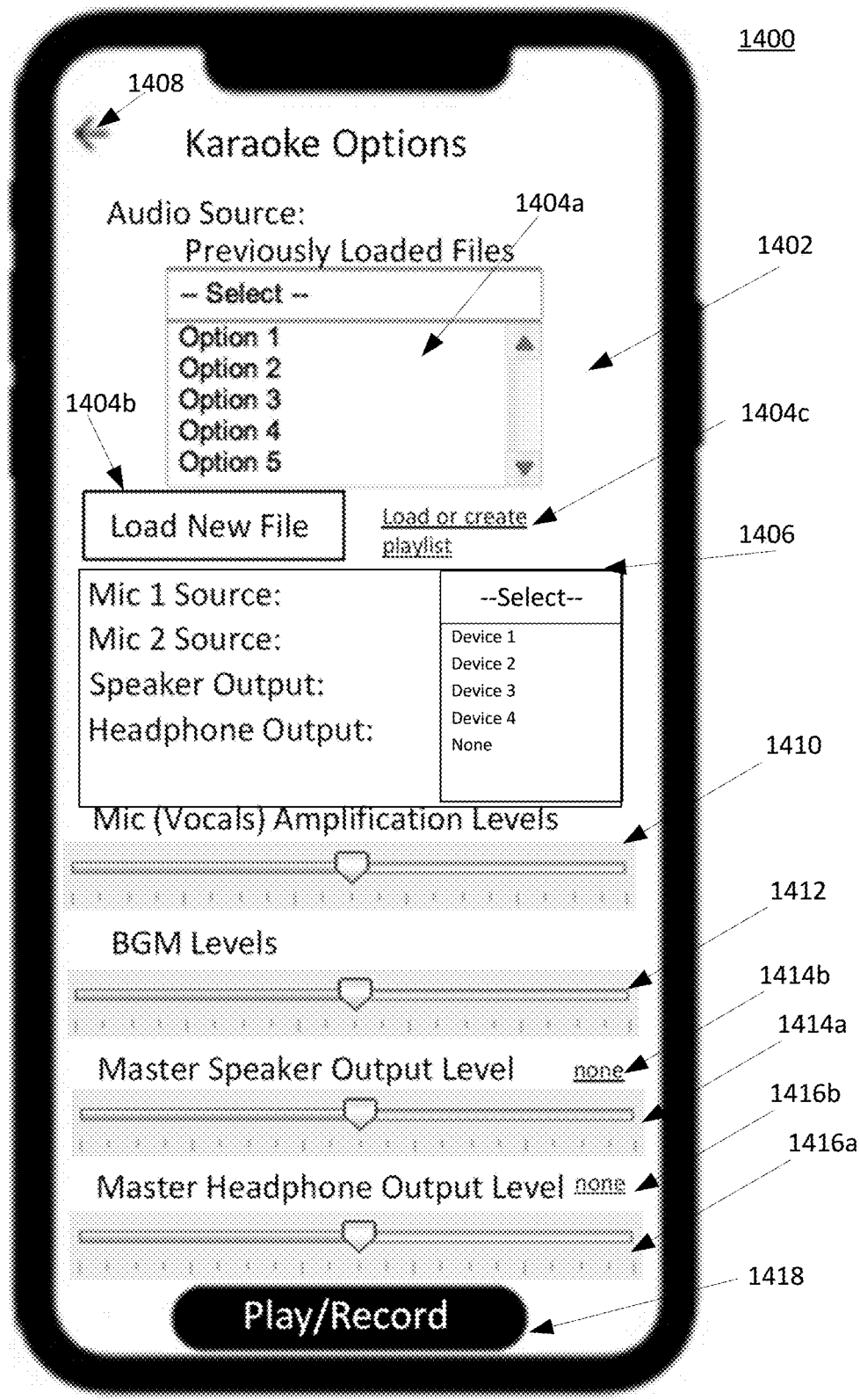
FIG. 14 is a diagram of an exemplary graphic user interface for configuring options for a karaoke mode, according to some embodiments.

In window 1406 of FIG. 14, a user may select input/output devices for a karaoke session through a drop down list for a Mic 1 Source, a Mic 2 Source, a Speaker Output, and a Headphone Output. For each of the input/output devices to be selected, the same drop down list, as shown in window 1406, is shown to the user. In this drop-down list all devices which were configured by the user at the Bluetooth devices screen 800 as explained above with reference to FIG. 8 will be displayed (e.g. Devices 1-4 shown in FIG. 14 correspond to the 4 devices which are paired in window 802 of FIG. 8), as well as a "none" option which appears below the devices. Thus, a user may configure a Mic 1 Source input corresponding to any of the connected devices, a Mic 2 Source input corresponding to any of the connected devices, a Speaker output corresponding to any of the connected devices, and a Headphone output corresponding to any of the connected devices. As an example, the headphone output may be earpiece 402, the speaker output may be connected speaker 406, the Mic 1 source may be the microphone of earpiece 402, and the Mic 2 Source may be a connected microphone 408. In this manner, the user may sing without even holding a connected microphone 408, as his voice may be detected by the microphones of earpieces 402 (Mic 1 Source input). He/she may be joined by a fellow singer or companion who is singing into microphone 408 (Mic 2 Source input). Both of these inputs may then be mixed with an audio file, modulated, and output to the connected speaker 406 (Speaker output) and/or connected earpiece 402 (Headphone output). In this manner a number of permutations and combinations are envisioned. For example both Mic 1 and Mic 2 source inputs of window 1406 may be connected mics 408 without using microphone input from the connected earpiece 402, sound output may only be delivered to an earpiece 402 or speaker 406 (by selecting "none" for either Speaker output or Headphone output in window 1406), etc. In one embodiment, if a television audio signal is directly connected to earpiece 402 (e.g., via smartphone 404, as explained above and shown in FIG. 4), then a connected television 408 can also be selected as a Mic 1 Source. In this case, for example, if the Mic 2 Source is selected as the microphone of earpiece 402, then both of these audio sources may be mixed, tuned, and output back to the earpiece 402 of the user, such that the user can clearly hear sounds in his ambient environment as well as the television in a clear manner. The default tuning profile used for output in the karaoke session is Karaoke/Television 1204g as described in FIG. 12 (the smartphone 404 automatically uses this profile to modulate the sound output from the karaoke session because it enhances user voice relative to background pop music for both the connected earpiece 402 and/or connected speaker 406), although any one of profiles 1204a-1204i may be used by smartphone 404 in the karaoke mode in other embodiments.

The user may select the vocal amplification levels by dragging a slider 1410. This may adjust the magnification amount for the tuning profile (e.g., 1204g) used by the smartphone 404 for tuning the output of the karaoke session relative to the default level for output to the connected earpiece 402 (wherein the default magnification amount for output to a connected speaker 406, as explained above with reference to profile 1204g, may be a predetermined amount less than the magnification amount for the earpiece 402). For example, if the user wants the vocals to be magnified more than 4.0 times the baseline level as described above, he may drag the slider to the right of center (wherein a central slider level is shown in FIG. 14 which may correspond to 4.0, or the default magnification level for vocals at 3-4 kHz for connected earpiece 402 in profile 1204g). On the other hand, in the same manner, if a user wants the vocals to be magnified less than 4.0 times the baseline level, he may drag the slider to the left of center. Similarly, in an embodiment the user can also control the default magnification amount for the background music range of 0.5-2.5 kHz to the earpiece 402 by controlling the BGM Levels slider 1412. In an embodiment, the user may also control the predetermined audio output level of both a speaker 406 and connected earpiece 402 by sliders 1414a or 1416a. The center level may correspond to a comfortable listening level as described above (of 70 Hz or 82 Hz, etc., or as may be altered due to the considerations described above), and by dragging the output level sliders to the left and right, the user can selectively change the volume output levels to their desired value. Importantly, while the audio is playing (as will be described with reference to screen 1600 in FIG. 16), the user can always go back to the screen in FIG. 14 and adjust magnification and output slider levels accordingly, to customize their listening experience to suit their needs and the needs of any people they are conducting the karaoke session with. Once the user clicks the play/record button 1418, the application moves to the playing screen 1600 of FIG. 16.

At the play/record screen 1600, the user may click a play button 1606b to start playing any audio files or playlist he/she may have loaded into the application. The user can skip to an earlier track (this action performs nothing if the first track is still playing) by pressing button 1606a or skip to a later track (this action performs nothing if there are no more following tracks) by pressing button 1606c. A slider bar 1604 shows the play progress of the current track, enabling the user to drag the slider to earlier or later if he would like to skip a portion of the track, or hear a portion of the track again, accordingly. The user may tick a checkbox 1610, titled Mix Mics and Track. If this checkbox is checked, audio tuning using profile 1204g (or another profile that may be pre-selected by smartphone 404 for karaoke mode) is performed on a mixed audio signal combining all Mic Source Inputs as well as any loaded audio tracks. This box may not be checked, e.g., when the user is only performing tuning of audio on signal from Mic Source inputs of window 1406. For example, if Mic Source 1 is a connected television 410 and Mic Source 2 is the microphone of the earpiece 402, then audio tuning may be performed with no audio track, but rather on an audio signal combining the Mic Source inputs, and then outputted back to the earpiece 402 and/or connected speaker 406 so that a user can hear voices from the television more clearly, using e.g., the karaoke/television tuning profile 1204g. That is, by default, tuning in the karaoke session is performed using the default profile 1204g on a mixed audio signal of singular (if only one Mic Source input) or combined Mic Source inputs (if there are two Mic Source inputs), and a played audio track is only combined into the audio signal that is tuned if the checkbox 1610 is checked.

In an embodiment, as described above, if the user chooses a file or URL to be opened by an external media application when clicking 1404b in FIG. 14, then audio tuning using profile 1204g (or another profile that may be pre-selected by smartphone 404 for karaoke mode) is performed on a mixed audio signal combining the audio signal of the external application and all Mic Source Inputs.

Figure 16:
FIG. 16 is a diagram of an exemplary graphic user interface for mixing and saving audio under a karaoke mode, according to some embodiments.

In an embodiment, for enjoying the karaoke session in the future, a user may choose to record any profile-based tuning performed by clicking on 1618. For example, if box 1610 is checked and the user clicks on button 1618, he/she may record the output of a combined tuned audio signal of Mic Source 1, Mic Source 2, and a background audio track. By default the tuned output for connected earpieces 402 is recorded when a user clicks on 1618. When the user clicks on 1618, a dynamic status label 1612 appears which indicates the recording time elapsed and is updated every second. Once the user wants to finish his recording, he may click 1614 if he would like to save the recording or 1616 if he would like to delete it. At any time while a track is playing on screen FIG. 16, as mentioned, a user may click on arrow 1608, which would take the user back to the screen of FIG. 14, where he may adjust any of the magnification or volume output levels as mentioned. Then the user may click the Play/Record button 1418 again, which would take them to the still playing audio file in FIG. 16, wherein the status bar 1604, and label 1612 would be updated indicating the current status in time of a played track or recording, respectively. To exit karaoke mode altogether, once the user clicks on button 1614 or 1616, the karaoke session is ended and the application exits to the home screen 700 of FIG. 7. If the record button 1618 is not clicked by the user, then only button 1614 appears on the bottom, and the text of the button reads "Finish" instead of "Finish and Save" as shown in FIG. 16. If the user does not record by clicking 1618, and clicks the Finish button 1614, the application also exits karaoke mode and proceeds to home screen 700.

Figure 17:
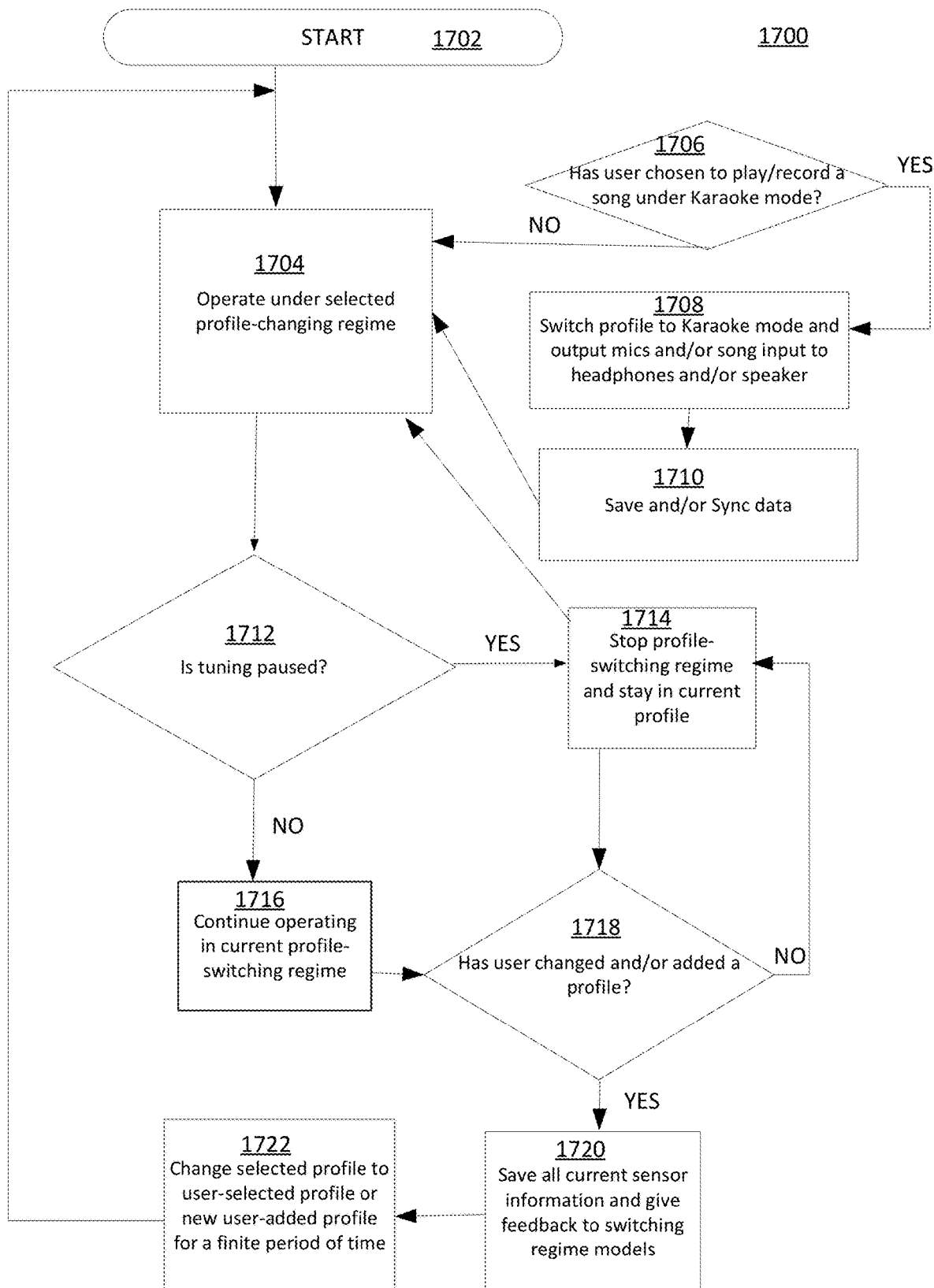
FIG. 17 is a flow diagram illustrating a process for operating under a selected profile-changing regime, under a specific profile, or under a karaoke mode, according to some embodiments.

The sequential flow of the application of smartphone 404 for operating under a profile-changing regime or manual tuning, or outputting audio under karaoke mode, is described in flow diagram 1700 of FIG. 17. The application may by default (as explained above) be under a profile switching regime, such as Default AI (1212b). In this case, as shown at step 1704, it may operate under such a profile-switching regime (whether Default AI or Time Only 1004b, Location Only 1006b, or Low-Powered AI 1010b) to automatically periodically check the sensor data of smartphone 404, and switch a tuning profile, as will be described below. While operating under such a profile-switching regime, the application may check periodically at predetermined intervals of time (every 30 seconds, minute, 5 minutes, 10 minutes, or other chosen interval) to see if tuning is paused at step 1712.

By checking if tuning is paused, the application checks to see if the user has clicked either button 720 in FIG. 7 for stopping tuning altogether, or if the user has clicked button 1210 in FIG. 12 for stopping auto-switching under the profile-changing regime (and wants to switch to manual changing of tuning profiles). If the user has clicked button 720, the process remains at 1712 and does not continue until the user once again clicks button 720 to resume tuning.

If the user has clicked button 1210 in FIG. 12 for stopping auto-switching under the profile-changing regime, then the process continues to step 1714 (YES at is tuning paused at step 1712). In this case, the process stops the auto-switching action of the profile-switching regime, stops the periodic sensing of smartphone 404 sensors under the profile-changing regime, and remains in a current tuning profile. For example, under the Default AI profile-switching regime, the application may be tuning input a audio signal using the Nature profile 1204e at a certain point in time. Then, if the user clicks button 1210 in FIG. 12, by moving to step 1714, the process makes the application remain in the Nature profile 1204e, while stopping the Default AI switching regime 1012b from sensing smartphone 404 sensor data or changing the tuning profile to another tuning profile in 1204a-1204i of FIG. 12. At step 1714, the application proceeds to step 1718, and continuously checks to see whether the user has changed the profile, by selecting another radio button than the previous profile (in this example, Nature 1204e) in FIG. 12, and has clicked the back button 1208. Once the user picks another profile in FIG. 12 and clicks back button 1208, then the process moves to step 1720 under manual-switching mode, wherein as described above, sensor data from the smartphone 404 (including location data, audio signal data, and camera image data) may be saved to the local repository 304a or cloud repository 306a, and this data may be given as feedback to the profile switching regime used so that it can dynamically use such data to improve its training and accuracy for classification of tuning profiles. Then, once this data is saved, the application may, in step 1722, change the current tuning profile to the user-selected profile. After a finite period of time (e.g., 30 seconds, 1 minute, 5 minutes, or any other chosen period of time), the application may go back to step 1704. Because the user has clicked button 1210 in FIG. 12, the process proceeds directly to step 1712, and goes back to step 1714. The process continues in this manner until button 1210 in FIG. 12 is clicked again, in which case the process may go back from step 1714 to step 1704 (as shown by the arrow in FIG. 17) when the button 1210 is clicked again, meaning that auto-switching under the profile-changing regime has been resumed.

On the other hand, if a user has neither clicked button 1210 in FIG. 12, nor button 720 in FIG. 7 at step 1712 of the process, then the application at step 1712 continues to step 1716 (NO at is tuning paused), wherein it continues to operate in a current profile-switching regime, and can automatically periodically check the sensor data of smartphone 404, and switch a tuning profile based on its classification decision, as will be described below. However, even while operating in the current profile-switching regime, a user may want to manually switch to a tuning profile of their own choice (out of profiles 1204a-1204i in FIG. 12) for a period of time. Thus the application checks, at step 1718 In this case, as described above, if they select a different profile in FIG. 12 by clicking button 718 on home screen 700, and then click the back button 1208 on FIG. 12. If the user does so, the application may move to step 1722, and as described save sensor data from the smartphone 404 data to local repository 304a or cloud repository 306a, and give feedback in the form of additional training data to the profile-changing regimes to improve their accuracy. In this case, as described above, for a chosen finite period of time, the automatic profile-changing regime may remain in the manually chosen user-selected profile by the user, at step 1720. Finally, after this finite period of time, the automatic profile-changing regime may go back to collecting sensor data from the smartphone at step 1704, and changing tuning audio profiles accordingly.

In this diagram, after the application starts running on smartphone 404, and is operating under a profile-changing regime at step 1704 (which automatically happen since a profile-changing regime is set by default), it is also constantly checking at step 1706 whether the user has chosen to play or record a song under karaoke mode (by clicking on Play/Record button 1418 described above in FIG. 14). In an embodiment, checking of step 1706 may occur independently of the process of steps 1704 and 1712-1722 as described above, at predetermined intervals of time (every 30 seconds, 1 minute, 5 minutes, or any other chosen interval of time). At any time in the process of steps 1704 and 1712-1722 as described above, if at step 1706 the application checks and determines that the user has chosen to play/record a song under Karaoke mode (YES at 1706), then the process of steps 1704 and 1712-1722 immediately terminates and transitions to the process of steps 1708.

If a user has not chosen to play or record a song under Karaoke Mode 706 (NO at step 1706), then as shown in FIG. 17, the application continues to execute the process of audio tuning under the profile-changing regime. On the other hand, if the user has chosen to play or record a song under karaoke mode (YES at step 1706), the application stops audio tuning under the profile-changing regime, and instead proceeds to step 1708. At 1708, the application performs audio tuning under profile 1204g by default (although another profile 1204a-1204i may be chosen as explained above) under the karaoke mode. The audio tuning under karaoke mode occurs as described above with respect to FIGS. 14-16, wherein the audio signal that is tuned may be a combination of Mic Source inputs as well as a background track, and can be output to connected earpieces 402 and/or a connected speaker (e.g. speaker 406). As explained with respect to FIG. 16 and buttons 1614 and 1616, the karaoke mode may end by the user clicking either button 1614 or 1616. In this case, as described in step 1710 a saving or syncing of data may occur, and the application then proceeds back to the home screen 700, where it goes back to operating under the default profile changing regime of step 1704.

Figure 18:
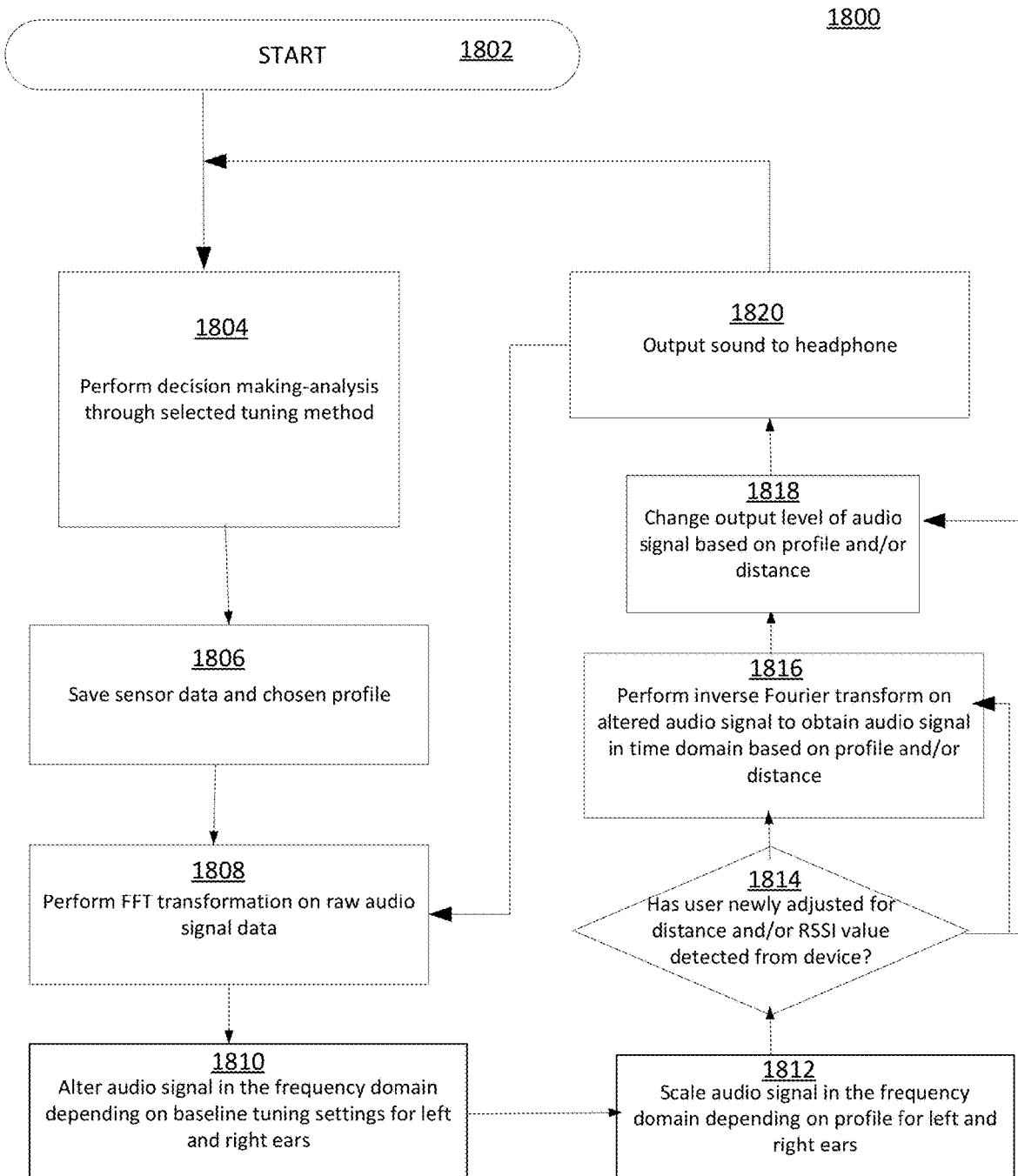
FIG. 18 is a flow diagram illustrating a process for operating under a selected profile-changing regime to perform a decision-making analysis according to a selected tuning method, and output an audio signal to an earpiece, according to some embodiments.

The flow diagram 1800 of FIG. 18 describes in detail the operation of the application under a profile changing regime, as well as the steps for audio tuning performed under a specific tuning profile (whether that tuning is performed under a profile-changing regime, manual tuning, or under karaoke mode). For any of the profile-changing regimes 1004b, 1006b, 1010b, or 1012b, each of the profile-changing regimes, after starting at step 1802, performs a decision-making analysis by which a particular tuning profile (one of 1204a-1204i) is selected. Each of these decision-making analyses is explained below with reference to FIGS. 22-27. Independent of which analysis is used, as explained above with reference to FIG. 17, each profile-changing regime periodically temporarily saves smartphone (404) sensor data (including GPS location data, audio signal data, and camera picture data) as described above, temporarily, to either local repository 304a of the smartphone 404 or cloud repository 306a of a connected server module 306 (e.g. connected cloud server 414). Then, upon saving such data, the profile-changing regime engages in the decision-making analysis, at the end of which a singular tuning profile 1204a-1204i is selected. If the singular tuning profile 1204a-1204i selected is the same as a profile which is already being used for audio tuning by the application (e.g. the application is already tuning audio using profile 1204a, and the decision-making analysis of the profile-changing regime also results in selection of 1204a), the application remains at step 1804, and waits for the next interval to check smartphone sensor data and select a singular tuning profile. Intervals for periodic checking at step 1804 may be spaced apart by any chosen pre-determined length of time (5 minutes, 10 minutes, 15 minutes, etc.).

If, on the other hand, the singular tuning profile 1204a-1204i selected by the decision-making analysis of the profile-changing regime in 1804 is different than a profile which is already being used for audio tuning by the application (e.g. the application is already tuning audio using profile 1204a, and the decision-making analysis of the profile-changing regime results in selection of any of 1204b-1204i), then the application may move onto step 1806 with this selected singular tuning profile.

At step 1806, the chosen tuning profile is recorded by the application as a user setting or user data in local repository 304a or cloud repository 306a, as explained above. Additionally, sensor data from the smartphone 404, such as the GPS sensor location data, microphone audio signal data, and camera picture data, may be saved to either local repository 304a or cloud repository 306a. In an embodiment, this data, which comprises a training point for the profile-changing regimes described above (a saved tuning profile and associated sensor data), may be deleted if a user manually switches the tuning profile away from the selected tuning profile within a predetermined length of time (e.g., 10 minutes, 15 minutes, or any other chosen length of time, wherein said length of time may be less or more than the periodic checking interval conducted in step 1804). In this case, if the selected tuning profile is switched before the predetermined length of time, the saved sensor data may not properly correspond to the selected tuning profile, and that may be why the user has chosen to select a different tuning profile in a short interval of time, implying that the automated selected profile may have been incorrect. In this way, only robust automated selected profiles, which withstand a user's scrutiny, are used as training points. This process of selectively choosing training points (saved tuning profiles and their associated sensor data) enhances the training process of the profile-changing regimes. Once a training point is saved, as described above, in an embodiment the microphone may continue to record audio signal data for a predetermined length of time (e.g., 5 minutes, 10 minutes, or any other chosen interval).

If a user picks a manual profile as described in the process of FIG. 17 at step 1718, then the process shown in FIG. 18 begins at step 1806, wherein the chosen profile by the user is saved as a training data point for profile-changing regimes and associated smartphone (404) sensor data is also saved. In this case, all such training points are saved, and it is not detected if the manually selected tuning profile is switched before the predetermined length of time. Because this tuning profile has been chosen by the user him/herself, it is assumed that it properly corresponds to the saved sensor data, implying the reason the user chose the tuning profile is because he/she would like to apply the specific tuning characteristics of a specific profile 1204a-1204i to current surroundings including the sensed data of smartphone 404.

In either of the two cases described above (manual or automatic selection), the application then proceeds to step 1808 from step 1806. Alternatively, if the application is in karaoke mode at step 1708 (wherein the selected tuning profile is automatically 1204g and no associated saving of sensor data is needed), the application proceeds directly to step 1808 with profile 1204g for tuning of the audio using the 1204g profile.

At step 1808, the application uses the chosen tuning profile to perform audio tuning. In particular, at step 1808 the application uses the smartphone 404 to record an audio signal from the microphone of connected earpiece 402, from the microphone of the smartphone 404 itself, and/or from a connected microphone 408. However, additionally, in karaoke mode, as described above with reference to FIG. 14, both the microphone of a connected earpiece 402 to the smartphone 404, as well as an additional Mic Source such as connected microphone 408 or even sound from a connected television 410 may be used, combined with a background audio track optionally, for a mixed audio signal). The smartphone records such an audio signal to the local repository 304*a* or cloud repository 306*a* in bins of a predetermined interval of time (e.g., a 5 minute audio signal may be recorded in 5 second increments, or bins) in raw waveform (WAV) format, or records in MPEG audio layer III (mp3) and decodes the mp3 in WAV format as a raw waveform. The bins may be not only of 5 second increments but any chosen length of time to enable smooth processing.

As soon as a bin is recorded, the application at step 1808 performs a transformation Then for each bin of time, at step 1808, the application transforms the raw waveform into the frequency domain using a fast Fourier transform (FFT). This process is shown in flow diagram 2100 of FIG. 21, where a raw waveform 2102 represents an audio signal as wave amplitude over time. After the FFT transform is performed, the audio signal is represented as dB level sound output in the frequency domain a shown in FFT graph 2104.

At step 1810, the baseline tuning profile 1204*h*, is first used to amplify the dB level sound output in graph 2104. In particular, as described above, the baseline tuning profile is representing in bins with an average amplitude of magnification, and for each such bin describing a different frequency interval, the audio signal as shown in graph 2104 can be accordingly scaled. For example, if there is a bin from 4000 Hz to 6000 Hz as shown in the chart of screen 1212 in FIG. 12 with an average magnification amount of 3.0, then the audio signal of graph 2104, in the region from 4000 Hz to 6000 Hz, may be scaled or multiplied, by 3.0. Because there are separate defined bins and average magnification amounts for the left and right ear depending on the defined baseline tuning profile 1204*h* as explained above, this process is conducted separately for the left and right ear at step 1810. This is also shown on the title of graph 2104 in FIG. 2104, where for example bin 2104*a* may be magnified by a particular same amount by both the left and right ear, but bin 2104*b* may be magnified by a different amount by the left ear and a different amount by the right ear, resulting in two separate overall magnified graphs 2104.

Next, at step 1812, if any of profiles 1204*a*-1204*h* has been chosen as the selected tuning profile, after the baseline tuning, additional tuning is performed based on the profile of 1204*a*-1204*g*. The same binning technique as explained in 1810 is applied to the resultant graph from step 1810, after amplifying the signal per the user's baseline tuning settings. By processing tuning in this manner, the audio signal is first modulated to account for any hearing impairments the user may have, and then may additionally process audio for specialized applications as described above with reference to profiles 1204*a*-1204*g*. If the No tuning profile 1204*i* is the selected tuning profile then steps 1808 onward for the process in flow diagram 1800 are skipped.

Thus at step 1812, if any of profiles 1204*a*-1204*h* has been chosen as the selected tuning profile, the application performs binning according to the specific profile (each bin being defined between points of the profile as shown, e.g., in the chart of screen 1212 in FIG. 12), and magnifies the resultant left and right ear graphs of step 1810 at the frequency range of each bin of the profile of 1204*a*-1204*h* by the applicable average magnification amount. That is, for example, if at step 1812, any of profiles 1204*a*-1204*h* had a bin from 4000-6000 Hz with an average magnification amount of 3.0, as shown in the chart of screen 1212 in FIG. 12, it would take the modified left and right ear graphs 2104 from step 1810 (where in the example above this range may have already multiplied the audio signal by a factor of 3.0, assuming this was applicable for both the left and right ear) and multiply it again by 3.0 (making the overall scaling factor at the bin's frequency range 9 times the original audio signal's dB level). It is important to note that because there is no separate right or left ear profile for profiles 1204*a*-1204*g*, the amplification magnitude over the frequency ranges of the bins of these profiles is multiplied to the resultant left ear graph and right ear graph resulting from step 1810 separately, and results in two separate further magnified graphs 2104, one for the right ear and one for the left ear.

Next, at step 1814, the two separate further magnified graphs 2104 may be further altered based on the distance of the user from a sound source. As explained above, the distance of the user from the sound source, once an initial RSSI value or camera image capture method is used, may be continuously recorded using the accelerometer of the smartphone 404. In this case, at step 1814, if the distance from the sound source to the user is more or less than a predetermined distance value (where such a value may be 6 feet, as described above, or another value), then the further magnified graphs 2104 can be multiplied by a further lower scaling factor across all frequencies proportional to the distance further than 6 feet. For example, if the user is 12 feet from the sound source, the magnified graphs 2104 of step 12 may be multiplied by a scaling factor of 0.9 for all frequencies in the 0-10 kHz range, if the user is 18 feet from the sound source, the magnified graphs 2104 of step 12 may be multiplied by a scaling factor of 0.8, etc. A lower scaling factor is used in step 1814 as the user is further away from the sound source than a normal predetermined distance, because the level of noise in the frequencies that are being amplified in steps 1810 and 1812 increases as the user is further away from the sound source. Conversely, as the user is closer to the sound source a scaling factor of 1.1 may be used at 3 feet. A higher scaling factor may be used in step 1814 as the user is closer, because there may be less noise in the frequencies that are being amplified in steps 1810 and 1812. As with the volume output level described above, an upper and lower threshold may be imposed for this scaling factor (e.g., 1.1 no matter how close the user approaches the sound source, or 1.2 no matter how far the user goes away from the sound source) in order to not over-magnify or under-magnify the audio signal. In this manner the audio magnification level may be smoothened to account for extra noise or less noise in an audio signal due to distance.

Additionally, if profile 1204*a*, because by its default nature an audio signal of a rock concert is filled with extra noise compared to a normal recording situation (e.g., ambient surroundings), a lowering scaling factor (e.g., 0.8, 0.9, or any other chosen lowering scaling factor), may be used to account for extra noise being amplified in this profile only and may be multiplied over all frequencies to the further magnified graphs 2104 for the left and right ear from step 1812. In this manner the audio magnification level may also account for profile-based differences in noise at frequencies being amplified. This checking for distance at step 1814 may occur for each block of audio that is being magnified, or may occur at regular predetermined intervals (1 second, 5 seconds, etc.).

If the distance has not changed from a previous measurement, or no RSSI signal has been detected or image capture been made to detect an initial distance, then no adjustments are made at step 1814, and the process of the application continues to step 1816. In an embodiment, if an output to a speaker is also desired (as is the case in karaoke mode as described with reference to FIG. 14 above), then a separate magnified graph, averaging the signals representing the magnified graphs 2104 for the left ear and right ear (averaging the dB output level value at each frequency in Hz) in the FFT domain, may be prepared. In this case, a lower scaling factor (e.g., of 0.725, 0.5, etc.) may be applied to the voice frequency region of 3 kHz-4 kHz used in karaoke mode, as is described above, and multiplied to the averaged graph, since the voice output for the earpiece 402 is not equally suited for being output from the speaker 406 at such a high magnitude. Accordingly, a different scaling factor for the voice frequency region of 3 kHz-4 kHz may be used, and may be higher or lower as needed, such that a suitable output to the a connected speaker 406 can be made, while at the same time a different magnification amplitude can be used in the graphs 2104 in the left ear and right ear that are designated for output to the connected earpiece 402. Furthermore, a different scaling factor (e.g., of 1.25, 0.725, 0.5, etc.) may also be applied to the music frequency region of 0.5-2.5 kHz used in karaoke mode, as is described above, and multiplied to the averaged graph, since the background music levels for the earpiece 402 may also not be equally suited for being output from the speaker 406 at such a high magnitude. In this manner, a different magnified graph 2104 for output to a connected speaker 406 can be prepared in the karaoke mode.

After step 1814 has been completed (if applicable), at step 1816, the application performs a reverse inverse fast Fourier transformation (iFFT) to the magnified graphs 2104 from step 1816. This result of this transformation process is shown in graphs 2106 and 2108, representing a raw waveform audio signal of wave amplitude (y-axis) vs. time (x-axis) for both the left ear and right ear, respectively. Additionally, if applicable, a magnified averaged raw waveform audio signal similar to 2106 and 2108, as described above, may be prepared for output to a connected speaker 406.

At step 1818, the output level of the audio signal is changed based on the profile selected or the adjusted distance of the user determined in 1814. The initial predetermined audio output level, the process of outputting audio at such a level (with reference to Table 2 and FIG. 13A), and the adjustments made due to distance and profile are described above. Additionally, if profile 1204a has been chosen, the volume output may be made to be approximately 3 dB (or any other predetermined number of dB) lower than the predetermined audio output level after all adjustments have been made as described above. This is because due to its nature, a rock concert is filled with loud noises amidst multiple instruments. Conversely, if profile 1204b has been chosen, the volume output may be made to be approximately 3 dB (or any other predetermined number of dB) higher than the predetermined audio output level after all adjustments have been made as described above. This is because due to its nature, a classical concert starts off low, and the audience may prefer to hear it a little louder as sound can be faint. Further, as described above, if daily noise exposure level limits have been reached, the maximum audio output level to connected earpieces 402 may be capped at a predetermined upper threshold, e.g. 85 dB.

Finally, at the selected final volume level of output, at step 1820, both the left and right ear audio signals, in raw waveform format, corresponding to signals 2106 and 2108, are output from the smartphone 404 to the connected earpieces 402. Further, if applicable, in karaoke mode, a raw waveform signal corresponding to the magnified averaged raw waveform signal prepared in 1816 may be output to a connected speaker 406.

Figure 22:
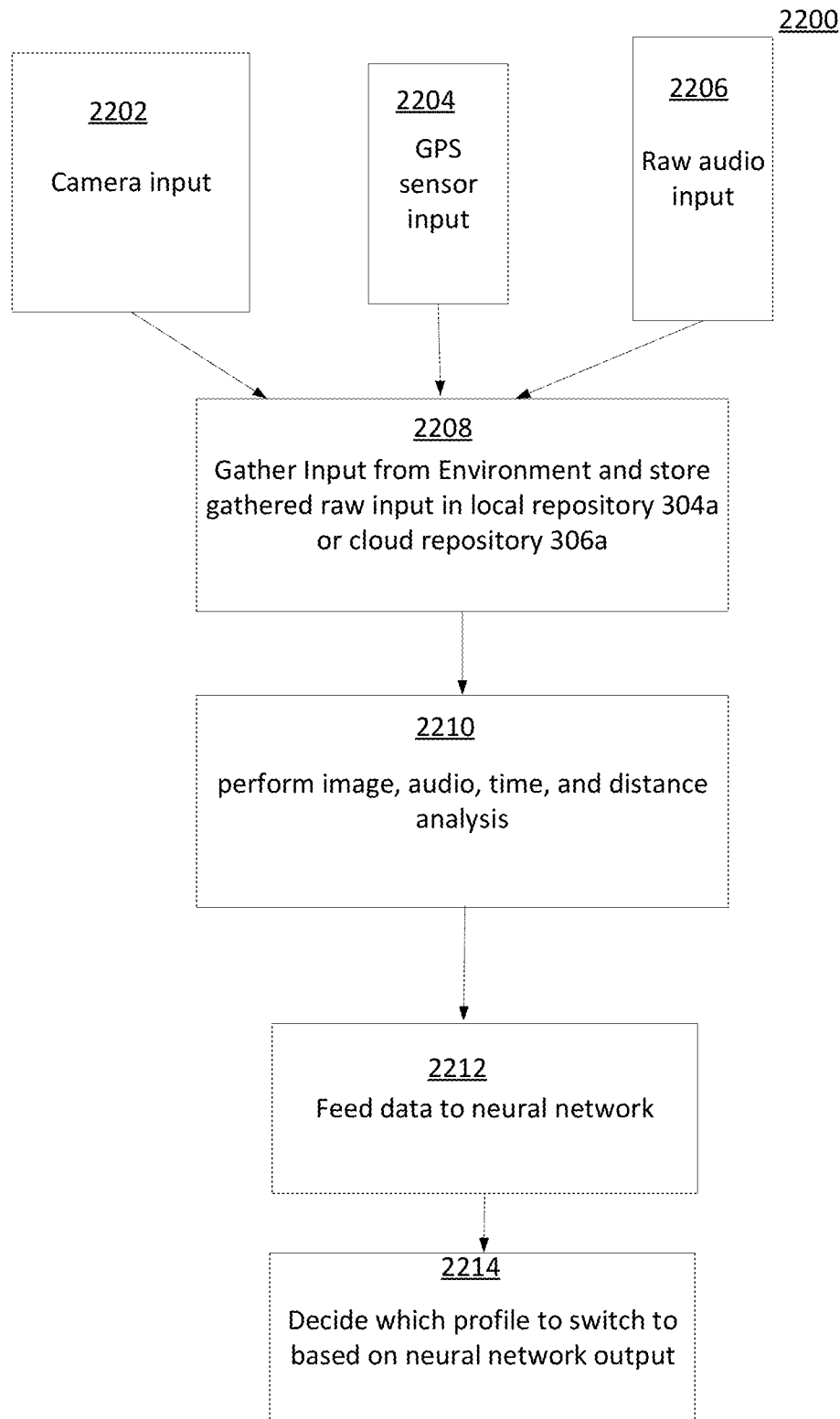
FIG. 22 is a flow diagram illustrating the process for a profile-changing regime gathering input for a surrounding environment, and performing a decision-making analysis using a neural network, according to some embodiments.

The individual profile-changing regimes 1004b, 1006b, 1010b, and 1012b are described with reference to FIGS. 22-27 herein. The flow diagram 2200 in FIG. 22 represents the overall flow of the Default AI profile-switching regime 1012b. In this profile-switching regime, when periodic checking occurs in the decision making-analysis step of 1804 in FIG. 18, corresponding to steps 1704 and 1716 in FIG. 17, sensor data of smartphone 404 including camera input 2302, GPS sensor input 2304, and raw audio input 2306 is first gathered by the smartphone 404 at step 2208 and stored in the local repository 304a or cloud repository 306a, depending on a user-set settings for storing data as described above.

The camera input 2302 that is stored may be in the form of an image taken by the camera at the moment when the periodic checking occurs. For example, if period checking occurs every 5 minutes (although it can be at any predetermined length of time such as 10 minutes, half-hourly, hourly, daily, etc.), then the camera input 2302 may be an image taken by the camera every 5 minutes. The image may be taken without alerting the user as shown in FIG. 19. Instead, the smartphone application may automatically control the camera of the smartphone 404 and take a full view picture of the surroundings of smartphone 404 whenever period checking occurs. The GPS sensor input 2204, which utilizes the GPS sensor of smartphone 404, may report sensor input in the format of latitude and longitude coordinates of the smartphone 404 whenever periodic checking occurs at the corresponding steps in FIGS. 17 and 18 described above. The raw audio input 2206 may be in two forms for the Default AI switching regime 1012b.

A first form of raw audio input 2206, may be a brief audio snapshot in time, at the time that periodic checking occurs. That is, for example, a recording of a small duration (e.g., 5 seconds, 10 seconds, 15 seconds, 30 seconds, etc.) may take place at the moment when periodic checking occurs at the corresponding steps in FIGS. 17 and 18 above. For example, if periodic checking occurs every 5 minutes, then a small duration audio capture, of for example 10 seconds, may occur every 5 minutes, and this small duration audio capture, which may be recorded to local storage 304a or cloud storage 306a in the form of a raw waveform or mp3 file, may be considered as an audio snapshot in time.

A second form of audio input, which is only applicable in the profile-switching regime of Default AI 1012b, may be a longer term capture of audio for a prolonged period of time after periodic checking occurs. That is, for example, if periodic checking occurs every 30 minutes, then, first a small duration audio capture of 10 seconds, as described may be made, followed by a long duration audio capture of e.g., 5 minutes (or 10 minutes or any predetermined amount of time). This second form of audio input is only applicable for the Default AI 1012b profile-changing regime as its analysis, which will be described, takes more CPU power for the smartphone 404 to process.

After these raw inputs have been gathered and saved in the local repository 304a or the cloud repository 306a, analysis is performed comparing the currently received raw inputs to training data. Training data points are accumulated as described, where for example whenever the user manually selects a profile, the selected profile in FIG. 12, as well as associated sensor data (including the second form of prolonged audio input 2206 in an embodiment as described above) may be saved to the local repository 304a or cloud repository 306*a*. In an embodiment as described above, training data points may also be saved, along with associated sensor data (including the second form of prolonged audio input 2206 in an embodiment as described above) after any profile-switching regime process finally decides and selects a tuning profile, and a user does not manually change this profile for a predetermined period of time.

In particular, for the Default AI profile-changing regime, in performing the image, audio, and distance analysis, four metrics may be used associated with each profile (1204*a*-1204*i*), one for input 2202, one for input 2204, and one for each type of input 2206 described above (where there are two types of input 2206 as described). This makes for a total of 36 metrics, with 4 metrics for each type of profile 1204*a*-1204*i*.

For each metric for input 2202, the camera image taken at the moment of periodic checking at step 2208 may be compared to past camera images associated with a specific profile (1204*a*-1204*i*). That is, each of the training points, saved as described above, contain sensor data, including a captured image from the camera of smartphone 404, that is associated with a specific tuning profile (1204*a*-1204*i*) chosen (or automatically chosen, as the case may be). Thus, the training points may be grouped by specific tuning profile (1204*a*-1204*i*), and for each metric, sensor data captured at periodic checking in step 2208 can be compared to sensor data for a particular tuning profile's training points. In this case for example, for profile 1204*a*, the camera image taken at the moment of periodic checking at step 3308 may be compared to all previous camera images that are part of training points associated with 1204*a*. Like this, there may be 9 metrics for input 2202, wherein for each such metric, the camera image taken comprising input 2202 may be compared to all previous camera images that are part of training points associated with a particular profile (1204*a*-1204*i*).

To compare images together, a mean structural similarity index measure (MSSIM) may be used, that compares local patterns of normalized pixel intensities. This measure is useful because it accounts for artifacts which may be present in an image, and separately accounts for luminance, contrast, and structure at discrete local portions of the image, providing a measure indicating the degree to which a second image may be structurally similar to a first. That is, using such a measure, if surroundings in two pictures are mostly the same but objects are displaced by location, then a measure such as MSSIM will still indicate a high degree of similarity. The images may first be converted to floating point integers, etc., by the smartphone 404, in order to compare their pixel intensities. Then for two sub-images x and y of the same size (which may me equal sized portions of two separate images), the SSIM index may be represented by the following equation:

$$SSIM(x, y) = \frac{(2u(x)u(y) + C1)(2\theta(xy) + C2)}{(u(x)^2 + u(y)^2 + C1)(\theta(x)^2 + \theta(y)^2 + C2)} \quad (4)$$

In the equation 4, $u(x)$ may represent the mean pixel intensity of image x (found by adding up all pixel intensities in the floating point representation of the image, and dividing by total number of pixels), and similarly $u(y)$ may represent the mean pixel intensity of image y. $\theta(x)$ may be defined by the following formula:

$$\theta(x) = \left(\frac{1}{N-1}\sum_{i=1}^{N}(x(i) - u(x))^2\right)^{0.5} \quad (5)$$

In equation 5, the quantity $\theta(x)$ represents the standard deviation across the image of x, and serves as an estimate of pixel intensity contrast over the area of the image. $\theta(y)$ is also defined in the same manner as $\theta(x)$ in equation 5, wherein all x variables may be replaced with y variables.

In equation 4, $\theta(xy)$ is defined by the following formula:

$$\theta(xy) = \frac{1}{-1}\sum_{i=1}^{N}(x(i) - u(x))(y(i) - u(y)) \quad (6)$$

In equation 6, the quantity $\theta(xy)$ represents a correlation coefficient corresponding to the cosine of the angle between vectors x−u(x) and y−u(y).

In equation 4, C1 is a constant that may be defined by the following formula:

$$C1 = (K1L)^2 \quad (7)$$

In equation 7, the quantity K1 may be a constant, such as 0.01 or another constant that is much less than 1, and L may be the dynamic range of pixel values (e.g. 255 for 8-bit grayscale images).

In equation 4, C1 is a constant that may be defined by the following formula:

$$C1 = (K2L)^2 \quad (8)$$

In equation 8, the quantity K2 may be a constant, such as 0.03 or another constant that is much less than 1, and L may be the dynamic range of pixel values (e.g. 255 for 8-bit grayscale images).

In this manner, all required quantities in equation 4 can be calculated for two given aligned sub-portions of the same size of two respective images, and their structural similarity can be calculated. To compare two full size images X and Y, wherein in this case one may be input 2202 taken by a smartphone camera, and another may be a past image that is part of a training point's sensory data associated with a particular tuning profile (any of 1204*a*-1204*i*), the local statistics $u(x)$, $u(y)$, $\theta(xy)$, $\theta(x)$, and $\theta(y)$, based on equations 4-8 above, may be calculated within a local 8×8 pixel square window, which then may move pixel by pixel over an entire image. At each step, the local statistics and SSIM index may be calculated within the local window. Then at the end of the process, we can use the following formula to calculate a mean structural similarity index measure from all of the windows the SSIM is calculated for over the entire image:

$$MSSIM(X, Y) = \frac{1}{M}\sum_{j=1}^{M}SSIM(x(j), y(j)) \quad (9)$$

In equation 9 above, for M total windows of 8×8 pixel local square windows, which move pixel by pixel over the entire full size images for X and Y, wherein the local square windows are aligned with each other location-wise on X and Y, respectively, the average or mean SSIM is then calculated by computing the sum of all of these windows and dividing by the total number of windows M.

In an embodiment, to increase accuracy, the local window metrics my be computed with a circular-symmetric Gaussian weighting function with standard deviation of 1.5 samples. By doing so, in each window, points towards the center of the window are given more weightage when computing SSIM than points towards the outer edges of the window.

Using this measure, for a singular metric, a MSSIM measure may be calculated, indication the percentage similarity of two pictures, for the camera input 2202 compared to all of the images associated with a particular tuning profile. To compare the camera input 2202 to all of the images associated with a particular tuning profile (any of 1204a-1204i), the camera input 2202 may be compared using MSSIM to each one of the images associated with the particular tuning profile, and then all of these MSSIM measures, in turn, may be averaged to give a final resultant measure for the metric. For example, for the metric of comparing camera input 2202 to all of the images associated with the tuning profile 1204a, the MSSIM measure comparing the camera input 2202 to each one of the images associated with the tuning profile 1204a may be calculated, and then all of these MSSIM measures may be averaged to give a final measure indicating the overall degree of similarity of the camera input 2202 to the images associated with tuning profile 1204a in a collective manner. In this way, 9 separate metrics using the MSSIM technique, comparing the camera input 2202 to all of the previous images associated each of the tuning profiles 1204a-i, may be calculated, and the image analysis portion of step 2210 may be completed.

For the distance analysis portion of step 2210, the GPS sensor input 2204, in the form of latitude and longitudinal coordinates, may be compared to all of the GPS sensor coordinates data associated with a specific tuning profile (1204a-1204i), for all 9 of the profiles 1204a-1204i, comprising another set of 9 metrics.

To compare the coordinates data to all of the GPS sensor coordinates data associated with a specific tuning profile, first, the number of total GPS sensor coordinates associated with the specific tuning profile that are within a specific distance of the GPS sensor input 2204 may be used:

$$d = R*2*\arctan\left(\sqrt{\left(\sin^2\left(\frac{\varphi}{2}\right) + \cos\varphi1*\cos\varphi2*\sin^2\left(\frac{\Delta\lambda}{2}\right)\right)}\right), \quad (10)$$
$$\left(\sqrt{\left(1 - \left(\sin^2\left(\frac{\Delta\varphi}{2}\right) + \cos\varphi1*\cos\varphi2*\sin^2\left(\frac{\Delta\lambda}{2}\right)\right)\right)}\right)$$

In equation 10, φ represents latitude, λ represents longitude, R is the Earth's radius (6371 km), and d represents the 'as-the crow-flies distance between the points. Using equation 10, or another method, the distance between GPS sensor input 2204 and each point of the GPS sensor coordinates associated with the specific tuning profile may be calculated. For example, for the metric related to profile 1204a, the distance between GPS sensor input 2204 (calculated at each period checking at the steps of FIG. 17 and FIG. 18 as explained above) and each GPS sensor coordinate of each training point associated with profile 1204a may be calculated. Then the number of such GPS sensor coordinates of training points associated with profile 1204a that have a distance d from GPS sensor input 2204 that is less than a predetermined distance (e.g, 100 meters, though it can be any predetermined distance) may be tallied. Thereafter, the number of total GPS sensor coordinates of training points associated with profile 1204a that have a distance from the GPS sensor input 2204 that is less than the predetermined distance may be divided by the total number of total GPS sensor coordinates of training points associated with profile 1204a. This final proportion may comprise the distance metric for profile 1204a. In this manner, the distance metric is computed for each of profiles 1204a-1204i, and the distance analysis portion of 2210 is completed in this manner.

In an embodiment, if the distance metric exceeds a certain threshold (e.g., 95 percent, though it can be any predetermined percentage) for a particular profile of 1204a-1204i and not other profiles, then the profile-changing regime may directly skip to step 2214, and decide that the particular profile is the profile that should be switched to. This is because at such a high threshold, where other profiles do not have this threshold, it may be that the location itself is highly correlated to a particular tuning profile (e.g., when the user goes to this location only, they use a particular tuning profile), and thus the application can save valuable battery life because it is likely that the user would want to choose the particular profile at this location.

For the audio analysis portion of step 2210, there are 9 metrics present for the audio snapshot in time (the first form of raw audio input 2206), and there are 9 separate metrics present for the prolonged audio snapshot (the second form of raw audio input 2206), one GPS sensor input 2204, in the form of latitude and longitudinal coordinates, may be compared to all of the GPS sensor coordinates data associated with a specific tuning profile (1204a-1204i), for all 9 of the profiles 1204a-1204i, comprising another set of 9 metrics.

Figure 21:
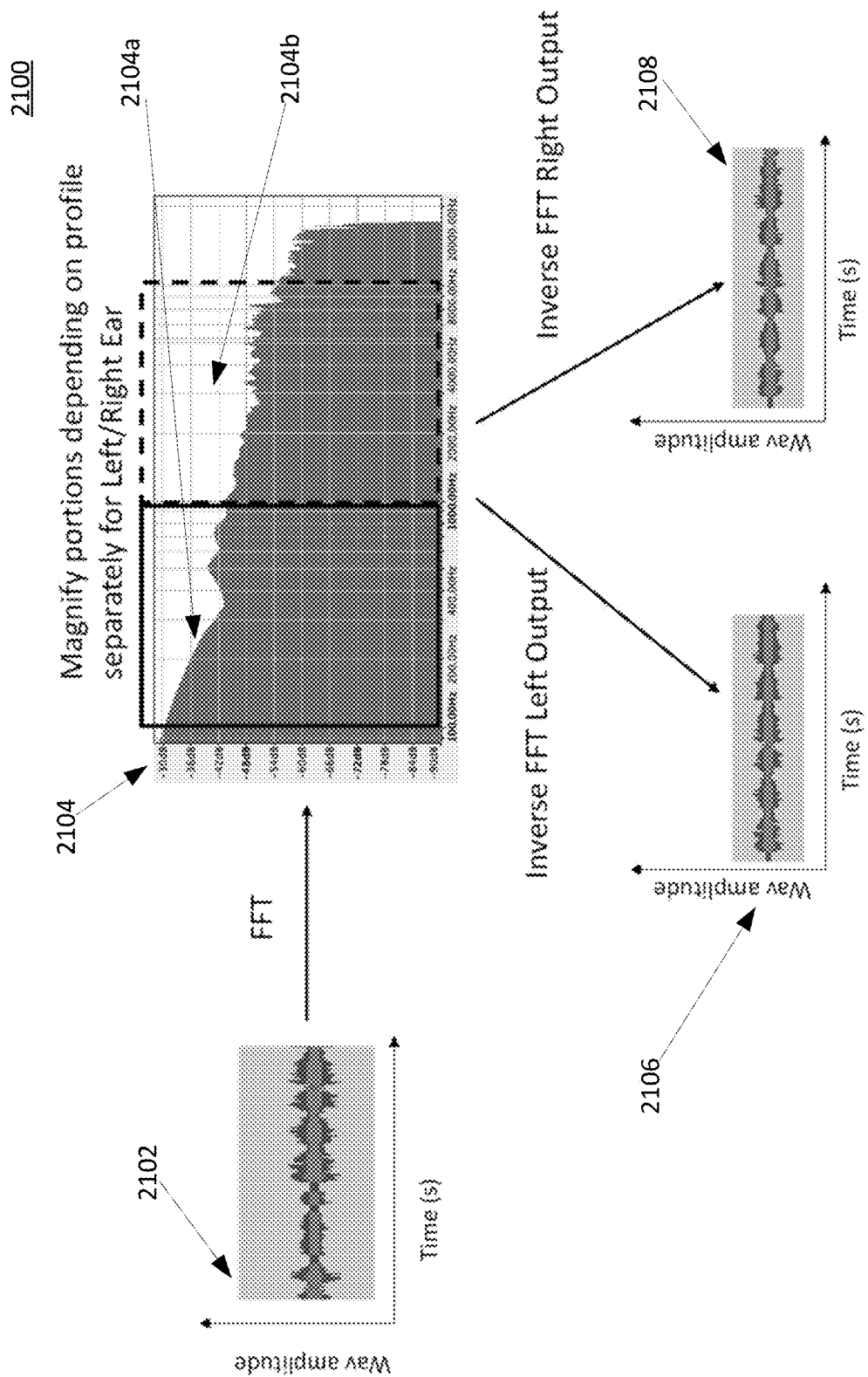
FIG. 21 is a flow diagram graphically depicting the process for transforming, selectively modulating, inversely transforming, and outputting an audio signal per a tuning profile, according to some embodiments.

For each of the tuning profiles 1204a-1204i, the first form of raw audio input 2206, or the audio snapshot in time, is first transformed from a raw waveform file (WAV), or decoded to a WAV file from an mp3 file, and is then transformed. Once in a WAV format, the audio snapshot in time is transformed in a similar manner as shown in FIG. 21, wherein the WAV format of wave amplitude (y-axis) over time (x-axis) is transformed using a fast Fourier transform (FFT) to the frequency domain, and the transformed audio signal is represented by a dB level output in the frequency domain as shown in graph 2104. Then, each of the audio snapshots of previously saved training points corresponding to one of the tuning profiles 1204a-1204i taken within a predetermined amount of time (e.g., 1 hour, 2 hours, or any predetermined amount of time) before or after the time the audio snapshot in time for 2206 was taken, are also transformed in the same manner using an FFT transform to the frequency domain, represented by a dB level output in the frequency domain as shown in graph 2104. Then, the difference in spectral distribution is assessed between the audio snapshot in time from input 2206 and each of the transformed audio snapshots of training points corresponding to the tuning profile. Finally, these spectral distribution differences are added up and averaged to give a final figure as a metric assessing the closeness of the first form of input 2206 and the audio snapshots of training points associated with a tuning profile that are taken at a time close to the first form of input 2206.

For example, if the training points correspond to tuning profile 1204a and the first form of input 2206 took an audio snapshot in time at 12:35 PM, then first, the difference in spectral distribution is assessed between the audio snapshot in time from input 2206 in the frequency domain and each of the audio snapshots of training points corresponding to tuning profile 1204a that were taken within one hour of 12:35 PM (11:35 AM-1:35 PM) in the frequency domain (these snapshots may have been taken on previous days or the same day). Then, these differences are added up and averaged, giving a final figure for the metric of time analysis, assessing the closeness of spectral distribution of the audio snapshot in time of input 2206 and audio snapshots captured within the same time period on different days associated with a particular tuning profile.

To assess the difference in spectral distributions between the audio snapshot in time from input 2206 in the frequency domain and each of the audio snapshots of training points corresponding to a tuning profile within the predetermined period of time, a measure called the Kullback-Leibler divergence may be used, according to the following formula:

$$D(a,b)=\Sigma_{i-1}^{N}\alpha(x(i))*(\log \alpha(x(i))-\log b(x(i))) \tag{11}$$

The equation 11 indicates the expectation of the log difference between the data in the original distribution a with the approximating distribution b multiplied by the magnitude of the original distribution a. In this case D (audio snapshots, input 2206) may be computed for each of the audio snapshots of training points corresponding to a tuning profile within the predetermined period of time, and at the end all of the divergence measures may be added and averaged, giving a final metric for time analysis for the first input 2206 relative to a specific tuning profile (such as profile 1204*a*). This process may then be repeated for all of tuning profiles 1204*a*-1204*i*, giving one separate metric for time analysis for the audio snapshots associated with each of the tuning profiles 1204*a*-1204*i*.

For each of the tuning profiles 1204*a*-1204*i*, the second form of raw audio input 2206, or the prolonged audio capture, is first transformed from a raw waveform file (WAV), or decoded to a WAV file from an mp3 file, and is then transformed. Once in a WAV format, the audio snapshot in time is transformed in a similar manner as shown in FIG. 21, wherein the WAV format of wave amplitude (y-axis) over time (x-axis) is transformed using a fast Fourier transform (FFT) to the frequency domain, and the transformed audio signal is represented by a dB level output in the frequency domain as shown in graph 2104. Then, each of the prolonged audio captures of previously saved training points corresponding to one of the tuning profiles 1204*a*-1204*i* taken, are also transformed in the same manner using an FFT transform to the frequency domain, represented by a dB level output in the frequency domain as shown in graph 2104. It is noted that such a spectral distribution, rather than comparing for similarity near a particular point in time, as with the first form of input 2206, is a more holistic image of a composite dB level output for varying frequencies over a prolonged period of time, and is assessed for similarity with other such images corresponding to one of the tuning profiles, to see if there is similarity in the type of audio listened to when such a tuning profile is chosen.

Then, the difference in spectral distribution is assessed between the prolonged audio exposure as the second form of input 2206 and each of the transformed audio snapshots of training points corresponding to the tuning profile. Finally, these spectral distribution differences are added up and averaged to give a final figure as a metric assessing the closeness of the second form of input 2206 and the prolonged captures of training points associated with a tuning profile.

For example, if the training points correspond to tuning profile 1204*a* and the second form of input 2206 took an prolonged audio capture of 10 minutes, then first, the difference in spectral distribution is assessed between the this prolonged audio capture as transformed in the frequency domain, and each of the prolonged audio captures of training points corresponding to tuning profile 1204*a* in the frequency domain. Then, these differences are added up and averaged, giving a final figure for the metric of audio analysis, assessing the closeness of spectral distribution of the prolonged audio capture of input 2206 and prolonged audio captures associated with a particular tuning profile.

To assess the difference in spectral distributions between the prolonged capture of i input 2206 in the frequency domain and each of the prolonged captures of training points corresponding to a tuning profile the same Kullback-Leibler divergence measure, as explained above with reference to equation 11 may be used. In this case D (prolonged captures associated with a tuning profile, prolonged capture of input 2206) may be computed for each of the prolonged captures of training points corresponding to a tuning profile, and at the end all of the divergence measures may be added and averaged, giving a final metric for audio analysis for the second input of form 2206 relative to a specific tuning profile (such as profile 1204*a*). This process may then be repeated for all of tuning profiles 1204*a*-1204*i*, giving one separate metric for audio analysis for the audio snapshots associated with each of the tuning profiles 1204*a*-1204*i*.

It is also possible in other embodiments, as described above, that there may be additional user added tuning profiles, in addition to tuning profiles 1204*a*-1204*i*. In this case, metrics for distance, audio, and image analysis may be computed for these additional profiles as well, in addition to the 36 metrics described above. Further, it is also possible that any permutation or combination of metrics described above may be used for this or any of the profile changing regimes 1004*b*, 1006*b*, 1010*b*, and 1012*b*.

After the image, audio, time, and distance analysis has been performed as described in the procedures above, the application stores the metrics on the local repository 304*a* or cloud repository 306*a*, and moves to step 2212, and feeds all of the calculated 36 metrics (or additional metrics if the user has added new profiles to FIG. 12) to a neural network. Such a neural network may be shown, for example, as neural network 2600 in FIG. 26.

In an embodiment, the neural network 2600 may be a neural network with hidden layers and backpropagation used as a machine learning classifier for selecting a tuning profile 1204*a*-1204*i* to switch to. By using such a classification technique, it may be possible to create a system of nodes with weights. This system of nodes with weights may be used in the to give a reliable prediction, based on the inputs of the 36 metrics, wherein 4 metrics are associated with each profile, for profiles 1204*a*-1204*i*, on which profile the user may most likely prefer to switch to, based on the sensory data of smartphone 404.

Figure 26:
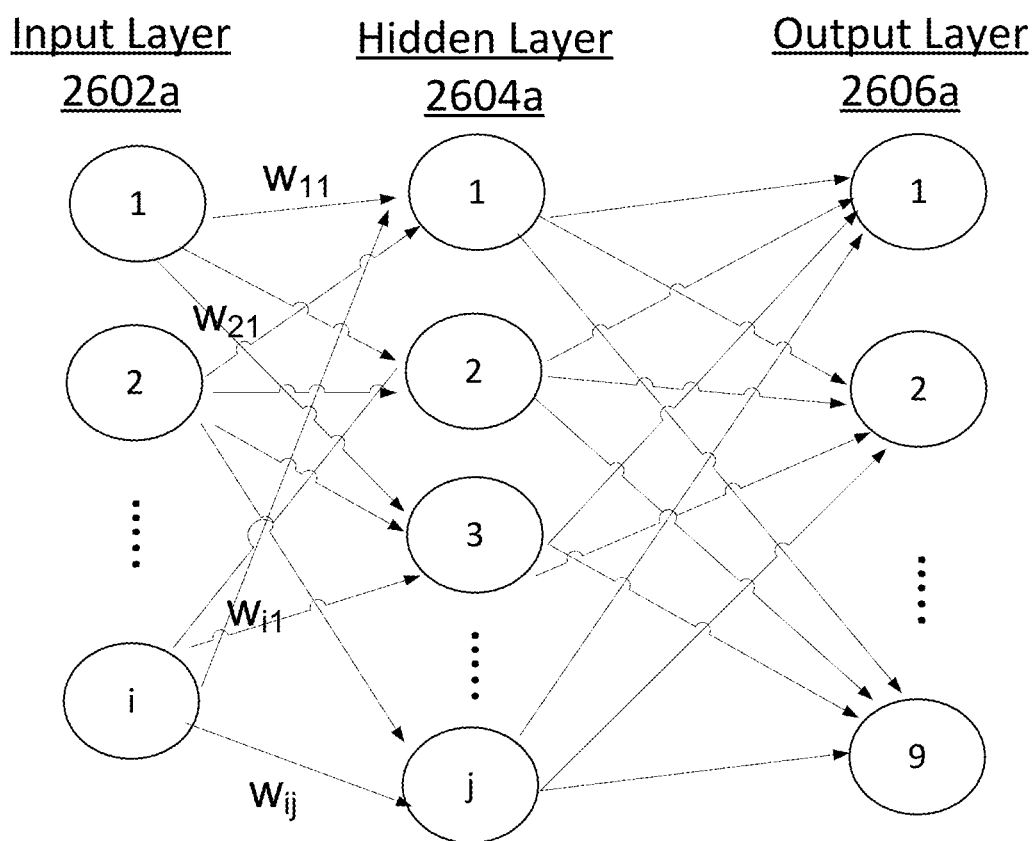
FIG. 26 is a diagram of a neural network classifier used for a decision-making process for a profile-changing regime, according to some embodiments.

Based on this predictive analysis, the machine learning logic of the neural network, including the system and nodes shown in e.g., FIG. 26, may be executed by the processor of the smartphone 404 on the metrics data stored in the local repository 304*a* or cloud repository 306*a*, or alternatively the data stored may be sent to the cloud server module to be executed in a cloud environment operated on utilizing multiple computer resource systems. Accordingly, based on the prediction by such a technique, a decision for the tuning profile to be switched to 2214 of FIG. 22.

The different components of the neural network model shown in FIG. 26 will herein be explained. The input layer 2602A contains nodes 1 to i, which represent inputs into the model. In this case i may be 36, corresponding to each of the calculated metrics based on the audio, time, image, and distance analysis. In an alternative embodiment, the audio, time, image, and distance analysis may also be performed in a cloud environment, where data as explained above may be saved to a local repository 304*a* or cloud repository 306*a*, or both. For example, node 1 may represent the distance analysis for tuning profile 1204a, node 2 may represent the audio analysis for tuning profile 1204a, and so on. Output layer 2606a may include nine nodes, node 1 through 9, as shown in FIG. 26, representing tuning profiles 1204a-1204i. The number of input nodes and output nodes may be adjusted as needed if the user adds additional profiles in FIG. 12. Based on the inputs and weights from each node to the other ($w_{ij}$ as shown in FIG. 6A), the results of the output layer are tabulated, and the node in the output layer with the greatest result is outputted as the outcome of the predictive analysis.

In traversing from the input layer 2602A to the output layer 2606A, there may also be several hidden layers 2604A present. The number of hidden layers 2604A may be preset at one or may be a plurality of layers. If the number of hidden layers 2604A is one (such as shown in FIG. 26), the number of neurons in the hidden layer may be calculated as the mean of the number of neurons in the input and output layers. This is derived from an empirically-based rule of thumb in ease of calculating weights across layers. According to an additional rule of thumb, in an embodiment to prevent over-fitting, where the number of neurons in input layer 2602A is $N_i$ and the number of neurons in the output layer 2606A is $N_o$, and the number of samples in the training data set (for all of the tuning profiles used), from the aggregated data is $N_s$, then the number of neurons $N_h$ in one hidden layer may be kept below $$N_h = \frac{N_s}{(\alpha * (N_i + N_o))}, \quad \text{(equation 12)}$$

where $\alpha$ is a scaling factor (typically ranging from 2-10). In this manner, the number of free parameters in the model may be limited to a small portion of the degrees of freedom in the training data, in order to prevent overfitting.

From the input layer, based on the weights from each node in the input layer 2602A to the hidden layer 2604A shown in FIG. 26, there may be a sigmoidal transfer function in going from the input layer 2602A to the hidden layer 2604A. Initially, the weights $w_{ij}$ may be initialized to random values between 0 and 1. An input signal (inputted metric values) may then be propagated according to these weights (forward-propagation), wherein the hidden layer 2604A forms the first outputs for the neurons of the input layer 2606A. For example, inputs given as neuron 1, 2, . . . , i in the input layer 2602A may be multiplied respectively by weights $w_{11}$, $w_{21}$, . . . , $w_i$, respectively, and summed to form the output to the hidden layer 2604A. Then the node 1 at the hidden layer 2604A may take this net value and transfer this activation value to see what the neuron output onwards to the output layer actually is. At each output layer (hidden layer 2604A with respect to input layer 2602A, and output layer 2606A with respect to hidden layer 2604A) transfer functions comprising the sigmoid activation function $$S(x) = \frac{1}{1 + e^{-x}},$$

hyperbolic tangent function $$tanhx = \frac{e^{2x} - 1}{e^{2x} + 1},$$

or smooth rectified linear unit (SmoothReLU) function $f(x) = \log(1+e^x)$ may be used to transfer outputs.

In the example above, the output given from the input layer 2602A to neuron 1 of the hidden layer 2604A would be inputted as the activation value to be transferred at the hidden layer 2604A to one of the transfer functions described above, and the output would form the value of neuron 1 of the hidden layer 2604A to be given onward as input to the output layer 2606A, and multiplied by respective weights to the neurons 1 through 9 of the output layer. In this manner, full forward propagation of inputs 1 through i in the input layer 2602a may be achieved to the output layer 2606a.

Then, to conduct backpropagation, error is calculated between the expected outputs and the outputs forward propagated from the network. The model may be trained based on the training points associated with a tuning profile for all tuning profiles 1204a-1204i described above. It is understood that by the user manually choosing such a profile, or by a user not interfering with an automatically chosen profile for a predetermined amount of time, it is an expected result. In so training, a '1' value is reserved for the output neuron corresponding to the tuning profile the training point is associated with, and a '0' value is reserved for all other neurons of the output layer 2606A. For example, for all training points associated with profile 1204a, the output layer 2606A neuron 1, which may be representative of profile 1204a, may receive a '1' value, while all the other neurons in the output layer 2606a would receive a '0' value, with the associated sensory data at this training point being used to calculate metrics which are input as input neurons in the input layer 2602A. In this manner, error is calculated between the expected outputs of 1,0 so described, and the outputs actually forward propagated by the network (initially by random weights assigned as described above). To transfer the error, the error signal to propagate backwards through the network is given by error=(expected—output) *transfer_derivative(output), wherein transfer_derivative is the derivative of the transfer function used (sigmoid, hyperbolic, or SmoothReLU). The error signal for a neuron in the hidden layer 2604A is then calculated as the weighted error of each neuron in the output layer, according to the weights from the output layer to the neuron in the hidden layer 2604A. Similarly, the error signal from the hidden layer is then propagated back to the input layer 2602A. Once the errors are calculated for each neuron in the network via the back propagation method described, the errors are used to update the weights according to the formula new_weight=old_weight+learning_rate*error*input. Here, the old_weight variable is the previous given weight in the model, the learning_rate variable is a value from 0 to 1 that specifies how much to change the old weight to correct for the error, the error variable is the error calculated by the backpropagation procedure, and the input variable is the value of the input that caused the error. Over time, this model can be developed to form a robust prediction analysis, and the rules governing its nodes, weights, and functions may be written in local repository 304a or 306a, such that it may be used for accurate detection which tuning profile a user may want to switch to based on sensory data gathered at step 2208. Every time new training points are saved, the model may be retrained, or it may be retrained periodically at predetermined intervals of time. In this manner, the neural network at step 2214 decides which profile to switch to based on the neural network output at the output layer 2606A.

Figure 23:
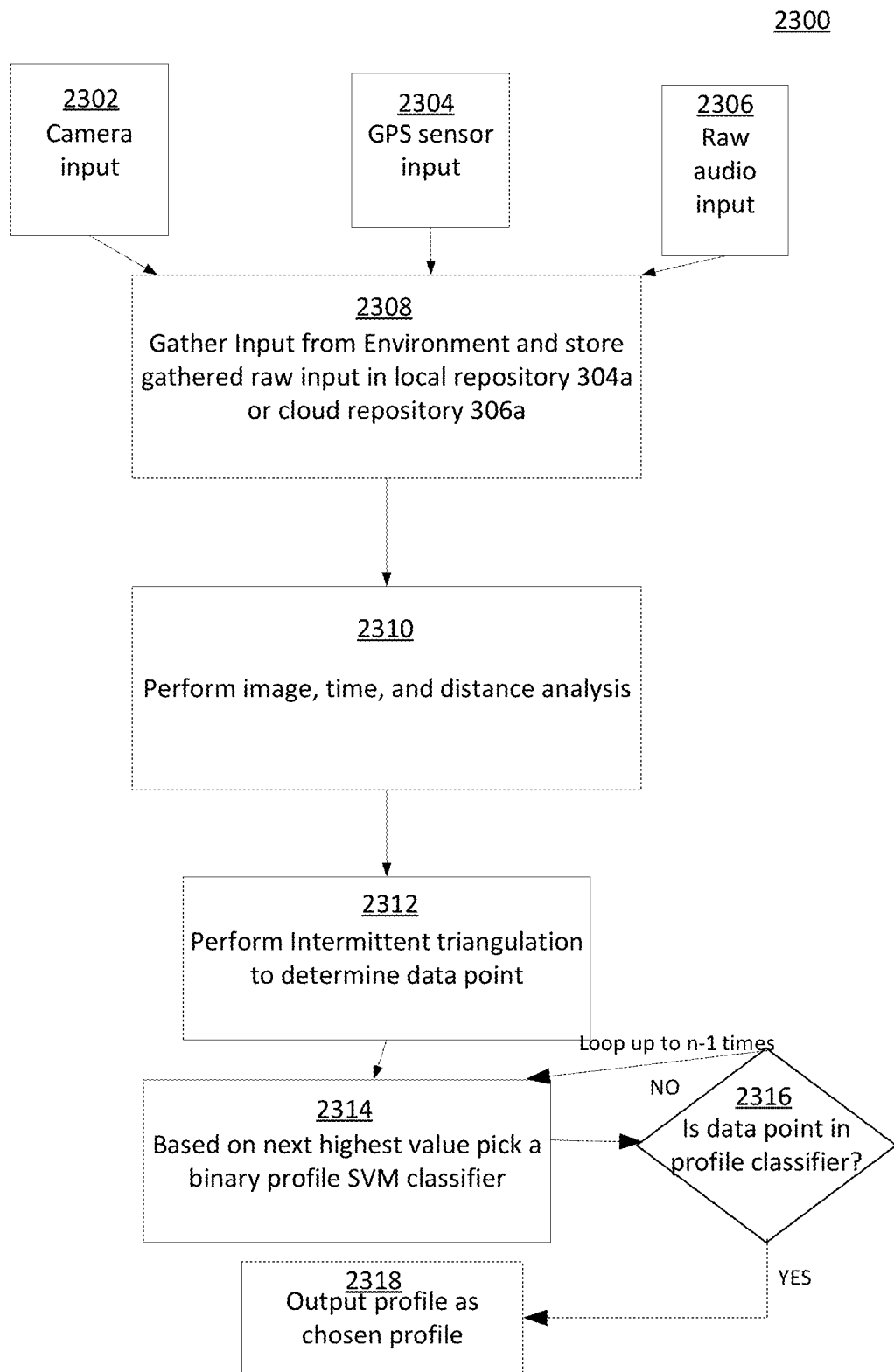
FIG. 23 is a flow diagram illustrating the process for a profile-changing regime gathering input for a surrounding environment, and performing a decision-making analysis using intermittent triangulation and a series of support vector machine classifiers, according to some embodiments.

Flow diagram 2300 shown in FIG. 23 describes the profile-switching regime of Low-Powered AI 1010b. In this diagram, step 2308 as shown closely resembles step 2208 of FIG. 22, where data is gathered mostly in the same manner, except that only the first form of raw audio input of 2206, or the audio snapshot in time, is recorded for raw audio input 2306. Otherwise, inputs 2302 and 2304 correspond exactly with inputs 2202 and 2204, respectively.

The gathered input is processed in the exact manner described as in step 2210 for FIG. 22 for image, time, and distance analysis. Because audio analysis is more CPU intensive it is omitted in the Low-Powered AI profile-switching regime.

At step 2312, a process called intermittent triangulation is performed on the results of the image, time, and distance analysis for each tuning profile 1204a-1204i. That is there are three metrics, resulting from image, time, and distance analysis, that have been tabulated for each tuning profile. From these three metrics, a composite metric is calculated using intermittent triangulation by the formula below:

$$\text{intermittent triangulation metric} = \qquad (13)$$
$$\text{image analysis metric} + \text{distance analysis metric} +$$
$$\left(1 - \frac{\text{time analysis metric}}{\text{highest time analysis metric of all tuning profiles}}\right)$$

From equation 13, the image analysis metric is a proportion expressed from 0 to 1, wherein 1 indicates that camera input 2202 corresponds perfectly with the camera images of the training points corresponding to a specific tuning profile, and 0 indicates that camera input 2202 does not correspond at all with the camera images of the training points corresponding to the specific tuning profile. Likewise, for the distance analysis metric, the distance analysis metric is a proportion expressed from 0 to 1, wherein 1 indicates that all of the GPS sensor coordinates of training points corresponding to the specific tuning profile are within a predetermine distance of GPS sensor input 2202. Conversely, 0 indicates that none of the GPS sensor coordinates of training points corresponding to the specific tuning profile are within a predetermine distance of GPS sensor input 2202. In this manner the image analysis metric and distance analysis metric are similar in that 0 indicates greater difference from and 1 indicates greater correspondence to a specific tuning profile. However, the time analysis metric, which only reports a divergence between spectral distributions, is not reported in this format. It is not scaled from 0 to 1, and a lower amount indicates greater correspondence to a specific tuning profile. Thus to fit the time analysis metric and make it correspond to the format of the image analysis metric and the distance analysis metric, for the sake of comparison, the time analysis metric is divided by the highest time analysis metric result out of all of the profiles (1204a-1204i), and thus 1 indicates maximal convergence, while a value of 0 indicates maximal divergence.

In this manner if all three metrics are added together for a specific tuning profile with regard to inputs 2302, 2304, and 2306 per equation 13, an intermittent triangulation metric for the specific tuning profile may be calculated. In this way, we have 9 composite metrics, one for each specific tuning profile, which can be used to estimate which specific tuning profile might be desired to switch to by a user based on the sensory data 2302, 2304, and 2306.

Figure 27:
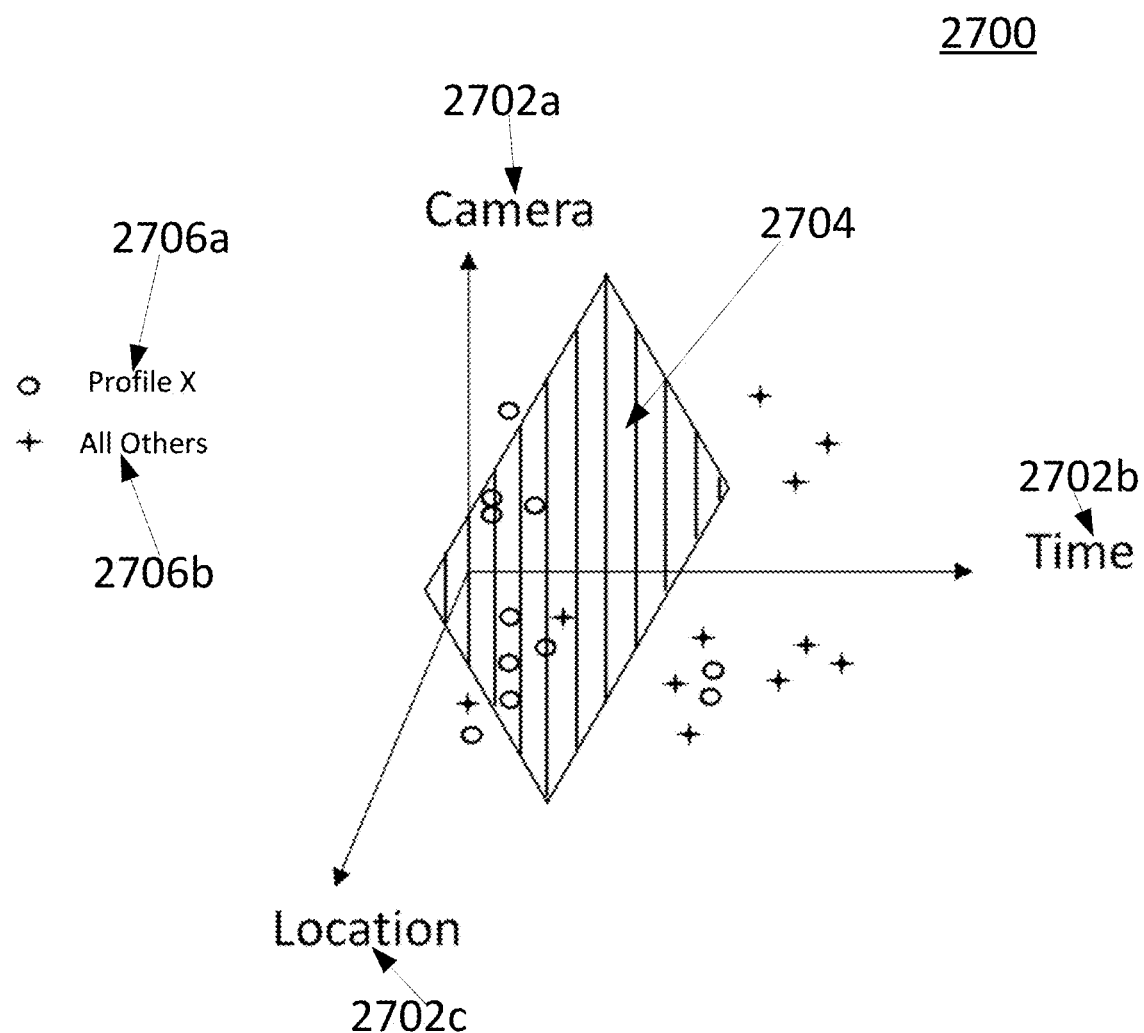
FIG. 27 is a diagram of a support vector machine classifier used for a decision-making process for a profile-changing regime, according to some embodiments.

For each specific tuning profile 1204a-1204i, a support vector machine (SVM) may be constructed as shown chart 2700 of FIG. 27. In this figure, training points corresponding to a specific tuning profile 1204a-1204i, labeled Profile X 2706a, may be compared to training points corresponding to all other tuning profiles 1204a-1204i other than Profile X (2706b). The SVM is used, as shown in FIG. 27, to construct a hyper plane in 3 dimensions (using the time analysis metric along axis 2702b, the image analysis metric along axis 2702a, and the distance analysis metric along axis 2702c, to classify between classes 2706a and 2706b. In order to place points, a time metric, location metric, and camera metric may be calculated for each of the previous training points based on the sensory data recorded at the time the training point was saved. Then all points, including training points for Profile X as well as training points for all other tuning profiles 2706b can be placed along the axes as shown in FIG. 27, and an appropriate hyperplane may be determined as a binary classifier, to classify a future prospective point, depending on where it falls along each of axes 2702a, 2702b, and 2702c, as either a point belonging to 2706a (Profile X) or 2706b (all other profiles). In this manner, 9 binary SVM classifier may be constructed, one for each of tuning profiles 1204a-1204i.

At step 2314, the next highest intermittent triangulation value (starting at the first highest value) may be chosen, and based on this value, a binary profile support vector machine (SVM) classifier may be picked. For example, if the first highest value of the intermittent triangulation value belongs to the profile 1204a, then the binary SVM classifier classifying profile 1204a as Profile X 2706a, against all other tuning profiles (2706b), may be picked as a binary profile SVM classifier.

Then using this binary profile SVM classifier, based on the calculated time metric, distance metric, and image metric of the input data of 2302, 2304, and 2306 relative to the training data points corresponding to profile 1204a (three values corresponding to the x, y, and z axis of the SVM classifier), the SVM classifier either classifies the sensory data that has been gathered at step 2308 as belonging to profile 1204a or not. If the SVM indicates that the sensory data gathered at step 2308 does belong to profile 1204a at step 2316 (YES), then the Low-Powered AI process exits and designates the tuning profile 1204a as the chosen profile to switch to.

On the other hand, if the binary SVM classifier classifying profile 1204a as Profile X 2706a, against all other tuning profiles (2706b), indicates that the sensory data that has been gathered at step 2308 does not belong to profile 1204a at step 2316 (meaning it has been classified as belonging to all others 2706b—NO at 2316), then the process goes back to step 2314. At step 2314, based on the next highest computed value of the intermittent triangulation metric, a subsequent binary SVM classifier may be picked. Thus the process may repeat in this manner until the sensory data that has been gathered at step 2308 is classified as belonging to a tuning profile (2706a) according to a subsequent binary SVM classifier. In this manner, the intermittent triangulation metric is used as an educated guess to derive the order of a sequence of binary SVM classifiers that may be used in a manner of process-of-elimination to decide which class the sensory data gathered at step 2308 belongs to, and thus which tuning profile should be chosen. As a worst case scenario, the process may loop up to n−1 times where n is the number of tuning profiles (e.g., 8 times if there are 9 tuning profiles).

Figure 24:
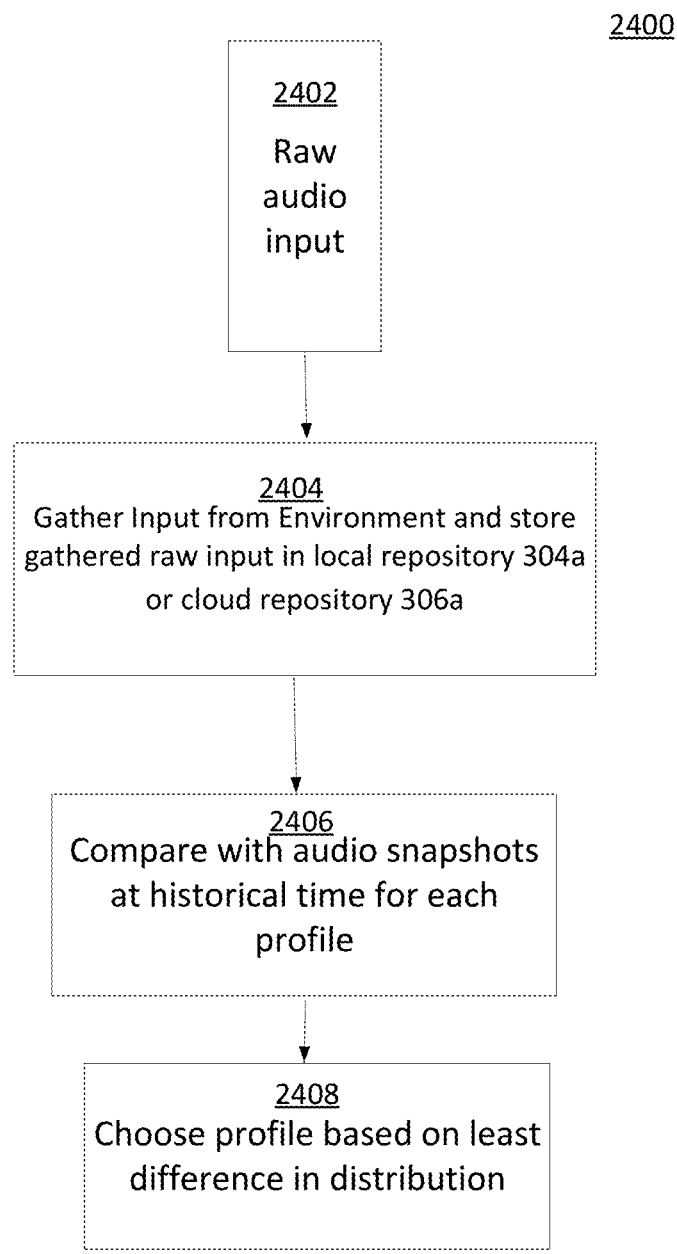
FIG. 24 is a flow diagram illustrating the process for a profile-changing regime based on a raw audio snapshot taken over time, according to some embodiments.

Flow diagram 2400, as shown in FIG. 24, corresponds to the Time Only profile-switching regime 1004b. In this profile-switching regime, which is among the least-power consuming profile-switching regimes as explained above, raw audio input is first gathered at step 2402. The format of this raw audio input corresponds to an audio snapshot in time, which is the first form of raw audio input 2206. In the same manner as gathering the first form of raw input 2206 at step 2208, here too a brief audio snapshot in time, at the time of period checking as explained in FIG. 17 and FIG. 18 may be recorded and stored in the local repository 304a or cloud repository 306a.

In the same manner as the time analysis metric is computed for step 2210, the audio snapshot captured is compared with audio snapshots in time captured as sensory data for training points that are associated with each of the tuning profiles 1204a-1204i. The difference in distributions may be assessed using the Kullback-Leibler divergence as explained above, and a time analysis metric averaged over all such calculated differences is calculated for each of the tuning profiles 1204a-1204i in the same manner as for calculating the time analysis metric in step 2210.

At step 2408, the results of the time analysis metric are compared, and the tuning profile having the time analysis metric with the least value (meaning the least overall difference in distribution with the gathered raw audio input at 2402) is chosen as the tuning profile to be switched to.

Figure 25:
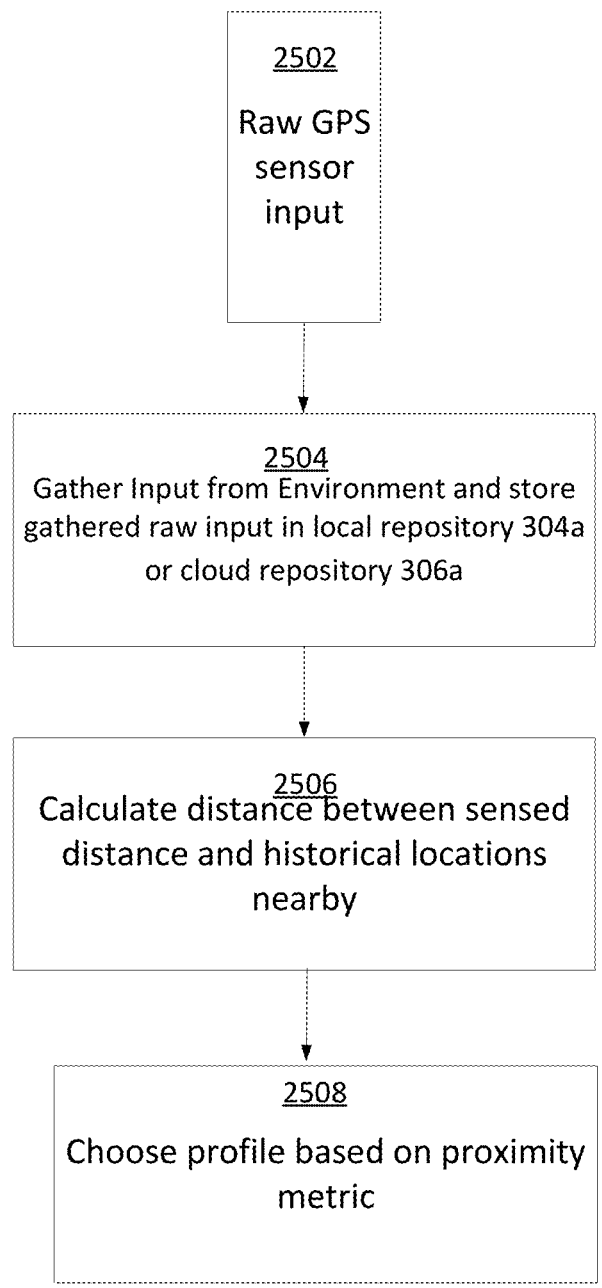
FIG. 25 is a flow diagram illustrating the process for a profile-changing regime based on a distance, according to some embodiments.

Flow diagram 2500, as shown in FIG. 25, corresponds to the Location Only profile-switching regime 1006b. In this profile-switching regime, which is among the least-power consuming profile-switching regimes as explained above, raw GPS sensor input is first gathered at step 2502. The format of this raw GPS sensor input corresponds to the raw GPS sensor input 2204. In the same manner as gathering the GPS sensor input 2204 at step 2208, here too a GPS sensor location in the form of latitude and longitude coordinates, at the time of period checking as explained in FIG. 17 and FIG. 18 may be recorded and stored in the local repository 304a or cloud repository 306a at step 2504.

In the same manner as the distance analysis metric is computed for step 2210, the GPS sensor coordinates gathered at step 2502 are compared with the GPS sensor coordinates captured as sensory data for training points that are associated with each of the tuning profiles 1204a-1204i. As explained above, the metric may be a proportion of these training points that are associated with each of the tuning profiles 1204a-1204i, that are within a predetermined distance of the GPS sensor coordinates gathered at step 2502. In particular, the same type of analysis as conducted in step 2210 for the distance analysis metric can be replicated here at step 2506.

Then, finally, at step 2508, the results of the distance analysis metric are compared, and the tuning profile having the time analysis metric with the most value (indicating the greatest proportion of training points that are associated with the tuning profile are within a predetermined distance of the GPS sensor coordinates gathered at step 2502) is chosen as the tuning profile to be switched to.

At home screen 700, as described above, a user may click the button 708 to sync data. Upon clicking this button, the application transitions to the synchronization screen 2800 shown in FIG. 28. In this screen, a total number of data records, wherein data records may comprise any of the data recorded to the local repository 304a or cloud repository 306a described above, are shown in box 2804a. The number of records out of those shown in 2804a that have been synced (either from repository 304a to 306a, or vice versa) are shown in box 2804b. Finally, the number of records that are pending to be synced are shown in box 2804c. These boxes are helpful and provide the user with a status as to the progress of a sync that may be in progress, or may remind the user that they may need to sync their data. A record of the last sync performed is indicated in label 2806. To perform a further syncing of their data, the user may click on sync data button 2808. To pause an ongoing sync, the user may click the same button 2808. In an embodiment, even if the user chooses only to save their data to the local repository 304a, if they press the sync data button 2808, their data may also be additionally saved to cloud repository 306a. The user can further select options 2810a-2810c to select a syncing frequency, wherein they may type a custom frequency (in hours) in box 2810d. Once any syncing activity has been completed to the user's satisfaction, they may go back to the home screen 700 in FIG. 7 by clicking arrow 2808.

Figure 30:
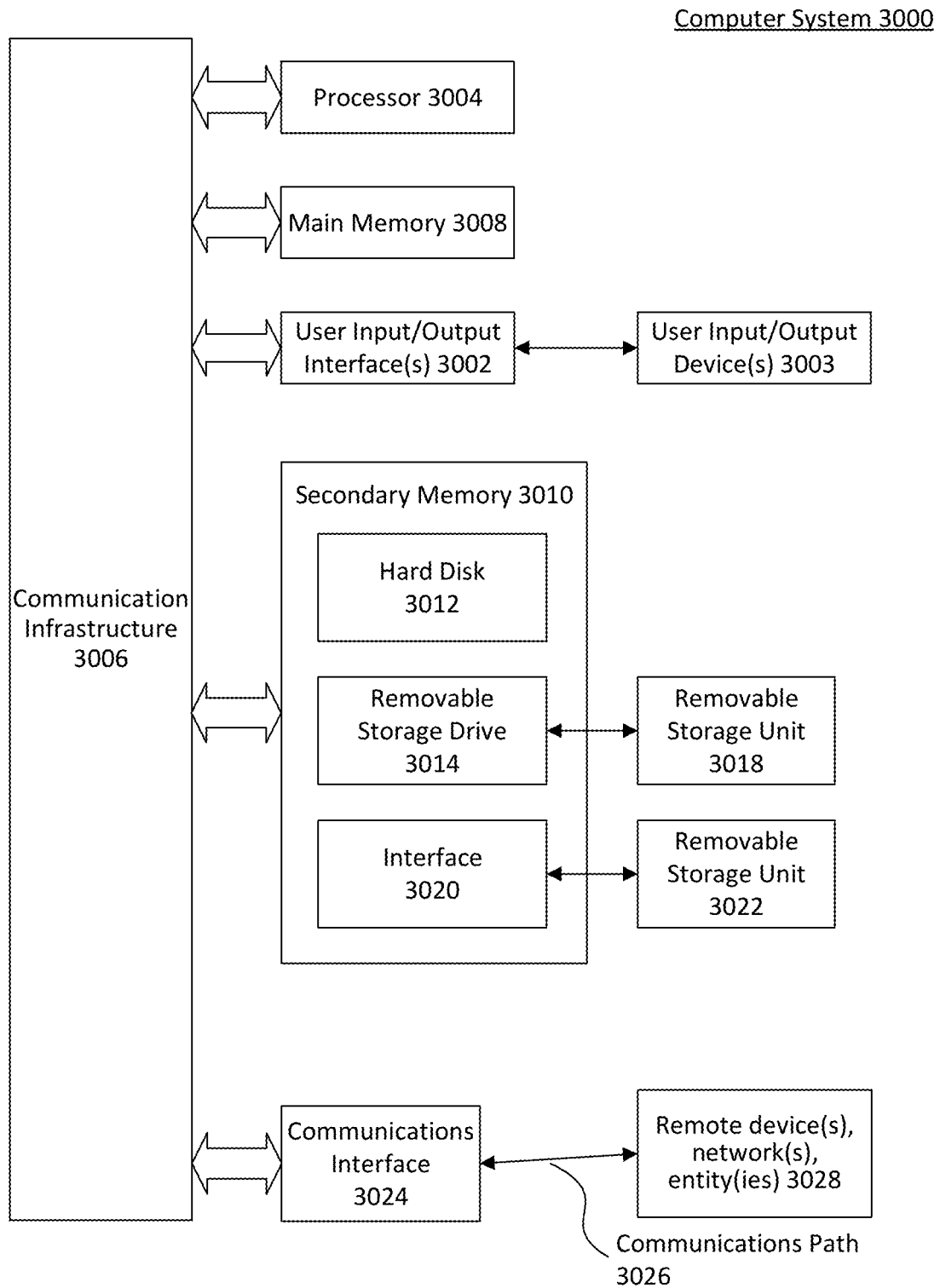
FIG. 30 is an example computer system useful for implementing various embodiments.

The underlying structure of a computer system 3000, shown in FIG. 30, can implement a database such as the local repository 304a or cloud repository 306a, and the sending and receiving of data. Computer system 3000 may include one or more processors (also called central processing units, or CPUs), such as a processor 3004. Processor 3004 may be connected to a communication infrastructure or bus 3006. Smartphone 404 and server module 306 may both comprising computing systems of the type of computer system 3000, in an embodiment.

Computer system 3000 may be virtualized, or it may also include user input/output devices 3003, such as monitors, keyboards, pointing devices, etc., which may communicate with communication infrastructure 3006 through user input/output interface(s) 3002.

One or more processors 3004 may be a graphics processing unit (GPU). In an embodiment, a GPU may be a processor that is a specialized electronic circuit designed to process FFT data received from audio signals, as well as multi-layered neural networks, support vector machines, etc., making it particularly effective in resource-intensive applications. The GPU may have a parallel structure that is efficient for parallel processing of large blocks of data, such as mathematically intensive data common to computer graphics applications, images, videos, word-processing documents, PDF files, and the like.

Computer system 3000 can also include a main or primary memory 3008, such as random-access memory (RAM). Main memory 3008 can include one or more levels of cache (including secondary cache).

Computer system 3000 can also include one or more secondary storage devices or memory 3010. Secondary memory 3010 may include, for example, a hard disk drive 3012 and/or a removable storage device or drive 3014, which may interact with a Raid array 3016, which may combine multiple physical hard disk drive components (such as SSD or SATA-based disk drives) into one or more logical units, or a removable storage unit 3018. Removable storage unit 3018 may include a computer usable or readable storage device having stored thereon computer software (control logic) and/or data, including remotely accessed network drives. Removable storage unit 3018 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 3014 may read from and/or write to removable storage unit 3018.

Secondary memory 3010 may include other means, devices, components, instrumentalities or other approaches for allowing computer programs and/or other instructions and/or data to be accessed by computer system 3000. Such means, devices, components, instrumentalities or other approaches may include, for example, a removable storage unit 3022 and an interface 3020. Examples of the removable storage unit 3022 and the interface 3020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3000 may further include a communication or network interface 3024. Communication interface 3024 may enable computer system 3000 to communicate and interact with any combination of external devices, external networks, external entities, etc. (individually and collectively referenced by reference number 3028). For example, communication interface 3024 may allow computer system 3000 to communicate with external or remote entities 3028 over communications path 3026, which may be wired and/or wireless (or a combination thereof), and which may include any combination of LANs, WANs, the Internet, etc. Control logic and/or data may be transmitted to and from computer system 3000 via communication path 3026.

Computer system 3000 may also be any of a personal digital assistant (PDA), desktop workstation, television, laptop or notebook computer, netbook, tablet, smart phone, smart watch or other wearable, appliance, part of the Internet-of-Things, and/or embedded system, to name a few non-limiting examples, or any combination thereof Any applicable data structures, file formats, and schemas in computer system 3000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the earpiece module 302, communication module 304, local repository 304a, server module 306, and cloud repository 306a in FIG. 3). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 3000, main memory 3008, secondary memory 3010, and removable storage units 3018 and 3022, as well as tangible articles of manufacture embodying any combination of the foregoing. Such control logic, when executed by one or more data processing devices (such as computer system 3000), may cause such data processing devices to operate as described herein.

Computer system 3000 may be a client or server, accessing or hosting any applications and/or data through any delivery paradigm, including but not limited to remote or distributed cloud computing solutions such as cloud computing environment 2902 which will be explained below; local or on-premises software ("on-premise" cloud-based solutions); "as a service" models (e.g. digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Figure 29:
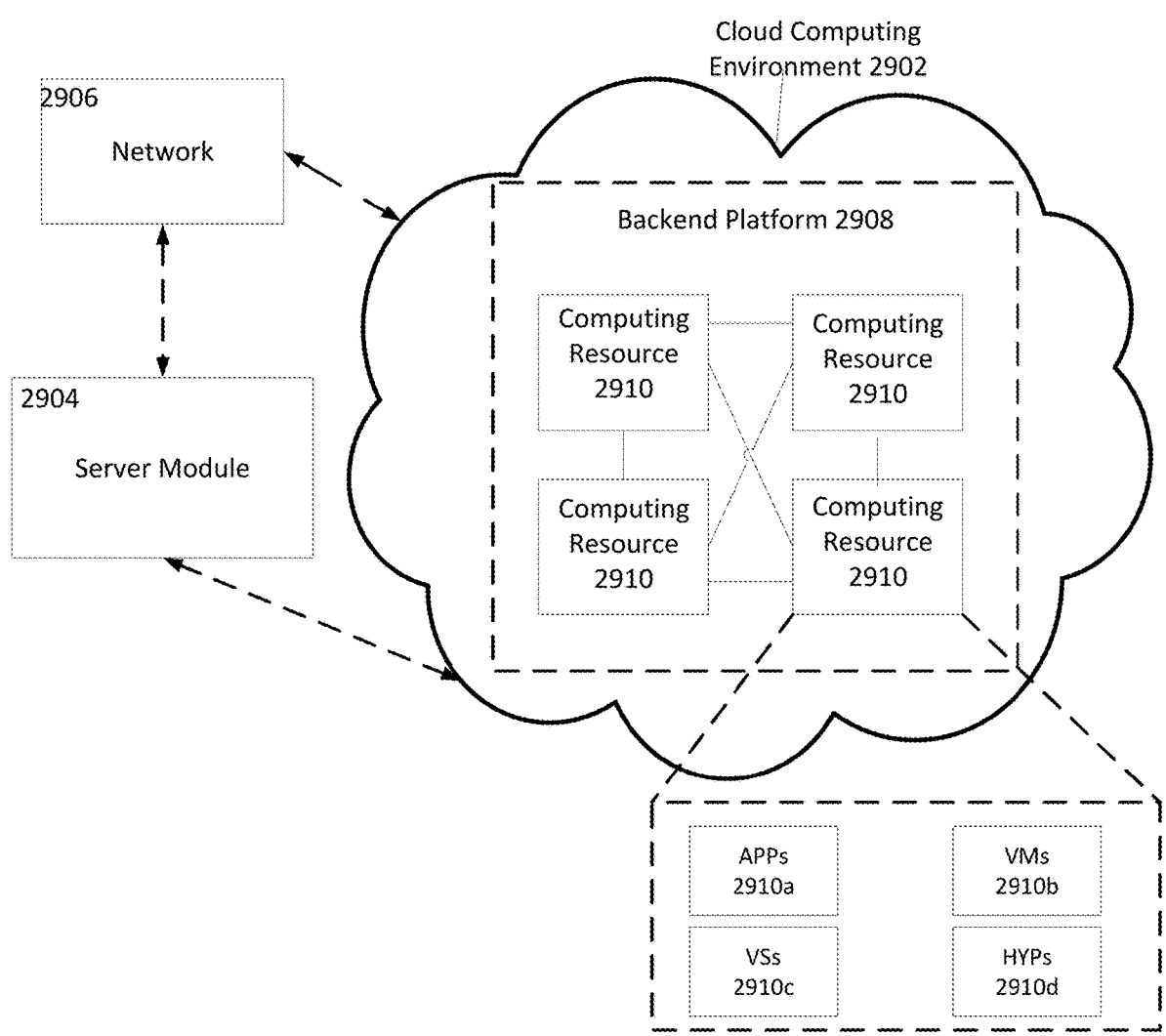
FIG. 29 is a block diagram of an example where a cloud computing environment may be accessed by a communicating module, according to an embodiment.

As shown in FIG. 29, cloud computing environment 2902 may contain backend platform 508, in a block diagram of an example cloud environment 2900 in which systems and/or methods described herein may be implemented. The communicating module 304 of FIG. 3, described above, may also be connected to a server module 306, which includes a host such as cloud computing environment 2902 in an embodiment. The cloud computing environment 2902 may be accessed by the server module 306, of the same type of computing system 3000 as described above. In this case, the server module 2904 of FIG. 29 may access the cloud computing environment 2902 by a communication or network interface 3024 as shown in FIG. 30, wherein a network gateway 2906 may comprise a remote entity 3028 accessed by the communications path 3026 of the server module computing system 306. Alternately, the computing cloud environment 2902 itself may correspond to a remote entity 3028 in FIG. 30, and may be accessed directly by the server module 306 through a communications path 3026, for example through an application protocol interface (API), eliminating the need for a network gateway 3006 (both options are shown in FIG. 39, wherein the flow path above the server module 2904 uses a network gateway 2906, and the flow path below the server module 2904 connects directly to the cloud computing environment 2902, both shown using dashed bi-directional lines). In an analogous manner to the server module 306, the communication module 304 may also include a host such as a cloud computing environment 2902 in an embodiment. In such an embodiment, the cloud computing environment 2902 may be accessed by a communicating module 2904 instead of the server module 2904 in FIG. 29, wherein there may be multiple cloud environments 2900 present in the system of FIG. 3.

The devices of the environments 2900, 300, and 400 may be connected through wired connections, wireless connections, or a combination of wired and wireless connections. In an example embodiment, one or more portions of the environment in 300, 400, or 2900 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, any other type of network, or a combination of two or more such networks.

The backend platform 2908 in FIG. 29 may include a server or a group of servers. In an embodiment, the backend platform 2908 may host a cloud computing environment 2902. It may be appreciated that the backend platform 2908 may not be cloud-based, or may be partially cloud-based.

The cloud computing environment 2902 includes an environment that delivers computing as a service and software as a service ("CaaS" and "SaaS" as described above), whereby shared resources, services, etc. may be provided to the user computing system 2904 and/or the backend platform 2908. The cloud computing environment 2902 may provide computation, software, data access, storage, and/or other services that do not require end-user knowledge of a physical location and configuration of a system and/or a device that delivers the services. For example, through a cloud environment 2900 included as part of the server module 306, the communication module 304 may receive data stored within or hosted on a database within computing resources 2910 within the backend platform 2908, through an application protocol interface (API) or any of the various communication protocols previously listed, or through a web-based application 2910a, which will be described below.

The cloud computing environment 2902 may include computing resources 2910. Each computing resource 2910 includes one or more personal computers, workstations, computers, server devices, or other types of computation and/or communication devices of the type such as computer system 3000 described above. The computing resource(s) 2910 may host the backend platform 2908. The cloud computing resources may include compute instances executing in the cloud computing resources 2910. The cloud computing resources 2910 may communicate with other cloud computing resources 2910 via wired connections, wireless connections, or a combination of wired or wireless connections.

Computing resources 2910 may include a group of cloud resources, such as one or more applications ("APPs") 2910a, one or more virtual machines ("VMs") 2910b, virtualized storage ("VS") 2910c, and one or more hypervisors ("HYPs") 2910d.

An application 2910a may include one or more software applications that may be provided to or accessed by a computer system 3000, such as web-based applications, web-based IDEs, etc. The application 2910a may include software associated with backend platform 2908 and/or any other software configured to be provided across the cloud computing environment 2902 (e.g. to communicating module 304). The application 2910a may send/receive information from one or more other applications 2910a, via one or more of the virtual machines 2910b. Computing resources 2910 may be able to access each other's applications 2910a through virtual machines 2910b, in this manner. In an alternate embodiment, a server module 306 computing system 3000 is not needed, and the sever module 306 only comprises the cloud computing environment 2902, hosted and executed by computing resources 2910, and communicating with the communicating module 304 via app 2910a, using any of the various communication protocols mentioned above. Analogous logic applies to cloud environments 2900 of the communicating module 304.

Virtual machine 2910b may include a software implementation of a machine (e.g., a computer) that executes programs like a physical machine. This may be of particular use in the alternate embodiment where there is no separate server module 306 of the type of computer system 3000. In this embodiment, the server module 306 may be a virtualized machine 2910b, and may communicate with communicating module 304 using the various communication protocols listed above, via an application 2910a. Virtual machine 2910b may be either a system virtual machine or a process virtual machine. A system virtual machine may provide a complete system platform that supports execution of a complete operating system (OS). A process virtual machine may execute a single program and may support a single process. The virtual machine 2910b may execute on behalf of a user and/or on behalf of one or more other backend platforms 2908, and may manage infrastructure of cloud computing environment 2902, such as data management, synchronization, or long duration data transfers.

Virtualized storage 2910c may include one or more storage systems and/or one or more devices that use virtualization techniques within the storage systems or devices of computing resource 2910. With respect to a storage system, types of virtualizations may include block virtualization and file virtualization. Block virtualization may refer to abstraction (or separation) of logical storage from physical storage so that the storage system may be accessed without regard to physical storage or heterogeneous structure. File virtualization may eliminate dependencies between data accessed at a file level and location where files are physically stored. This manner of block and file virtualization may enable optimization of storage use, server consolidation, and/or performance of non-disruptive file migrations.

Hypervisor 2910d may provide hardware virtualization techniques that allow multiple operations systems to execute concurrently on a host computer, such as computing resource 2910, which may include a computing system of the type of computing system 3000, and can in this manner host a virtualized hardware of a server module 306. Hypervisor 2910d may present a virtual operating platform to the guest operating systems, and may manage multiple instances of a variety of operating systems as these "guest operating systems," which may share virtualized hardware resource, such as RAM. Alternately, secondary memory may be accessed using virtualized storage 2910c, or on physical storage, such as the hard disk drive 3012, of a computing resource 2910 of the type of computing system as computing system 3000.

It is to be appreciated that the Detailed Description section, and not any other section, is intended to be used to interpret the claims. Other sections are not intended to limit this disclosure or the appended claims in any way.

What is claimed is:

1. A computer-implemented method for selectively tuning audio output to an earpiece worn by a user, comprising:
    executing, by at least one processor, a display routine to display a graphical user interface to the user on a screen connected to the at least one processor;
    obtaining input from the user, based on the user's interaction with the graphical user interface, in the form of sensory input from the user, wherein the sensory input from the user is in the form of raw data which may be stored by the at least one processor in a local repository in a primary or secondary memory associated with said at least one processor;
    processing, by the at least one processor, an input audio signal from the earpiece by a microphone sensor on the earpiece;
    receiving the input audio signal from the earpiece, and storing the input audio signal in the local repository by the at least one processor;
    transforming the received input audio signal from a time domain to a frequency domain using a Fourier transform by the at least one processor;
    altering the input audio signal in the frequency domain in a selective manner based on the obtained input from the user, by the at least one processor;
    performing an inverse Fourier transform on the altered audio signal to obtain an altered audio signal in the time domain by the at least one processor; and
    transmitting the altered audio signal in the time domain to the earpiece by the at least one processor, wherein the earpiece has no electronic components present behind the ear.

2. The method of claim 1, wherein the selective altering of the audio signal further includes:

continuously incorporating new data from electronic sensors attached to the at least one processor;

determining a tuning profile out of several tuning profiles based on the data from the electronic sensors, in a fully autonomous manner, by the at least one processor; and based on the autonomous determination of the tuning profile, selectively altering the obtained input signal in the frequency domain by the at least one processor.

3. The method of claim 2, wherein the continuous incorporation of new data from electronic sensors attached to the at least one processor includes incorporation of new data from a global positioning system sensor attached to the at least one processor, and wherein the autonomous determination of the tuning profile is based on a location determined from sensed data from the global positioning system sensor, by the at least one processor.

4. The method of claim 3, wherein the autonomous determination of the tuning profile is further based on a location criteria, wherein said determination further includes:

comparing the location determined from the sensed data from the global positioning system sensor to a location history comprising locations determined from previously sensed data from the global positioning sensor by the at least one processor, wherein each location in the location history is associated with one of the several tuning profiles, and wherein for each location in the location history, each location, each location's associated previously sensed data from the global position sensor, and each location's associated tuning profile are stored in the local repository by the at least one processor.

5. The method of claim 4, wherein the autonomous determination of the tuning profile based on the location criteria further includes:

computing a statistic comparing a proportion of previously recorded locations associated with one tuning profile of the several tuning profiles, within a radius of a predetermined distance from the location determined from the sensed data from the global positioning sensor, to a total number of previously recorded locations that are associated with the same tuning profile out of the several tuning profiles, by the at least one processor; and selecting the one tuning profile of the several tuning profiles to alter the input signal in the frequency domain if the computed statistic for the one tuning profile exceeds a predetermined threshold, by the at least one processor.

6. The method of claim 2, wherein after obtaining the altered audio signal in the time domain, based on a calibration process, when transmitting the altered audio signal in the time domain to the earpiece, the output volume that is output to the earpiece is altered to a predetermined volume output level by the at least one processor.

7. The method of claim 6, wherein the volume output level to which the output volume is output is selectively adjusted by the at least one processor using a fitted polynomial equation correlating computer volume output level to decibel level, wherein the output volume of the altered audio signal in the time domain is altered so that it does not exceed a predetermined decibel level in the range of 70-100 decibels.

8. A system comprising:
a memory, an earpiece worn by a user, a display screen; and at least one processor coupled to the memory and display screen configured to:

execute a display routine to display a graphical user interface to the user on the display screen;

obtain input from the user, based on the user's interaction with the graphical user interface, in the form of sensory input from the user, wherein the memory comprises primary memory or secondary memory or both, and wherein sensory input from the user is in the form of raw data which may be stored in a local repository in the primary or the secondary memory or both;

processing an input audio signal from the earpiece by a microphone sensor on the earpiece;

receive the input audio signal from the earpiece, and store the input signal in the local repository;

transform the received input signal from a time domain to a frequency domain using a Fourier transform;

alter the input signal in the frequency domain in a selective manner based on the obtained input from the user;

perform an inverse Fourier transform on the altered audio signal to obtain an altered audio signal in the time domain; and transmit the altered audio signal in the time domain to the earpiece, wherein the earpiece has no electronic components present behind the ear.

9. The system of claim 8, wherein the system additionally comprises electronic sensors coupled to the at least one processor, and to selective alter the audio signal the at least one processor is further configured to:

continuously incorporate new data from the electronic sensors attached to the at least one processor;

determine a tuning profile out of several tuning profiles based on the data from the electronic sensors, in a fully autonomous manner; and based on the autonomous determination of the tuning profile, selectively alter the obtained input signal in the frequency domain.

10. The system of claim 9, wherein the electronic sensors coupled to the at least one processor include a global positioning system sensor, wherein the autonomous determination of the tuning profile is based on a location determined from sensed data from the global positioning system sensor.

11. The system of claim 10, wherein the autonomous determination of the tuning profile is further based on a location criteria, wherein said determination further includes the at least one processor being configured to:

compare the location determined from the sensed data from the global positioning system sensor to a location history comprising locations determined from previously sensed data from the global positioning sensor, wherein each location in the location history is associated with one of the several tuning profiles, and wherein for each location in the location history, each location, each location's associated previously sensed data from the global position sensor, and each location's associated tuning profile are stored in the local repository.

12. The system of claim 11, wherein the autonomous determination of the tuning profile based on the location criteria further includes the at least one processor being configured to:

compute a statistic comparing a proportion of previously recorded locations associated with one tuning profile of the several tuning profiles, within a radius of a predetermined distance from the location determined from the sensed data from the global positioning sensor, to a total number of previously recorded locations that are associated with the same tuning profile out of the several tuning profiles; and select the one tuning profile of the several tuning profiles to alter the input signal in the frequency domain if the computed statistic for the one tuning profile exceeds a predetermined threshold.

13. The system of claim 9, wherein after obtaining the altered audio signal in the time domain, based on a calibration process, when transmitting the altered audio signal in the time domain to the earpiece, the at least one processor is configured to alter the output volume that is output to the earpiece to a predetermined volume output level.

14. The system of claim 13, wherein the at least one processor is further configured to selectively adjust the volume output level to which the output volume is output is using a fitted polynomial equation correlating computer volume output level to decibel level, wherein the at least one processor alters the output volume of the altered audio signal in the time domain to not exceed a predetermined decibel level in the range of 70-100 decibels.

15. A non-transitory computer-readable device having instructions stored thereon for selectively tuning audio output to an earpiece worn by a user that, when executed by at least one computing device, cause the at least one computing device to perform operations comprising:
executing a display routine to display a graphical user interface to the user on a screen;
obtaining input from the user, based on the user's interaction with the graphical user interface, in the form of sensory input from the user, wherein the sensory input from the user is in the form of raw data;
processing an input audio signal from the earpiece by a microphone sensor on the earpiece;
receiving the input audio signal from the earpiece, and storing the input audio signal in a local repository;
transforming the received input audio signal from a time domain to a frequency domain using a Fourier transform;
altering the input audio signal in the frequency domain in a selective manner based on the obtained input from the user;
performing an inverse Fourier transform on the altered audio signal to obtain an altered audio signal in the time domain; and
transmitting the altered audio signal in the time domain to the earpiece.

16. The device of claim 15, wherein the selective altering of the audio signal further includes:

continuously incorporating new data from electronic sensors attached to the at least one computing device;
determining a tuning profile out of several tuning profiles based on the data from the electronic sensors, in a fully autonomous manner; and
based on the autonomous determination of the tuning profile, selectively altering the obtained input signal in the frequency domain.

17. The device of claim 16, wherein the continuous incorporation of new data from electronic sensors attached to the at least computing device includes incorporation of new data from a global positioning system sensor, and wherein the autonomous determination of the tuning profile is based on a location determined from sensed data from the global positioning system sensor.

18. The method of claim 17, wherein the autonomous determination of the tuning profile is further based on a location criteria, wherein said determination includes further operations comprising:
comparing the location determined from the sensed data from the global positioning system sensor to a location history comprising locations determined from previously sensed data from the global positioning sensor, wherein each location in the location history is associated with one of the several tuning profiles, and wherein for each location in the location history,
each location, each location's associated previously sensed data from the global position sensor, and each location's associated tuning profile are stored in the local repository.

19. The device of claim 18, wherein the autonomous determination of the tuning profile based on the location criteria includes further operations comprising:
computing a statistic comparing a proportion of previously recorded locations associated with one tuning profile of the several tuning profiles, within a radius of a predetermined distance from the location determined from the sensed data from the global positioning sensor, to a total number of previously recorded locations that are associated with the same tuning profile out of the several tuning profiles; and
selecting the one tuning profile of the several tuning profiles to alter the input signal in the frequency domain if the computed statistic for the one tuning profile exceeds a predetermined threshold.

20. The device of claim 16, wherein after obtaining the altered audio signal in the time domain, based on a calibration process, when transmitting the altered audio signal in the time domain to the earpiece, the output volume that is output to the earpiece is altered to a predetermined volume output level.

* * * * *